United States Patent
Strom et al.

(10) Patent No.: US 12,452,334 B2
(45) Date of Patent: Oct. 21, 2025

(54) ADAPTIVE OVERLAY NETWORK ARCHITECTURE

(71) Applicant: System73 Ltd, Floriana (MT)

(72) Inventors: Jose Daniel Perea Strom, Santa Cruz de Tenerife (ES); Doron Paz, Alameda, CA (US); William C. Erbey, Christiansted, VI (US); Duo Zhang, Lakewood, OH (US)

(73) Assignee: System73 Ltd., Floriana (MT)

( * ) Notice: Subject to any disclaimer, the term of this patent is extended or adjusted under 35 U.S.C. 154(b) by 507 days.

(21) Appl. No.: 17/173,225

(22) Filed: Feb. 11, 2021

(65) Prior Publication Data

US 2021/0273884 A1  Sep. 2, 2021

Related U.S. Application Data

(63) Continuation of application No. 16/228,098, filed on Dec. 20, 2018, now abandoned.
(Continued)

(51) Int. Cl.
*H04L 67/1042* (2022.01)
*H04L 45/48* (2022.01)
(Continued)

(52) U.S. Cl.
CPC .......... *H04L 67/1042* (2013.01); *H04L 45/48* (2013.01); *H04L 47/11* (2013.01); *H04L 67/104* (2013.01)

(58) Field of Classification Search
None
See application file for complete search history.

(56) References Cited

U.S. PATENT DOCUMENTS

| | | | |
|---|---|---|---|
| 6,275,470 B1 * | 8/2001 | Ricciulli | H04L 45/02 370/252 |
| 10,158,554 B1 * | 12/2018 | Bae | H04W 40/24 |

(Continued)

FOREIGN PATENT DOCUMENTS

| | | |
|---|---|---|
| EP | 1398924 A2 | 3/2004 |
| EP | 3038323 A1 | 6/2016 |

(Continued)

OTHER PUBLICATIONS

International Search Report and Written Opinion of PCT/EP2018/060169 mailed on Sep. 21, 2018 (40 pages).

(Continued)

*Primary Examiner* — Christopher T Wyllie
(74) *Attorney, Agent, or Firm* — Dykema Gossett PLLC

(57) ABSTRACT

The adaptive overlay network architecture of the present invention improves the performance of applications distributing digital content among nodes of an underlying network such as the Internet by establishing and reconfiguring overlay network topologies over which associated content items are distributed. The present invention addresses not only frequently changing network congestion, but also interdependencies among nodes and links of prospective overlay network topologies. The present invention provides a prediction engine that monitors metrics and predicts the relay capacity of individual nodes and links (as well as demand of destination nodes) over time to reflect the extent to which the relaying of content among the nodes of an overlay network will be impacted by (current or future) underlying network congestion. The present invention further provides a topology selector that addresses node and link interdependencies while redistributing excess capacity to determine an overlay network topology that satisfies application-specific performance criteria.

14 Claims, 24 Drawing Sheets

Related U.S. Application Data

(60) Provisional application No. 62/655,703, filed on Apr. 10, 2018.

(51) Int. Cl.
    *H04L 47/11*        (2022.01)
    *H04L 67/104*      (2022.01)

(56) References Cited

U.S. PATENT DOCUMENTS

| | | | |
|---|---|---|---|
| 2003/0018811 A1* | 1/2003 | Schwartz | H04L 45/00 709/238 |
| 2005/0015511 A1 | 1/2005 | Izmailov et al. | |
| 2005/0083848 A1* | 4/2005 | Shao | H04L 45/42 370/461 |
| 2005/0255848 A1* | 11/2005 | Cohen | H04W 40/20 455/445 |
| 2006/0218301 A1 | 9/2006 | O'Toole et al. | |
| 2007/0150498 A1* | 6/2007 | Li | H04L 67/1076 |
| 2007/0253341 A1 | 11/2007 | Atkinson et al. | |
| 2008/0144511 A1* | 6/2008 | Marcondes | H04L 45/58 370/236 |
| 2008/0183891 A1 | 7/2008 | Ni et al. | |
| 2008/0244042 A1* | 10/2008 | Jamin | H04N 21/2187 709/220 |
| 2008/0298240 A1* | 12/2008 | Lee | H04L 41/149 370/235 |
| 2010/0027442 A1* | 2/2010 | Chockler | H04L 67/1044 370/254 |
| 2010/0100768 A1* | 4/2010 | Yamamoto | H04L 43/12 714/E11.178 |
| 2010/0228848 A1 | 9/2010 | Kis | |
| 2010/0278069 A1* | 11/2010 | Sharma | H04L 45/124 370/254 |
| 2011/0211444 A1* | 9/2011 | Das | H04W 36/18 370/219 |
| 2013/0297731 A1 | 11/2013 | Chan et al. | |
| 2014/0098685 A1* | 4/2014 | Shattil | H04L 67/1014 370/252 |
| 2014/0320500 A1* | 10/2014 | Fletcher | G06F 11/3409 345/440 |
| 2015/0372873 A1* | 12/2015 | Mahadevan | H04L 45/02 370/255 |
| 2018/0309636 A1* | 10/2018 | Strom | H04L 43/08 |
| 2018/0331969 A1* | 11/2018 | Chen | G06F 9/5083 |
| 2021/0273884 A1* | 9/2021 | Strom | H04L 67/1042 |

FOREIGN PATENT DOCUMENTS

| | | |
|---|---|---|
| WO | 2016/089435 A1 | 6/2016 |
| WO | 2018/193082 A1 | 10/2018 |

OTHER PUBLICATIONS

XiaoLin Wan; "Analysis and Design for VoIP Teleconferencing System Based on P2P-SIP Technique;" 2011 International Conference on Electronics and Optoelectronics (ICEOE 2011), IEEE; 2011; pp. V1-400-V1-403.

Liu et al.; "CMT-SR: A Selective Retransmission Based Concurrent Multipath Transmission Mechanism for Conversational Video;" Computer Networks; vol. 112; 2017; (published online on Nov. 25, 2016); pp. 360-371.

Report received from the International Searching Authority regarding the multiple inventions in PCT/EP2018/060169 together with the Partial International Search and the Provisional Opinion mailed on Jul. 19, 2018 (19 pages).

\* cited by examiner

ADAPTIVE OVERLAY NETWORK ARCHITECTURE

RELATED APPLICATIONS

This application is a continuation of and claims the benefit of U.S. patent application Ser. No. 16/228,098 filed on Dec. 20, 2018, which claims priority to U.S. Provisional Application Ser. No. 62/655,703 filed on Apr. 10, 2018, which are incorporated herein by reference in their entirety to the full extent permitted by law.

BACKGROUND

Field of Art

The present invention relates generally to the distribution of digital content among nodes of an overlay network built on top of an underlying network such as the Internet, and more particularly to an adaptive overlay network architecture that determines overlay network topologies that satisfy defined application-specific performance criteria by addressing frequently changing underlying network congestion in the context of performance interdependencies among the nodes and links of an overlay network.

Description of Related Art

A. The Problem of Network Congestion

At its most basic level, a computer network consists of multiple network devices (nodes) that are interconnected, directly or indirectly, for the purpose of exchanging data or information (used interchangeably herein) and sharing resources provided by the network nodes. For example, two computers and a network printer connected to a network switch form a simple "local area network" (LAN) that enables users of both computers to share the printing resources provided by the network printer.

In this simple network, although both computers and the network printer are connected directly to the network switch, but connected only indirectly to one another, all are considered to be nodes on the LAN. The same is true whether the connections are made via wired or wireless media.

Even in this simple LAN, network congestion occurs when one or both computers send sufficiently large amounts of information to the network printer during a given period of time, resulting in printing delays and potential failure of individual printing jobs (e.g., if the network printer's memory buffer becomes overloaded and network traffic exceeds the printer's designed capacity). To address the problem of network congestion, particularly as more computers are added to the LAN, one might introduce an additional network printer and software to "load balance" the print requests from the computers among the shared network printers—i.e., to increase supply and distribute the demand.

As will become apparent, the problem of network congestion at network nodes that provide shared resources becomes exponentially more complex as the underlying computer network increases in size and scope. For example, in addition to supporting network printing, devices on a LAN may provide additional network functionality such as file transfer, email, videoconferencing and other network applications and services. Shared use of this additional functionality by network nodes inevitably exacerbates the problem of network congestion—as the "demand" of nodes consuming this shared functionality routinely exceeds the "supply" or capacity of individual nodes to provide and distribute such functionality.

When an underlying network is expanded beyond a LAN to include more nodes at different physical locations (operated, for example, by various individual, commercial, governmental and other entities), network routers are deployed to enable the interconnection of multiple computer networks to form a "wide area network" (WAN). The Internet—the most popular and heavily utilized WAN (i.e., a network of networks)—interconnects billions of devices around the world and provides the underlying infrastructure that supports a vast array of shared network applications and services (referred to herein simply as "applications").

Due its historical evolution as an ad hoc network with little or no centralized control, the Internet is rife with network congestion issues that are difficult to address holistically. In particular, the routing of information among network nodes is decentralized. Routing decisions are made in a distributed fashion by "intermediate routing nodes" (routers, switches, bridges, gateways, firewalls, etc., provided by many different entities) that implement various distributed routing algorithms.

As a result, while each router or other intermediate routing node determines the "next hop" node to which it will transmit information, no centralized entity determines the entire path (i.e., the set of individual "hops" between two nodes) that information traverses from a "source" node to a "destination" node. Moreover, at present, the entire topology of network nodes on the Internet, including their interconnections, cannot feasibly be determined by any such entity.

To distribute information (also referred to herein as "digital content") on the Internet, the information is divided into smaller packets that are individually routed in accordance with an "Internet Protocol" (IP) addressing scheme that identifies each network node by a unique IP address. When one network node (node A) sends information to another network node (node B), that information typically is divided into multiple IP packets, each addressed with the destination IP address of the destination node (node B), but each potentially traversing a different path (hops among various intermediate routing nodes) from node A to node B, where these packets are reassembled.

Because these intermediate routing nodes are shared resources utilized at any given time by many other network nodes participating in a wide range of applications (including, for example, web browsing, file transfer, email, telephony, video streaming, etc.), network congestion at one or more of these shared intermediate routing nodes is quite common. As a result, the ability of a source node to transfer information to a destination node is negatively impacted by this network congestion, as the information encounters delays as it is distributed through these shared intermediate routing nodes. Such network congestion may occur as the result of device or cabling failures, excessive bandwidth demands and various other factors that constrain "performance" as information is distributed via these shared intermediate routing nodes.

To appreciate the nature of network congestion at these shared intermediate routing nodes, it is helpful to distinguish such intermediate routing nodes from "user" nodes that are responsible for "consuming" digital content (i.e., destination nodes) or generating or inserting digital content onto the network (i.e., source nodes) in connection with an application. While the network printer referenced above (a destination node) is a shared network resource that can experience congestion while consuming information, a much more problematic form of network congestion occurs at the shared intermediate routing nodes that exist for the purpose of distributing information across the global Internet.

It should be noted that an Individual network node can perform the functionality of both a source node and a destination node. Such nodes include computer servers as well as client nodes—e.g., desktop and laptop computers, smartphones, televisions, streaming media boxes, sensors and various other connected devices—regardless of the particular type of network topology by which they are interconnected (e.g., stars, rings, trees, meshes, and virtually any type of graph or other physical or logical topology).

While all network devices can be considered network nodes of an underlying network such as the Internet, the user nodes that participate in a particular application are often referred to as "overlay nodes" that form an "overlay network" built on top of the underlying network. In other words, from the higher-level "logical" perspective of an application, only the overlay nodes are included in the "overlay distribution" of information among those overlay nodes (even though information ultimately traverses intermediate routing nodes between any given pair of overlay nodes).

For example, given overlay nodes A, B, and C, the path from node A to node C could be expressed as a set of two logical overlay paths or "links"—a first link from node A to node B, and a second link from node B to node C. From the perspective of the underlying network, however, each logical link between a pair of overlay nodes includes one or more lower-level hops through various intermediate routing nodes, any one or more of which may introduce significant delays (e.g., due to network congestion resulting from the sharing of such intermediate routing nodes among different overlay networks implemented by other application service providers).

It is therefore important to distinguish the overlay paths or set of links among the overlay nodes of an overlay network from the lower-level paths or set of hops among intermediate routing nodes that information traverses as a result of the determination of each link. The creator of each logical link does not explicitly determine the lower-level path that information will traverse along that link. In fact, such lower-level paths are not known in advance, even after a link is determined.

Instead, these lower-level paths are determined dynamically by the distributed routing algorithms implemented within the intermediate routing nodes themselves. Thus, the determination of each link between a pair of user nodes results (for each packet of data) in one of many different lower-level paths among intermediate routing nodes along that link, each of which may experience network congestion to a different extent.

It should also be noted that the distribution of information inherently involves the "relaying" of that information from one node to another—i.e., from a "parent" node to a "child" node—whether such nodes are overlay nodes or intermediate routing nodes (or connected wirelessly or via physical cables). For example, the overlay path referenced above (from node A to node C) involves the relaying of information via node B. Similarly, the individual link between node A and node B results in the relaying of information by various intermediate routing nodes on the underlying network along the A→B link.

As a practical matter, in order to relay information, a node first receives that information and then replicates it before transmitting it to other nodes-a process that inherently requires some amount of time to complete, and thus introduces a period of delay. This period of delay may increase and decrease over time as a result of changing network congestion, including internal congestion within a node itself. For example, a node may introduce delay when it performs multiple internal tasks (e.g., playing a game or recalculating a spreadsheet) that place demands on its processor(s), memory and other computing resources, which in turn affects its ability to relay information to other nodes. Intermediate routing nodes are particularly prone to introducing delays because they are routinely shared among multiple applications.

In the context of routing packets on the Internet, physical distance (or geographic proximity) among nodes does not significantly impact performance because packets travel near the speed of light. Average speed or total throughput along a path, however, is affected by the number of stops or roadblocks encountered along that path, or in this context the number of hops encountered at intermediate routing nodes that relay information from a source node to a destination node. Thus, two nodes can be said to be "nearby" each other (in "network proximity") if they are only a relatively few hops apart, regardless of their geographic proximity.

While network proximity can be a factor in determining throughput along a link between two user nodes, it is not determinative for a number of reasons. For example, the source or destination node, or any intermediate routing node along that link, may experience congestion or other problems that introduce a variable amount of delay. User nodes participating in multiple standalone or network applications simultaneously may become congested, impacting their performance in receiving, consuming and relaying information. Delays also may result from failures in the physical cables interconnecting nodes along that link.

As a result, network congestion (particularly at one or more intermediate routing nodes) may significantly affect the overall travel time or throughput between any pair of source and destination nodes. For example, a 6-hop path along a link between a pair of user nodes may be faster than a 4-hop path as a result of delays due to network congestion at an intermediate routing node encountered only along the 4-hop path.

In short, network congestion has many causes. As illustrated above, the performance of any network node or pair of interconnected nodes (including user nodes as well as intermediate routing nodes) may be impacted by network congestion—whether due to internal demand, operational delays or failures within a node, congestion resulting from traffic to and from other nodes, or other causes. Moreover, because congestion on an underlying network such as the Internet is subject to a great deal of volatility as network traffic ebbs and flows, such congestion is difficult to isolate and measure at any given time, and particularly difficult to forecast even on a near-term basis.

When a single company such as Netflix accounts for over one-third of peak Internet traffic, other companies that distribute digital information over the Internet must somehow address the increasingly volatile nature of Internet congestion if they have any hope of satisfying their goals of reliably consistent performance (however they define such goals). Similarly, as mobile voice and data usage soars, the limited availability of regulated RF spectrum is of particular concern to companies developing high-bandwidth mobile applications.

The problem of forecasting network congestion is analogous to that of forecasting traffic congestion at the intersecting junctions of shared roads and freeways in increasingly populated areas. While existing GPS navigation and traffic control systems measure current congestion at these junctions and calculate alternative paths to reroute individual drivers around such congestion, their ability to predict desirable paths for any particular driver is hampered by the volatile nature of traffic congestion.

Before examining how different existing overlay network architectures approach the problem of network congestion, it is helpful to understand how the underlying architecture of the Internet plays a significant role in exacerbating the problem.

B. Underlying Internet Architecture

Beginning with ARPANET (the earliest packet-switching network to implement the Internet protocol suite, or TCP/IP), and later NSFNET, the Internet "backbone" was designed to be a redundant "network of networks" (i.e., the Internet) that afforded reliability and "resiliency" by decentralizing control and providing alternative communication paths for information to reach its desired destination. Yet, with packets following different paths through shared network resources such as intermediate routing nodes, an application's ability to maintain consistent performance remains an extremely difficult problem.

This fundamental tradeoff between the resiliency afforded by decentralized routing control and the desire for consistent performance lies at the heart of the Internet's network congestion problem, as evidenced by the evolution of the topology of the Internet over time. This topology can perhaps best be described as a routing hierarchy encompassing multiple different types of networks.

At the core of this routing hierarchy lies a group of interconnected networks each of which is often referred to as an "autonomous system" (AS). As described in Wikipedia, each AS consists of a collection of connected IP routing prefixes (ranges of IP addresses) "under the control of one or more network operators on behalf of a single administrative entity or domain that presents a common, clearly defined routing policy to the Internet." Each AS is assigned an "autonomous system number" (ASN) by which it is uniquely identified on the Internet for routing purposes.

Each of these core networks is referred to herein interchangeably as an AS or an ASN. The number of these networks has grown dramatically in recent years, from approximately 5000 fifteen years ago to over 50,000 across the world today. Together, these networks can be said to form the "backbone" of the Internet in that they exist primarily to propagate or relay substantial amounts of information among themselves and ultimately to various destination user nodes in virtually every country in the world.

Because different companies own these core networks, they often enter into "peering" agreements with one another to facilitate the routing of Internet traffic across these networks and throughout the global Internet. Each AS network utilizes a bank of routers (intermediate routing nodes) often referred to as a "peering point" to control access to another AS network, employing a routing protocol known as the "border gateway protocol" or BGP (as distinguished from the various routing protocols employed by "intra-AS" intermediate routing nodes). Any given AS may employ multiple peering points to connect to one or more other AS networks. Interconnected AS networks may be geographically adjacent, or may be far apart, connected via long fiber trunks spanning great distances (e.g., across countries and even oceans).

As a substantial portion of the network traffic on the Internet passes through the intersections or "junctions" of the largest of these interconnected AS networks, the peering points of these AS networks experience a great deal of network congestion—not unlike traffic congestion at the junctions of major freeways during rush hour. It should be noted, however, that significant network congestion also occurs at the intra-AS intermediate routing nodes within these networks.

In addition to providing intermediate routing nodes that perform inter-AS and intra-AS routing, many AS networks also include a special type of intra-AS "gateway" intermediate routing node provided by entities known as "Internet Service Providers" (ISPs). These ISP gateway intermediate routing nodes provide a gateway to the Internet for the various networks of user nodes that distribute and consume the digital content associated with the wide variety of applications available on the Internet. When a user node connects to the Internet via the gateway node provided by its ISP, that user node can be said to have a "network location" within the AS network containing its gateway intermediate routing node.

AS networks that do not include such gateway nodes are often referred to as "private backbone" networks, as opposed to "public" networks that service (user node) customers. Many operators of large public networks (such as major ISPs) also own private backbone networks (connected to their own public networks and/or those owned by others) to facilitate their routing of significant Internet traffic.

It is important to note, however, that the intermediate routing nodes (e.g., intra-AS routers, including gateway routers, and inter-AS BGP routers) provided by AS networks are not the original source or ultimate destination of information generated by and distributed among user source and destination nodes. These intermediate routing nodes are instead "conduits" designed to relay substantial amounts of information among themselves for the ultimate purpose of distributing information provided by various source user nodes among assorted destination user nodes located across the Internet. These distinctions are illustrated in FIG. 1A below.

Graph 100a of FIG. 1A illustrates an architectural view of the Internet, consisting of a set of public AS networks 110a. Each AS network (110a-1-110a-8) contains two sets of intermediate routing nodes, including Inter-AS Routers (BGP routers) 115a that interconnect and relay information among those AS networks 110a, as well as Intra-AS Routers 125a (including gateway routers provided by ISPs) that relay information within each AS network 110a.

User Nodes 130a connect to the Internet via the subset of Intra-AS Routers 125a known as gateway routers. User Nodes 130a represent the source and destination nodes that participate in (and/or provide the underlying functionality of) the various shared applications that run on top of the Internet. With respect to a particular application, such User Nodes 130a can be considered overlay nodes (also referred to as "application nodes") that make up an overlay network associated with that particular application. This overlay network runs on top of the Internet's underlying infrastructure—i.e., the two sets of intermediate routing nodes 115a and 125a within and often across various AS networks 110a.

As noted above, User Nodes 130a can be distinguished from intermediate routing nodes 115a and 125a that neither consume nor provide content as part of any such application. And, as discussed below, one type of overlay network architecture ("edge-based") consists of nodes that, while not technically part of the Internet's underlying architecture, nevertheless perform a role more akin to intermediate routing nodes than to user nodes as referenced herein.

C. Overlay Network Architectures

As discussed above, overlay networks are built on top of underlying networks, such as the Internet. One purpose of overlay networks is to address underlying network congestion. For example, network congestion at intermediate routing nodes along a particular link between two overlay nodes can be addressed by reconfiguring the overlay network to effectively "route around" or bypass such congestion (e.g., by replacing the parent or child node of that link).

As a result of underlying network congestion, many applications experience interruptions and delays that negatively impact a user's "quality of experience" (QoE)—i.e., a user-centric or application-level view of the quality of an application's performance. In a broadcast video application, for example, factors such as dropped frames and rebuffering events, among others, may have an effect on a user's QoE. Moreover, a drop in QoE is often due in large part to the inability of the underlying shared infrastructure of the Internet to deliver a consistent "quality of service" (QOS)—i.e., a measure of performance based on network-centric metrics, such as throughput, latency and jitter.

Whether performance is assessed at a network-centric level of abstraction and/or at a higher (application-specific) level of abstraction reflecting the experience of the user of an application, various attributes of nodes and links traversed by data along any particular path within an overlay network can be measured over time. We refer to such attributes generally herein as metrics.

In this context, metrics also include "external" indicators of the impact on those nodes and links resulting from other applications and events on the underlying network (e.g., increased traffic and delays due to the Super Bowl or other popular bandwidth-intensive events, network outages in a particular area of the network, etc.). Such information may, for example, be obtained directly by monitoring network traffic over time, or indirectly from third parties that monitor Internet traffic and occasionally build regional or global Internet "traffic maps" revealing specific traffic patterns over time.

During any given period of time, with respect to a particular "content item" distributed in connection with an application, an associated "overlay network topology" can be defined as the set of overlay nodes, along with the set of links interconnecting them, over which the content item (or a portion thereof) is distributed and consumed. Moreover, the performance of that overlay network topology (and its component nodes and links) can be expressed as an application-specific function of a set of metrics.

During that period of time, the performance of the current overlay network topology may or may not satisfy defined "performance criteria", which can be expressed as an application-specific set of performance constraints. In the event the performance criteria are not satisfied (e.g., due to underlying network congestion), one could elect to reconfigure the overlay network topology by changing one or more of its links, which in turn will result in changes to the lower-level paths that the content item will traverse (potentially bypassing network congestion).

While there exist many different approaches to address the problem of network congestion on the Internet, these approaches can broadly be categorized into two distinct types of overlay network architectures.

1. Edge-Based Overlay Networks

One such architecture comprises what are referred to herein as "edge-based" overlay networks, which involve the use of additional dedicated hardware (known as edge routers or edge servers—used interchangeably herein) distinct from the user nodes that originate and consume application content. In other words, user (source and destination) nodes are not considered part of an edge-based overlay network. Instead, the overlay nodes are the edge servers themselves (as a group often referred to as a "content delivery network" or CDN).

Applications may utilize the edge servers of a CDN to provide alternative "CDN paths" along any given link (from a source user node to a destination user node) for the purpose of addressing network congestion at the lower-level intermediate routing nodes along that link. However, as will become apparent below, these alternative CDN paths address network congestion only with respect to links that pass through the CDN.

Given that user nodes of an application may be widely dispersed on the Internet, and that network congestion can occur virtually anywhere, the edge servers of a CDN are typically located strategically at the "edges" of AS networks throughout the Internet, thereby facilitating alternative CDN paths to user nodes "close to" (in network proximity of) one or more of the edge servers provided by the CDN. Moreover, a CDN frequently "caches" content at those edge servers in order to reduce the number of links required along overlapping CDN paths.

For example, graph 100b of FIG. 1B illustrates an architectural view of an edge-based overlay network—shown running on top of the underlying architecture of the Internet, including individual AS networks 110b-1, 110b-2 and 110b-3. For simplicity, the Inter-AS and Intra-AS intermediate router nodes within each AS network 110b are not shown in graph 100b.

Node 120b (in AS network 110b-1) represents a "source" node from which a content item originates and is distributed (via the CDN infrastructure) to various User Nodes 130b throughout the Internet. In the context of a particular application that utilizes (typically shared) CDN infrastructure, the application relies on functionality within the CDN to determine the CDN paths that a content item will traverse from source node 120b to each User Node 130b.

It should be noted that a content item may be divided into "segments" (i.e., component parts) before being distributed from source node 120b (via the CDN infrastructure) to various User Nodes 130b. In some scenarios, multiple source nodes are employed to distribute different content items, or segments of an individual content item. As alluded to above, even an individual segment of a content item may be further divided into IP packets that are routed along different lower-level paths through various intermediate routing nodes.

In any event, because it is inefficient for source node 120b to directly distribute content to each distinct User Node 130b, functionality within the CDN infrastructure of the edge-based overlay network (i.e., the CDN edge-server overlay nodes 125b) is employed to relay content from source node 120b to the User Nodes 130b via those overlay nodes 125b. In other words, with respect to each destination User Node 130b (such as destination User Node 130b-DEST), the CDN determines a CDN path to that destination User Node 130b-DEST that consists of a set of parent-child "CDN links" between pairs of the individual CDN edge-server overlay nodes 125b (labeled A through I).

For example, the dashed arrows in graph 100b illustrate a current CDN path from source node 120b to one particular destination User Node 130b—i.e., node 130b-DEST. This CDN path consists of the following 5 parent-child CDN links (including source node 120*b* and destination User Node 130*b*): 120*b*→A, A→B, B→F, F→H and finally H→130*b*-DEST.

If the CDN detects congestion along the current CDN path (e.g., due to congestion along the B→F CDN link, including the lower-level intermediate routing nodes along that link), then the CDN may generate an alternative CDN path to bypass that detected congestion.

For example, an alternative CDN path (illustrated by the solid arrows) consists of the following 8 parent-child CDN links (also including source node 120*b* and destination User Node 130*b*): 120*b*→A, A→B, B→C, C→D, D→E, E→G, G→H and finally H→130*b*-DEST. This alternative 8-link CDN path might yield faster throughput from source node 120*b* to destination node 130*b*-DEST than does the current 5-link CDN path (e.g., because it bypasses the problematic B→F CDN link).

While a CDN may be able to detect the overall throughput of various alternative CDN paths, it should be noted that the CDN may be unable to detect the precise cause of the resulting network congestion. For example, network congestion in the current CDN path might be caused by the individual B or F overlay nodes 125*b* themselves, or by a particular intermediate routing node along the problematic B→F CDN link (selected by lower-level distributed routing algorithms along the B→F link).

In any event, the alternative CDN path may achieve greater throughput because it does not include (and thus bypasses) the problematic B→F CDN link—even if the CDN functionality is "unaware" of the fact (much less the reason) that a particular overlay node 125*b* or intermediate routing node along the B→F link is responsible for this network congestion.

In the example above, the overall throughput of alternative CDN paths is one measure of the performance of those CDN paths. Yet, in the context of comparing the performance among multiple CDN paths, it also serves as an indirect indicator of the impact of network congestion on such performance. In this example, overall throughput may be sufficient to enable the CDN to select the alternative 8-link CDN path as yielding better performance than the current 5-link CDN path. In other scenarios, additional indirect indicators of the performance impact of network congestion (i.e., other metrics) may be employed to facilitate this comparison of alternative CDN paths.

Moreover, by caching content at various individual edge servers, the CDN may generate multiple overlapping CDN paths (from a source user node) with fewer overall CDN links to certain destination User Nodes 130*b* by leveraging this cached content—e.g., by leveraging the fact that content is cached at one of the CDN edge-server overlay nodes 125*b*, and thus not requiring a set of CDN links originating at the source node 120*b*.

In short, edge-based overlay networks include a set of overlay nodes (edge servers 125*b*) that enable the CDN routing functionality to define alternative edge-based CDN paths (to destination User Nodes 130*b*) by defining alternative sets of CDN links between pairs of its overlay nodes 125*b* (such as the alternative CDN paths illustrated by the respective sets of dashed and solid arrows in graph 100*b*). However, the reliance by applications on a shared edge-based overlay network results in a number of disadvantages.

For example, the cost of purchasing or leasing additional physical infrastructure (CDN edge-server overlay nodes 125*b*) may be prohibitive. Edge servers are typically expensive computer servers with high-bandwidth connections placed at numerous strategic locations at the "edges" of various AS networks 110*b* (e.g., to accommodate large numbers of User Nodes 130*b* throughout the Internet).

To make edge-based overlay networks more cost effective, edge servers are often shared among various applications provided by multiple entities. As a result, these applications must share the edge servers 125*b* (with one another and even among the User Nodes 130*b* of an individual application) to accommodate overlapping CDN paths to the various destination User Nodes 130*b*. As a result, edge-based overlay networks may actually introduce network congestion and exacerbate the very problem they are designed to solve.

Moreover, because edge-based overlay networks do not utilize User Nodes 130*b* as overlay nodes, their alternative CDN paths rely on CDN edge-server overlay nodes 125*b* that do not consume content (as do destination User Nodes 130*b*). For example, content destined for any User Node 130*b* must pass through the CDN (and its edge-server overlay nodes 125*b*) in order to leverage the CDN's functionality.

In other words, the additional infrastructure (edge servers) provided by a CDN exists essentially to "route" (and not consume) content-more akin to the lower-level intermediate routing nodes that are part of the underlying architecture of the Internet. As a result, edge-based overlay networks require additional computing resources to distribute content among User Nodes 130*b*, which may itself introduce delays and other inefficiencies.

In essence, edge-based overlay networks provide a less direct method of addressing network congestion than do "peer-based" overlay networks (discussed below), and actually contribute to network congestion by adding shared resources to the Internet ecosystem that are not directly involved in the consumption of content.

2. Peer-based Overlay Networks

An alternative architecture, comprising what are referred to herein as "peer-based" overlay networks, employs a significantly different approach from an edge-based architecture. Instead of relying on additional infrastructure (edge servers) to distribute content to destination user nodes, a peer-based approach leverages the resources of existing destination user nodes (that receive and consume content) to relay content among themselves. In other words, in a peer-based overlay network, the destination user nodes are the overlay nodes.

Thus, a "peer-to-peer" (P2P) approach leverages the resources of selected destination user nodes (existing "capacity") not only to receive and consume content, but also to relay that content to other destination user nodes. We refer to these types of overlay nodes herein as "peer nodes" (of a peer-based overlay network) because they may relay content to other such peer nodes. As noted above, such nodes are also sometimes referred to as "application nodes" because they consume content in connection with a particular application (or individual content item).

Peer-based overlay networks can be implemented in many different types of physical and logical network topologies (including stars, rings, trees, meshes and virtually any type of graph). Existing peer-based overlay networks have been employed for many different types of applications, such as file transfer, "video-on-demand" (VOD), audio and video streaming, live video broadcasting and various other content distribution applications.

For example, graph 100*c* in FIG. 1C illustrates a tree-based topology in which content from source node 120*c* is distributed directionally from one peer node (User Node 130*c*) to another, such that all User Nodes 130*c* (located throughout the Internet, including AS Networks 110c—individually illustrated as 110c-1-110c-3) ultimately receive and consume the content. Unlike the edge-based overlay network illustrated in FIG. 1B, the overlay nodes in graph 100c are the User Nodes 130c themselves—i.e., the nodes that receive and consume the content.

Moreover, many of these User Nodes 130c also relay content to other User Nodes 130c (as distinguished from "leaf nodes" that only receive and consume content). The various parent-child links in FIG. 1C are links between pairs of User Nodes 130c, unlike the links in FIG. 1B which are CDN links between pairs of edge servers or other additional infrastructure that is not part of the application itself. By leveraging the resources of the User Nodes 130c themselves (peer-based overlay nodes) to relay content, a peer-based network facilitates the distribution of that content among the destination User Nodes 130c that consume that content—without requiring any additional external bandwidth or other resources such as those provided by the shared edge servers of an edge-based overlay network (CDN).

For example, a peer-based overlay path from source node 120c to User Node 130c-DEST (illustrated by the dashed arrows) comprises the following three parent-child links: 120c→A, A→B, and finally B→130c-DEST. A subset of this same peer-based overlay path (e.g., the single link from A→B) can also be employed to distribute content for consumption by other User Nodes 130c (e.g., node B) without requiring an alternative overlay path from source node 120c, or any additional infrastructure beyond that of the User Nodes 130c themselves.

The remaining User Nodes 130c are serviced by other peer-based overlay paths, and subset links thereof (illustrated by the solid arrows), in which "peer-to-peer" relays are employed to leverage the otherwise unused resources of those individual peer User Nodes 130c—e.g., to cache content temporarily and relay that content to other peer nodes as part of alternative peer-based overlay paths. As a result, peer-based overlay networks tend to be more resilient and scalable than edge-based overlay networks in that their distributed nature facilitates recovery from individual points of congestion (including device or cabling failures)—e.g., by distributing content via other peer nodes in order to bypass such congestion.

The reliability and performance of peer-based networks actually improve as more nodes are added, and more and better alternative overlay paths become available—as contrasted with edge-based networks in which the additional physical infrastructure (edge servers) must be "load-balanced" to accommodate changing bandwidth demands (e.g., as user nodes are added and removed, and different types of content items are deployed by various applications).

While peer-based overlay networks avoid the need for the expensive additional infrastructure inherent to edge-based architectures, existing peer-based solutions have yet to effectively bypass underlying network congestion. This problem is particularly prevalent when a large number of peer nodes attempt to access a popular content item (or even various different content items) during the same time period.

Existing peer-based overlay networks are typically reconfigured only to the extent necessary to address the addition or removal of nodes—i.e., to accommodate the "current" set of peer nodes. New links are created to add new nodes to the system as well as to address "broken" links resulting from nodes leaving the system. If a departing node is a leaf node, the link to that node is removed. But if that departing node is a parent node that previously relayed content to a child node, that child node becomes an "orphaned" child node in need of a new parent node, which requires the creation of a new link.

It is desirable, however, to reconfigure the topology (whether by making partial modifications or effectively determining a new topology) not only when peer nodes are added or removed, but also when (and ideally before) network congestion negatively impacts the performance of the peer-based overlay network topology, including its individual nodes and links. In other words, to limit the impact of network congestion on performance, it is desirable to reconfigure a peer-based overlay network topology to effectively bypass detected (as well as prospective) network congestion while satisfying an application's performance criteria.

D. Need for an Adaptive Overlay Network Architecture

But the task of determining which user nodes should relay content to which other user nodes (in order to satisfy defined application-specific performance criteria) is a daunting one, particularly as the number of permutations rises exponentially with the number of user nodes added to an overlay network. To appreciate the difficulty of this task, it is important to recognize, as alluded to above, that metrics collected over time serve only as indirect indicators of the impact of network congestion on the performance of overlay network topologies.

In other words, metrics are not direct measurements of network congestion. Instead, they reflect the impact of network congestion on the flow of network traffic. While network congestion affects the performance of an overlay network topology (and its component nodes and links), it is the impact of network congestion on such performance that determines whether that overlay network topology satisfies defined performance criteria. Historical metrics provide data from which that impact can be measured and predicted. Existing overlay network architectures have yet to address network congestion in a manner that correlates metrics with the performance of alternative overlay network topologies.

It should be noted that network congestion is but one obstacle in assessing the potential performance of an overlay network topology. Another (often overlooked) obstacle is the existence of "interdependencies" among the nodes and links of an overlay network topology. These interdependencies exacerbate this problem—even apart from the effects of frequently changing network congestion.

Even assuming static network congestion, the prospective performance of individual nodes and links of any particular overlay network topology is dependent upon that of "upstream" nodes and links. In particular, the performance of a link from a parent node to a child node is dependent upon the upstream performance of the link to that parent node. For example, if a node receives content from its parent node at a particular rate (e.g., 500 kbps), it cannot relay that content to its child node at a higher rate (e.g., 1 mbps). As discussed in greater detail below, however, it may have the "capacity" to replicate and relay content simultaneously to multiple child nodes (at a rate of up to 500 kbps to each such child node).

Current peer-based approaches (as well as edge-based approaches) have yet to address these interdependencies among the individual user nodes and links of an overlay network topology over which content items are distributed and consumed. They also have failed to effectively address the problem of underlying network congestion in a manner that facilitates the reconfiguration of overlay network topologies—i.e., the determination of whether alternative overlay network topologies will satisfy the performance criteria constraints imposed by applications on the distribution and consumption of content items.

Existing peer-based overlay networks (like GPS navigation systems) tend to rely on geographic proximity to select peer relay nodes, and "reroute" traffic only "after the fact" in response to detected network congestion. Edge-based overlay networks rely on expensive external physical infrastructure (akin to building a network of freeways to provide higher-speed alternative routes) that also fails to adequately address the problem of frequently changing network congestion in a manner that satisfies the performance criteria defined by various applications running on top of the shared infrastructure of an underlying network such as the Internet.

There is thus a need to take such dependencies into account in evaluating alternative overlay network topologies in light of an application's performance criteria—whether network congestion is assessed reactively or prospectively.

In short, what is needed is an adaptive overlay network architecture that addresses frequently changing network congestion in a manner that reflects the fact that the prospective performance of individual nodes and links is dependent upon that of upstream nodes and links, and determines an overlay network topology that will satisfy defined application-specific performance criteria—not only as nodes are added and removed, but also when (and ideally before) network congestion negatively impacts the performance experienced by destination user nodes.

SUMMARY

As noted above, it is well established that underlying network congestion throughout the Internet impacts the performance of applications distributing digital content via overlay networks. As demand for content changes over time, and often exceeds the supply or capacity of available shared resources to distribute such content throughout the Internet, such changing demand results in varying levels of network congestion. Moreover, such demand for content (by individual nodes or aggregated across all nodes) includes demand outside of any particular overlay network (i.e., "external" demand) as well as demand for particular content within an overlay network (i.e., "internal" demand).

It should be noted that, with respect to the relaying of content within an overlay network, external demand affects the "net" capacity of the nodes and links within that overlay network to distribute that content. Yet such external demand (i.e., the difference between "gross" and "net" capacity) is not known and thus cannot be measured directly. Moreover, it also changes over time. By measuring and predicting net capacity as it changes over time due to changing external demand, the effects of changing external demand (including gross capacity) can be inferred.

The present invention provides an adaptive overlay network architecture that overcomes the deficiencies of existing approaches by addressing the fact that, during any given period of time, the performance of an overlay network topology (and of its individual nodes and links) is dependent not only on underlying network congestion (resulting from internal as well as external demand), but also on the configuration of the particular overlay network topology employed during that time (which produces upstream and downstream dependencies among the nodes and links of that overlay network topology). The present invention reconfigures the current overlay network topology over time, not only to accommodate nodes that have been added to and removed from the network, but also to improve performance while satisfying defined performance criteria.

In one embodiment, the present invention addresses frequently changing external demand in part by measuring the effects of resulting network congestion on the performance of individual nodes and links of an overlay network topology. It uses such measurements to predict the net capacity of specified nodes and links of a prospective overlay network topology to relay content. In particular, this net capacity ("node-relaying capacity") of a prospective parent node reflects the node's ability (in light of external demand) to satisfy the internal demand from one or more child nodes simultaneously, while the net capacity ("link-relaying capacity") of a specified link reflects the link's ability (in light of external demand) to satisfy the internal demand from the specified child node of that link.

For example, the performance of a link (A→B) in which parent node A relays content to a child node B may be impacted by underlying network congestion, such as that caused by intermediate routing nodes along the link from parent node A to child node B. Assuming a demand of 5 mbps by child node B, if parent node A satisfies that demand (i.e., by delivering content to child node B at 5 mbps), then the A→B link can be said to have exhibited 5 mbps link-relaying performance (an indicator of link-relaying capacity). Alternatively, if parent node A fails to satisfy that demand (e.g., by delivering content to child node B at 3 mbps), then the A→B link can be said to have exhibited 3 mbps link-relaying performance.

It should be noted that, in the latter case, the failure of parent node A to satisfy the demand of a particular child node (child node B) may result from various factors, alone or in combination. For example, such failure may result from a downstream dependency, such as network congestion along the A→B link. It may also result from factors within parent node A itself (e.g., node A's performance of other activities, such as playing a bandwidth-intensive game). Moreover, such failure may result from upstream dependencies (e.g., node A's parent node delivering content to node A at 3 mbps).

To facilitate the assessment of such interdependencies among the nodes and links of a prospective overlay network topology, the present invention also considers the node-relaying capacity of prospective parent nodes. For example, in one embodiment, if parent node A currently relays content to three child nodes simultaneously (along the A→B, A→C and A→D links), then parent node A can be said to have exhibited node-relaying performance equal to the sum of the link-relaying performance of those three links. As discussed in greater detail below, parent node A's actual link-relaying capacity may even have been higher.

As alluded to above, because nodes can replicate and relay content simultaneously to multiple child nodes, a node receiving content at 5 mbps may have the capacity to relay content to multiple child nodes (at 5 mbps each) simultaneously. However, various factors may limit the node-relaying capacity of a node.

For example, a node with a 5 mbps node-relaying capacity to two child nodes may not be able to relay content simultaneously (at 5 mbps each) to any two child nodes. For example, if the A→B link has a 3 mbps link-relaying capacity, then node A can still only relay content to child node B at 3 mbps (e.g., due to downstream dependencies along the A→B link).

As discussed in greater detail below, the present invention relies on both the node-relaying capacity and link-relaying capacity of nodes and links of a prospective overlay network topology to identify an overlay network topology that satisfies defined performance criteria (such as a 5 mbps demand from each destination node). In doing so, the present invention addresses frequently changing network congestion as well as the interdependencies among the nodes and links of any prospective overlay network topology.

In this regard, the present invention leverages the monitoring and processing of real-time metrics reflecting the performance of the nodes and links of the overlay network topologies along which content items are propagated. As alluded to above, during any given period of time, the current real-time metrics serve as indirect indicators of the impact of network congestion on the performance of the individual nodes and links of the current overlay network topology. Such metrics also indirectly reflect the result of upstream and downstream dependencies produced by the configuration of the current overlay network topology (as well as attributes inherent to the nodes and links themselves).

In one embodiment, a "metrics processor" processes raw metrics associated with prospective nodes and links of an overlay network topology and provides such processed metrics to a "prediction engine" (along with a metric "timestamp" reflecting the time period during which such raw metrics were observed and collected). The prediction engine includes a "node-relaying classifier" that predicts the node-relaying capacity of specified prospective parent nodes and a "link-relaying classifier" that predicts the link-relaying capacity of prospective links.

The metrics processor generates, as inputs to the node-relaying classifier, one or more "node metrics" which represent node-relaying attributes of prospective parent nodes—i.e., indicators of the ability of a node to relay content to one or more child nodes. In one embodiment, node metrics include CPU load, memory usage, operating system, connection type, uplink and downlink speed, IP address, ISP, ASN and various other node-relaying attributes of a prospective parent node. In other embodiments, node metrics include various additional metrics (e.g., dropped frames and rebuffering events, among others) to the extent they reflect (even indirectly) the node-relaying performance of a prospective parent node. It will be apparent to those skilled in the art that fewer or additional metrics can be employed without departing from the spirit of the present invention.

In connection with the training of the node-relaying classifier, the metrics processor also generates corresponding outputs with respect to a prospective parent node (e.g., during each sample time period) that reflect the current observed node-relaying performance of that parent node. In one embodiment, only a particular subset of observed training samples—e.g., those that are capacity-limited) is provided to the node-relaying classifier. For example, if a parent node (node A) simultaneously delivered 5 mbps to child node B and only 3 mbps to child node C during a particular time period, then a "training sample" with respect to parent node A would include (as inputs to the node-relaying classifier) the node metrics associated with node A (along with a timestamp reflecting the time period which those node metrics were obtained) and (as outputs to the node-relaying classifier) the sum of the observed node-relaying performance of node A (e.g., 8 mbps). In other embodiments, multiple outputs are provided for each set of inputs (node metrics), and a predefined function is employed (in one embodiment) to calculate a single value representing the parent node's current node-relaying performance.

As described below, the node-relaying classifier is trained by comparing the observed outputs of each selected training sample to the predicted node-relaying capacity generated by the node-relaying classifier. The "error" between these predicted and observed values are used to adjust weighted parameters over time to facilitate increasingly more accurate predictions—as the node-relaying classifier learns the relationships between the node metrics of parent nodes and their node-relaying performance with respect to their child nodes. In this manner, the node-relaying classifier can predict the node-relaying capacity of a specified prospective parent node even if that parent node does not currently have, or perhaps never had, any child nodes.

Similarly, the metrics processor generates, as inputs to the link-relaying classifier, one or more "link metrics" which represent link-relaying attributes of prospective links—i.e., indicators of the link's ability to deliver content to the child node of that link. In one embodiment, link metrics include the roundtrip "ping" time along the link, latency, jitter, and other link-relaying attributes of the link. In other embodiments, link metrics include relative node metrics regarding the parent and child of the link, such as their relative connection type, uplink and downlink speed, IP address, ISP, and ASN.

In connection with the training of the link-relaying classifier, the metrics processor also generates corresponding outputs with respect to a given link (e.g., during each sample time period) that reflect the current observed link-relaying performance of that link. In one embodiment, only a particular subset of observed training samples—e.g., those that are capacity-limited) is provided to the link-relaying classifier. In the example noted above, in which a parent node (node A) simultaneously delivered 5 mbps to child node B and only 3 mbps to child node C, then a training sample output associated with the A→C link would be 3 mbps—reflecting that link's current link-relaying performance. Note that the corresponding set of link metric inputs includes link metrics associated with that A→C link. In another embodiment, additional training samples would include link metric inputs associated with the A→B link, along with corresponding outputs relating to the current link-relaying performance of that A→B link (5 mbps in this example).

The link-relaying classifier of the prediction engine is trained in a similar manner to that of the node-relaying classifier, in that the predicted link-relaying capacity generated by the link-relaying classifier is compared with the observed outputs of each training sample (with the error between the two used to adjust weighted parameters over time to facilitate increasingly more accurate predictions). Here too, the link-relaying classifier can predict the link-relaying capacity of a specified prospective link even if the specified parent node of that link does not currently relay content (or never has relayed content) to the specified child node of that link.

By learning the relationships between the node and link metrics and the "relay performance" of such nodes and links over time, the prediction engine predicts with increasing accuracy the ability of a prospective parent node to relay content to one or more child nodes, as well as the ability of a prospective link to deliver content to the child node of that link—whether in the context of current or future network congestion.

As noted above, however, the actual performance of individual nodes and links is dependent upon their "placement" within the configuration of a particular overlay network topology. The present invention takes into account these performance interdependencies among the nodes and links of alternative overlay network topologies by providing a "topology selector" that takes as input the "local" node-relaying capacity and link-relaying capacity of specified nodes and links and generates as output an overlay network topology that satisfies defined performance criteria.

In one embodiment, the topology selector extracts the demand imposed by destination nodes from known factors, such as the defined performance criteria and the current overlay network (obtained from monitoring nodes as they join and leave the network). In other embodiments, such demand is predicted by the prediction engine.

Having obtained capacity and demand values for these prospective nodes and links, the topology selector calculates "excess capacity" (i.e., excess relay capacity) of existing and prospective parent nodes and redistributes such excess capacity to satisfy unmet demand on a "global" basis throughout an overlay network topology—thereby generating an overlay network topology that satisfies the defined performance criteria. As discussed in greater detail below, the topology selector (in one embodiment) assesses prospective overlay network topologies based upon the extent to which they effectively redistribute excess capacity to child nodes in need of a new or better parent—i.e., shifting network traffic to satisfy the performance criteria.

In one embodiment, the topology selector performs various transformations to achieve the shifting of network traffic and resulting redistribution of excess capacity. For example, higher-capacity nodes are shifted to higher levels of the overlay network topology, while lower-capacity nodes are shifted to lower levels. Higher-capacity nodes with excess capacity add child nodes, in some cases replacing parent nodes that fail to satisfy the demand of their child nodes. As discussed in greater detail below, various transformations are applied individually, in combination and in many different sequences to achieve the same goal—i.e., identifying an overlay network topology that satisfies the performance criteria.

In one embodiment, the topology selector selects any overlay network topology that satisfies the performance criteria. In other embodiments, the topology selector determines the "optimal" topology—i.e., the one that "best" satisfies (or, in another embodiment, comes "closest" to satisfying) the performance criteria. As discussed in greater detail below, various linear, non-linear and multi-dimensional optimization and/or heuristic algorithms and techniques ("topology-generation methodologies") may be employed without departing from the spirit of the present invention.

In still other embodiments, the topology selector takes into account certain unintended "system-level" consequences of assessing prospective overlay network topologies and/or implementing a particular selected overlay network topology. In other words, although the topology selector may identify a desirable overlay network topology, its use of various resources in performing this task may itself have negative consequences.

For example, in one embodiment, the overhead of simultaneously changing many links from the current overlay network topology is a factor that affects the selection of an overlay network topology. In other embodiments, the frequency with which the current overlay network topology is reconfigured is another factor (as the time to implement a reconfiguration may itself impact network performance). In still other embodiments, the topology selector, despite identifying a "sufficient" or "better" topology, will not replace the current overlay network topology as a result of various tradeoffs of time, performance, memory and other resources. As will be evident to those skilled in the art, various other tradeoffs, optimizations and other techniques may be employed without departing from the spirit of the present invention.

Moreover, the frequency with which the topology selector performs its assessment of prospective overlay network topologies also may vary, depending upon the particular application (or even the content item or type of content item). In some embodiments, the "trigger" that causes the topology selector to assess prospective overlay network topologies is time-based and correlated with the time periods during which metrics are collected. For example, during each one-second time period, metrics are collected, and the topology selector determines which overlay network topology (if any) will replace the current overlay network topology. In other embodiments, the time periods are less frequent than those during which metrics are collected.

In still other embodiments, the trigger is event-based. For example, the topology selector only assesses overlay network topologies when certain specified performance thresholds are met, such as the performance criteria nearing the point of no longer being satisfied by the current overlay network topology.

As noted above, the node-relaying capacity and link-relaying capacity predictions generated by the prediction engine reflect the performance impact of "current" or "future" network congestion. In one embodiment, the prediction engine predicts node-relaying capacity and link-relaying capacity multiple time periods into the future. For example, if metrics are collected every second, node-relaying capacity and link-relaying capacity are predicted ten seconds into the future. In other embodiments, such predictions are based on "current" network congestion, and node-relaying capacity and link-relaying capacity are predicted "zero" seconds into the future.

In the event the topology selector elects to replace the current overlay network topology with another overlay network topology, subsequent segments of the current content item will then be distributed in accordance with the newly selected overlay network topology until such time as that "new current" overlay network topology is replaced.

In still other embodiments, the topology selector is employed in conjunction with a CDN for the purpose of offloading network traffic from the CDN onto specified nodes of an overlay network topology of the present invention. In some of these embodiments, the topology selector identifies an overlay network topology that satisfies defined performance criteria while being optimized for the fewest number of "collectors"—i.e., nodes that are directly connected to the CDN.

In certain such embodiments, the topology selector implements a "sorting and assignment" process that sorts nodes by their node-relaying capacities (to identify nodes that are relatively more capable of relaying content segments to multiple child nodes simultaneously) and assigns links to potential parent nodes based on their link-relaying capacities (to exclude from consideration potential links that fail to satisfy the performance criteria).

Various alternative embodiments of the present invention are explained in greater detail below, including embodiments resulting from design and engineering implementation tradeoffs—e.g., balancing better or optimal solutions against factors such as cost, performance, time and other resources. In one embodiment, the topology selector identifies individual child destination nodes in need of a new parent (based on a threshold performance 'floor") and then selects new parents for such nodes, effectively reconfiguring a portion of the current overlay network topology, rather than determining a "complete" replacement overlay network topology.

DETAILED DESCRIPTION

A. Introduction

Figure 1A:
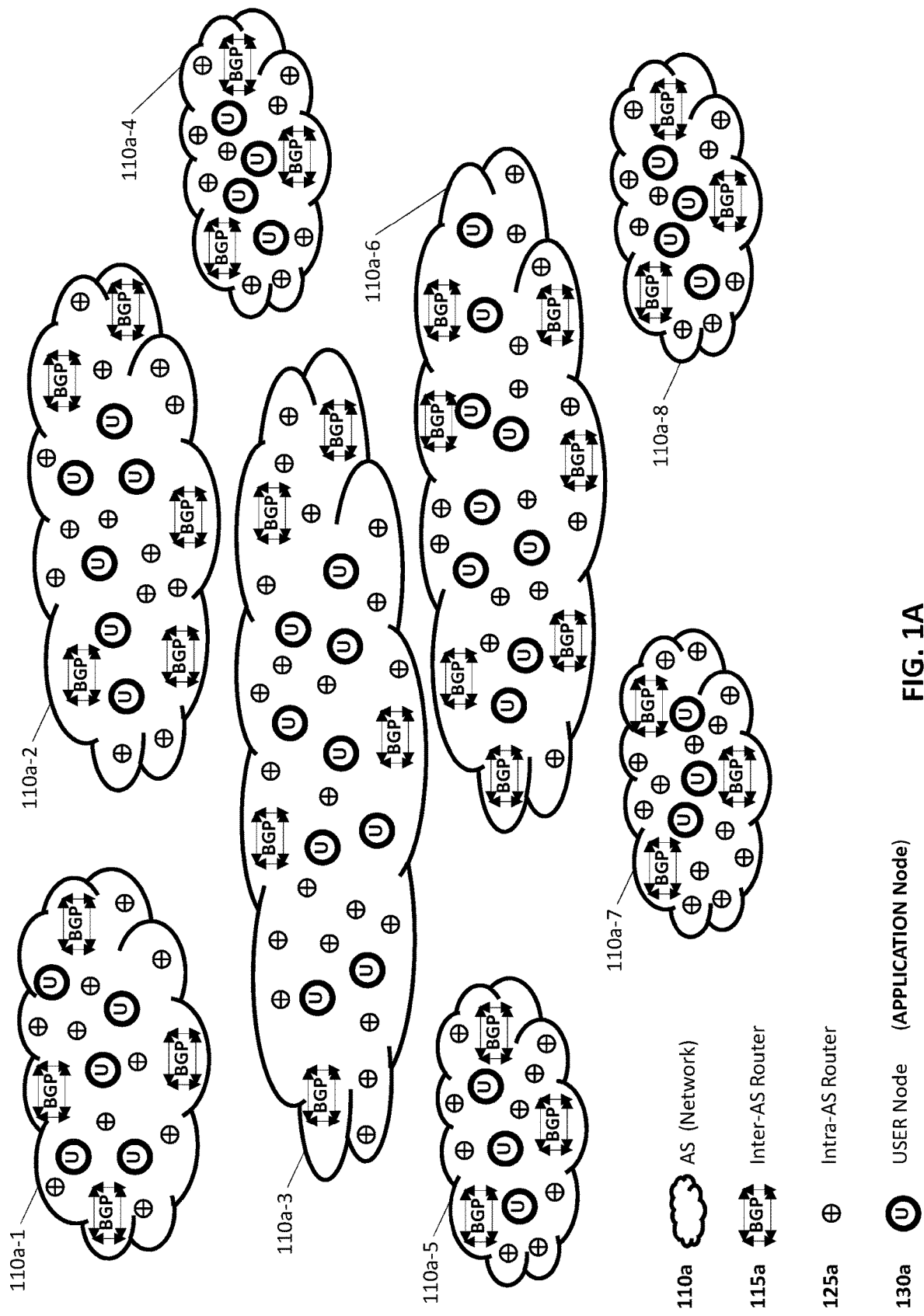
FIG. 1A is a graph illustrating one embodiment of the network architecture of an underlying network of the present invention (i.e., the Internet), including a set of user nodes participating in a particular network application.
Figure 1B:
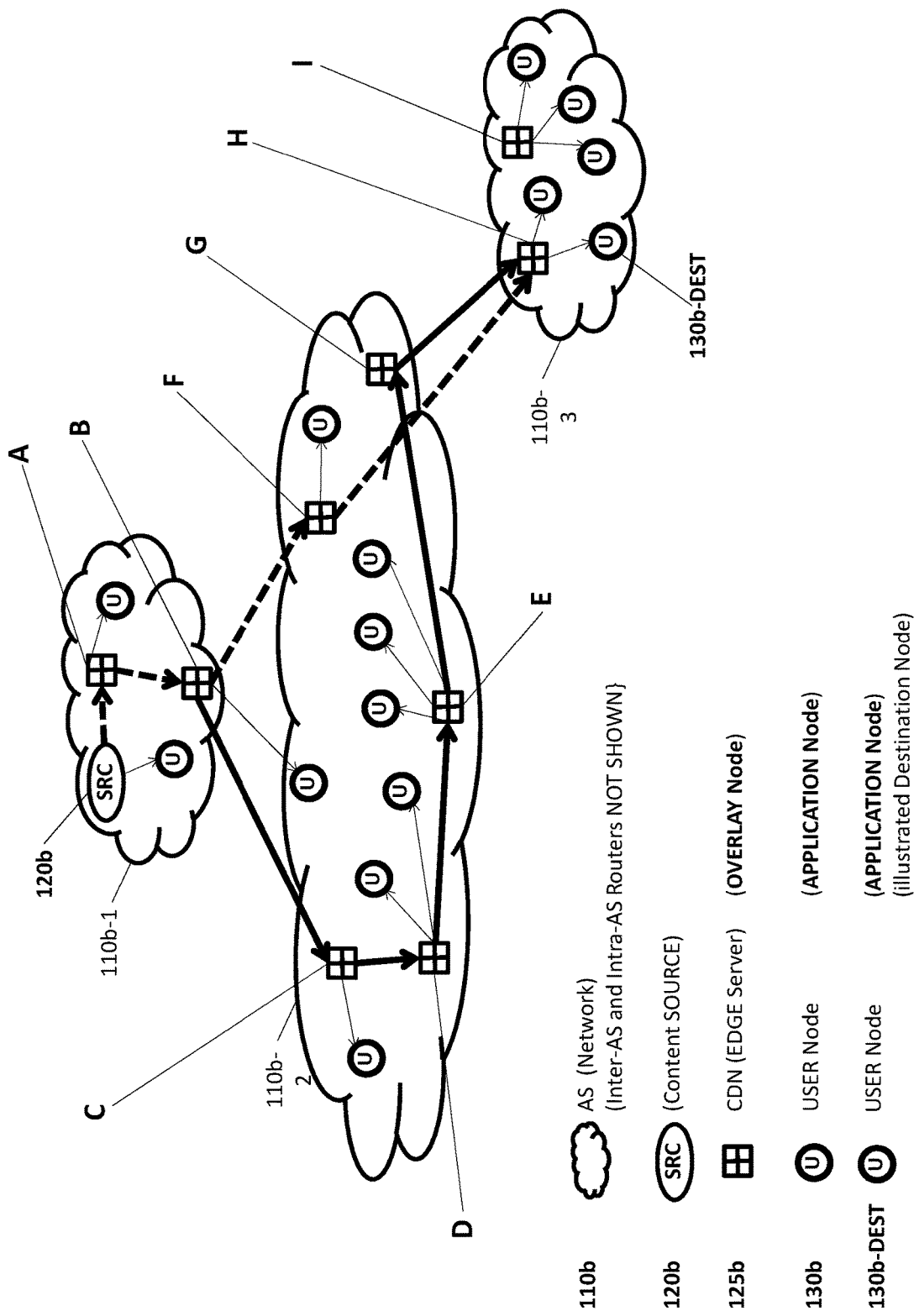
FIG. 1B is a graph illustrating one embodiment of the network architecture of an edge-based overlay network (a content delivery network or "CDN") built on top of the underlying network of FIG. 1A, in which content is distributed to destination user nodes along CDN paths among the overlay nodes (edge servers) of the edge-based overlay network.
Figure 1C:
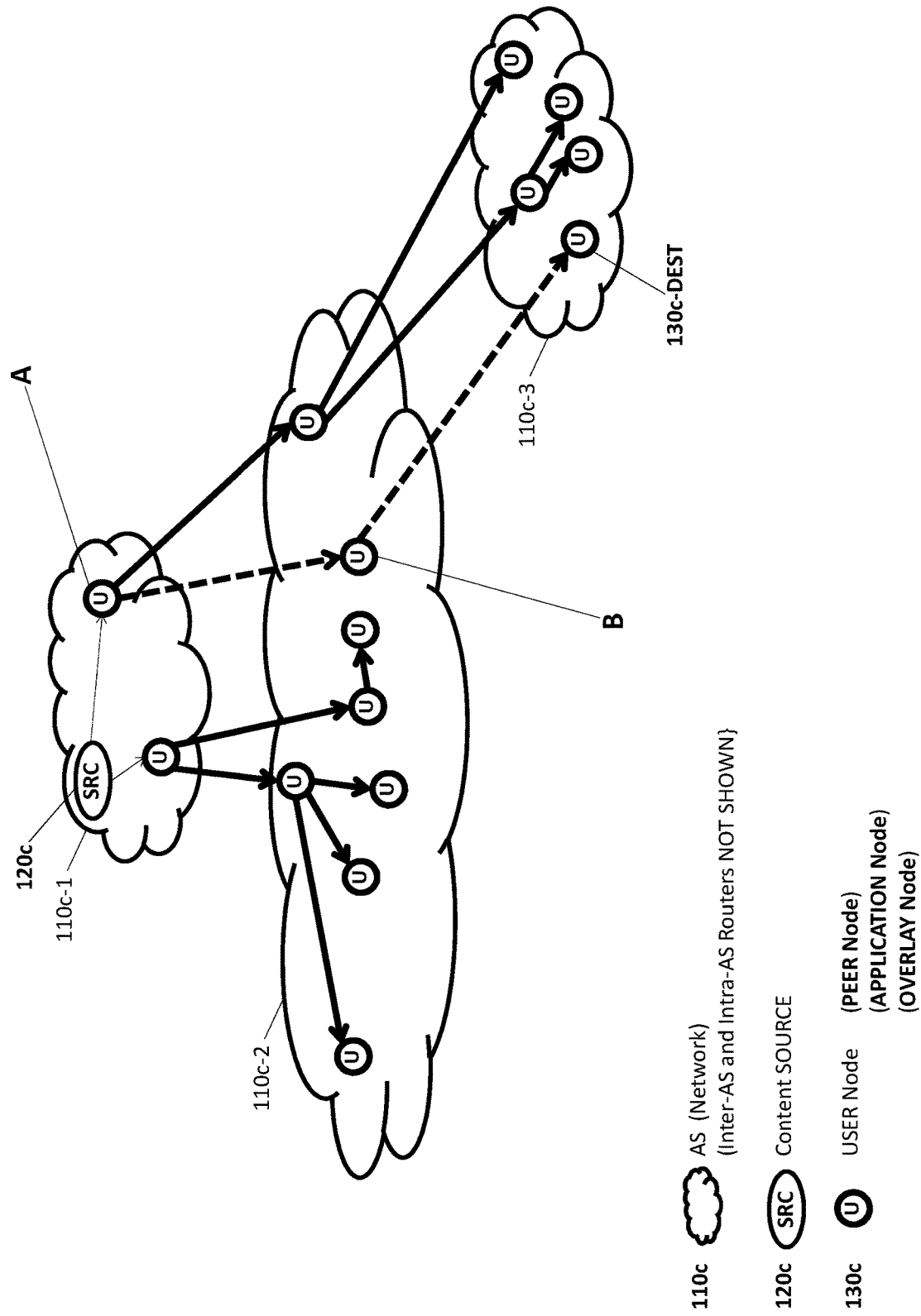
FIG. 1C is a graph illustrating one embodiment of the network architecture of a peer-based overlay network built on top of the underlying network of FIG. 1A, in which content is distributed to destination user nodes along overlay paths among the overlay nodes ("peer" destination user nodes) of the peer-based overlay network.

As discussed in greater detail below, the present invention is directed toward the distribution of content items among nodes of an underlying network such as the Internet. While embodiments of the adaptive overlay network architecture of the present invention are described herein in the context of peer-based overlay networks built on top of the Internet, it should be emphasized that the present invention is not limited to peer-based overlay networks, or even to the Internet. As will become apparent, the present invention can be integrated into edge-based and other overlay architectures built on top of virtually any underlying network experiencing network congestion at intermediate routing nodes and other shared resources.

As alluded to above, the set of user nodes that consume the content of an application (as distinguished from intermediate routing nodes of the underlying network) represent overlay nodes that together define an overlay network on which the application's content items are distributed. For any given content item (or segment thereof), the present invention defines a corresponding overlay network topology, which includes the set of overlay nodes (overlay network) that consume that content item, and the set of links (pairs of overlay nodes) along which segments of the content item will propagate (until such time as the present invention reconfigures the overlay network topology).

In one embodiment, discussed in greater detail below, one or more user nodes are part of multiple overlay networks and thus may relay, but not consume, a particular content item. In that embodiment, however, such user nodes consume other content items via overlapping overlay network topologies of which they are a part. It will be apparent to those skilled in the art that the scope of the present invention includes simultaneous distribution of multiple content items (each with corresponding overlay network topologies) associated with one or more applications.

The embodiments of the adaptive overlay network architecture of the present invention described below identify an overlay network topology that satisfies a set of application-specific performance criteria. Because each application (and potentially each content item or segment thereof) may have its own associated overlay network topology, the present invention may define distinct (and potentially overlapping) overlay network topologies, each of which is associated with a particular application (or content item or segment thereof) having its own defined performance criteria. For example, different resolutions of a video content item may be considered distinct content items for the purposes of the present invention.

For simplicity, however, most of the embodiments described herein determine a single overlay network topology associated with a single application distributing segments of a single content item. It will nevertheless be apparent to those skilled in the art that any given overlay network topology may accommodate multiple applications distributing multiple content items simultaneously, and that distinct overlay network topologies may be defined for each application (or content item or segment thereof) without departing from the spirit of the present invention.

While many of the examples provided herein are described in the context of delivering streaming video over the Internet to large numbers of concurrent users, the principles of the present invention apply equally to virtually any type of application distributing any type of digital content. Examples of applications include broadcast video, VOD, VoIP and other forms of videoconferencing, audio and video streaming, virtual reality ("VR"), single-player and multi-player gaming, large file transfers and various other content distribution (and often relatively bandwidth-intensive) applications. Examples of digital content items include text, images, audio and/or video files, 3D models, VR gameplay, medical data and virtually any other form of digital content.

It should be further noted that the present invention is not limited to content items that are distributed at a scheduled time. For example, video content may be streamed live as an event occurs (whether streamed in real time or with some period of delay) or may be pre-recorded and streamed at a later time. The event itself may or may not be scheduled in advance. Moreover, the application and its associated performance criteria will determine whether destination nodes must receive the content items "simultaneously" (i.e., within a predefined threshold period of time) or may receive the same content at different times.

As will become apparent below, the present invention does not "cure" the Internet's network congestion problem, or the limited capacity of the nodes and links of an overlay network to distribute content in accordance with application-specific performance criteria. Instead, it defines overlay network topologies over time that make efficient use of that limited capacity and reduce the negative impact of underlying network congestion on the performance of those overlay network topologies (effectively reducing network congestion by "routing around" it and dispersing traffic throughout less heavily utilized or congested areas of the Internet)—all while satisfying defined performance criteria.

One key advantage of the present invention is the reduction of bandwidth costs and the impact on the point-of-insertion ("POI")—i.e., the network node (or external network) from which the content originates. For example, by leveraging the destination peer nodes to deliver content items among themselves, the present invention avoids the need for expensive edge-based routers and servers for distribution of content items. Related advantages include increased service coverage and performance quality, even for user nodes that are well beyond the direct reach of the POI (e.g., not in network proximity to the POI or perhaps to any relatively high bandwidth user node). Other advantages will become apparent in connection with the following description of the various embodiments of the present invention.

Finally, it should be emphasized that the following embodiments represent allocations of functionality among hardware and software components that are the result of various design and engineering tradeoffs (including time, performance, memory and other factors). This functionality can be reallocated among hardware and software, client-side and server-side modules, combined into a single component or split among multiple components, and implemented with combinations of standard and custom network protocols, without departing from the spirit and scope of the present invention.

B. Peer-Based Overlay Network Topologies

Figure 2A:
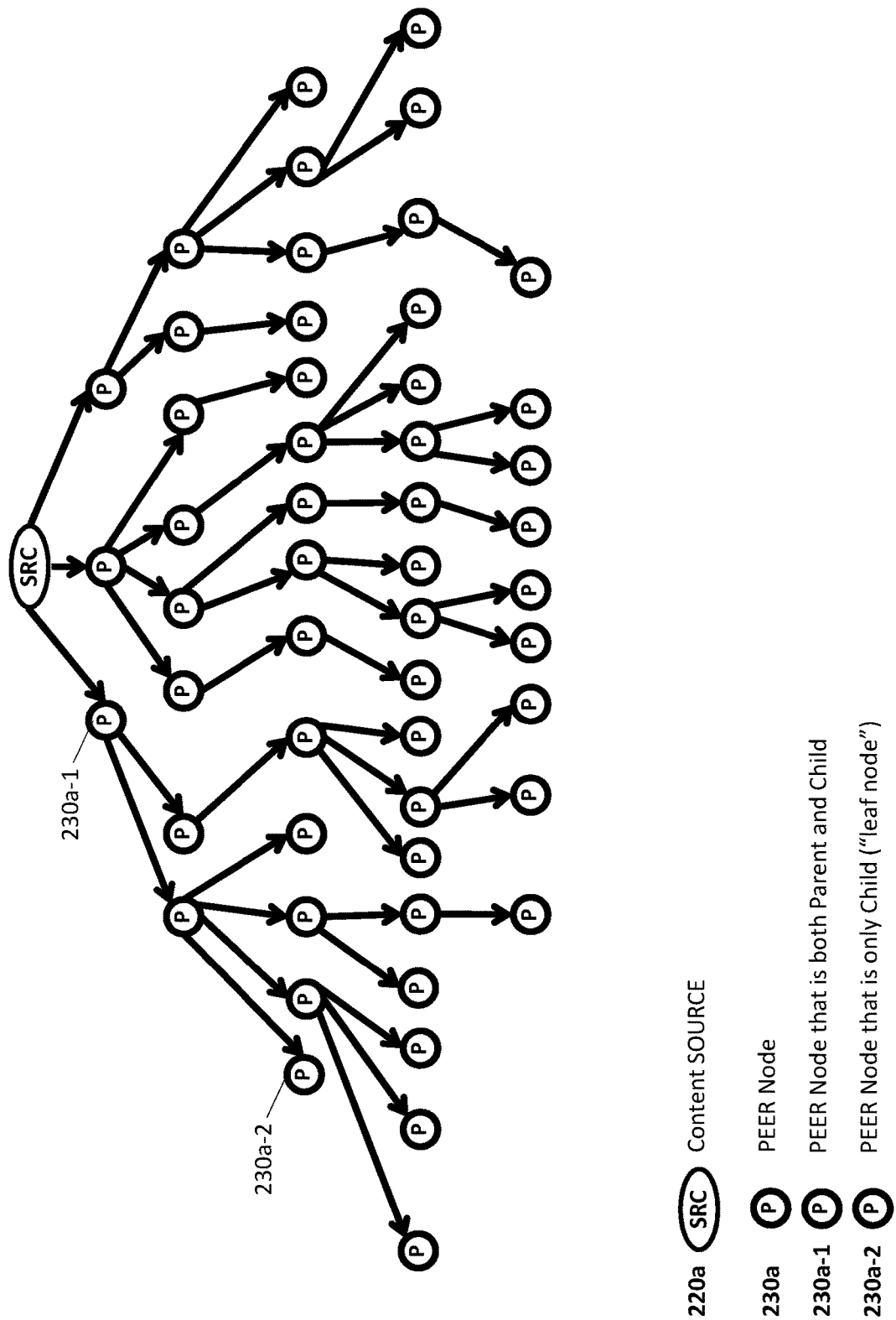
FIG. 2A is a graph illustrating one embodiment of an overlay network topology of a peer-based overlay network of the present invention, including peer nodes that are solely "child" destination nodes, and peer nodes that are also "parent" nodes which relay content to other peer nodes.

Turning to FIG. 2A, graph 200a illustrates one embodiment of a peer-based overlay network topology of the present invention. Source node 220a represents the POI or point at which the content item originates and is inserted into the overlay network. In other embodiments, content can originate from multiple different nodes, whether internal to, or external from, the overlay network itself. An external "source" network or node (i.e., a node that is not part of the overlay network and does not consume content items) may also distribute content items to one or more peer user nodes of the overlay network.

In the embodiment illustrated in FIG. 2A, source node 220a represents an external node that initially (per the definition of the current overlay network topology 200a) distributes segments of content directly to multiple peer nodes 230a. Peer nodes 230a include peer nodes that are solely child nodes (such as "leaf" node 230a-2, which consumes content, but does not relay that content to any other peer node) as well as peer nodes that are parent nodes (such as "relay" node 230a-1, which not only consumes content, but also relays that content to other peer nodes).

Figure 2B:
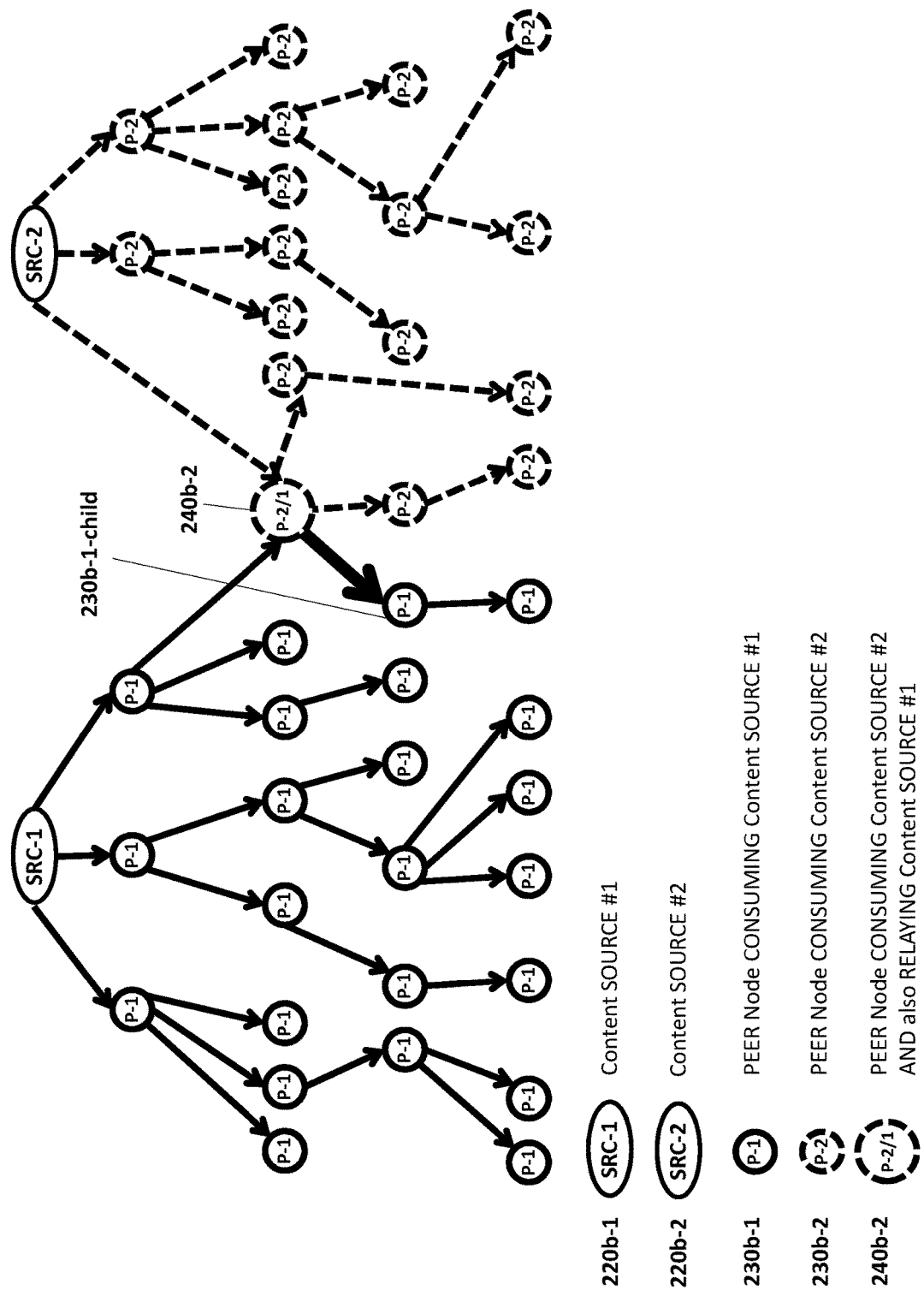
FIG. 2B is a graph illustrating one embodiment of multiple interconnected peer-based overlay network topologies of the present invention, including at least one peer node that relays content of a first overlay network to other peer nodes of that first overlay network, but does not consume such content.

Turning to FIG. 2B, graph 200b illustrates one embodiment of multiple overlapping or interconnected peer-based overlay network topologies of the present invention. In this embodiment, a first content item is distributed from source node 220b-1 among a first overlay network of multiple peer nodes 230b-1 that consume segments of that first content item. Similarly, a second content item is distributed from source node 220b-2 among a second overlay network of multiple peer nodes 230b-2 that consume segments of that second content item.

However, in this embodiment, one of the nodes of the second overlay network (peer node 240b-2) not only consumes segments of the second content item and relays those segments to other peer nodes 230b-2 of the second overlay network, but also relays segments of the first content item to other peer nodes 230b-1 of the first overlay network. In other words, in this embodiment, peer node 240b-2 is an unusual node (as contrasted with other peer nodes 230b-1 and 230b-2) in various respects.

It has multiple (two) parent nodes, and it relays segments of a content item (the first content item) that it does not consume (since it only consumes segments of the second content item). Thus, in this scenario, peer node 240b-2 is part of multiple distinct peer-based overlay networks.

One purpose of this embodiment is to illustrate how the present invention leverages the unused or excess "relay capacity" of peer nodes that do not consume the content being distributed—in order to "generate" a more efficient overlay network topology. It should be noted, however, that peer node 240b-2, unlike an edge server node, does not require the purchasing or leasing of additional physical infrastructure. Instead, peer node 240b-2 is a user node that is already deployed to consume content items (of a second overlay network).

As explained in greater detail below, the present invention monitors various metrics, including those involving the distribution of content among user nodes over time (potentially across multiple overlay network topologies), and can thus detect (or predict) and leverage this excess relay capacity by including node 240b-2 in the overlay network topology for segments of content items distributed among peer nodes of the first overlay network. Variations of this concept of overlapping overlay network topologies (including hybrid network architectures that integrate CDNs and other edge-based overlay networks) will be apparent to those skilled in the art.

Finally, it should be noted that the overlay network topologies illustrated in FIGS. 2A and 2B represent an overlay network topology defined by the present invention at a given point in time. In other words, as metrics change over time, the present invention may determine a new or modified overlay network topology to replace the current overlay network topology.

Figure 2C:
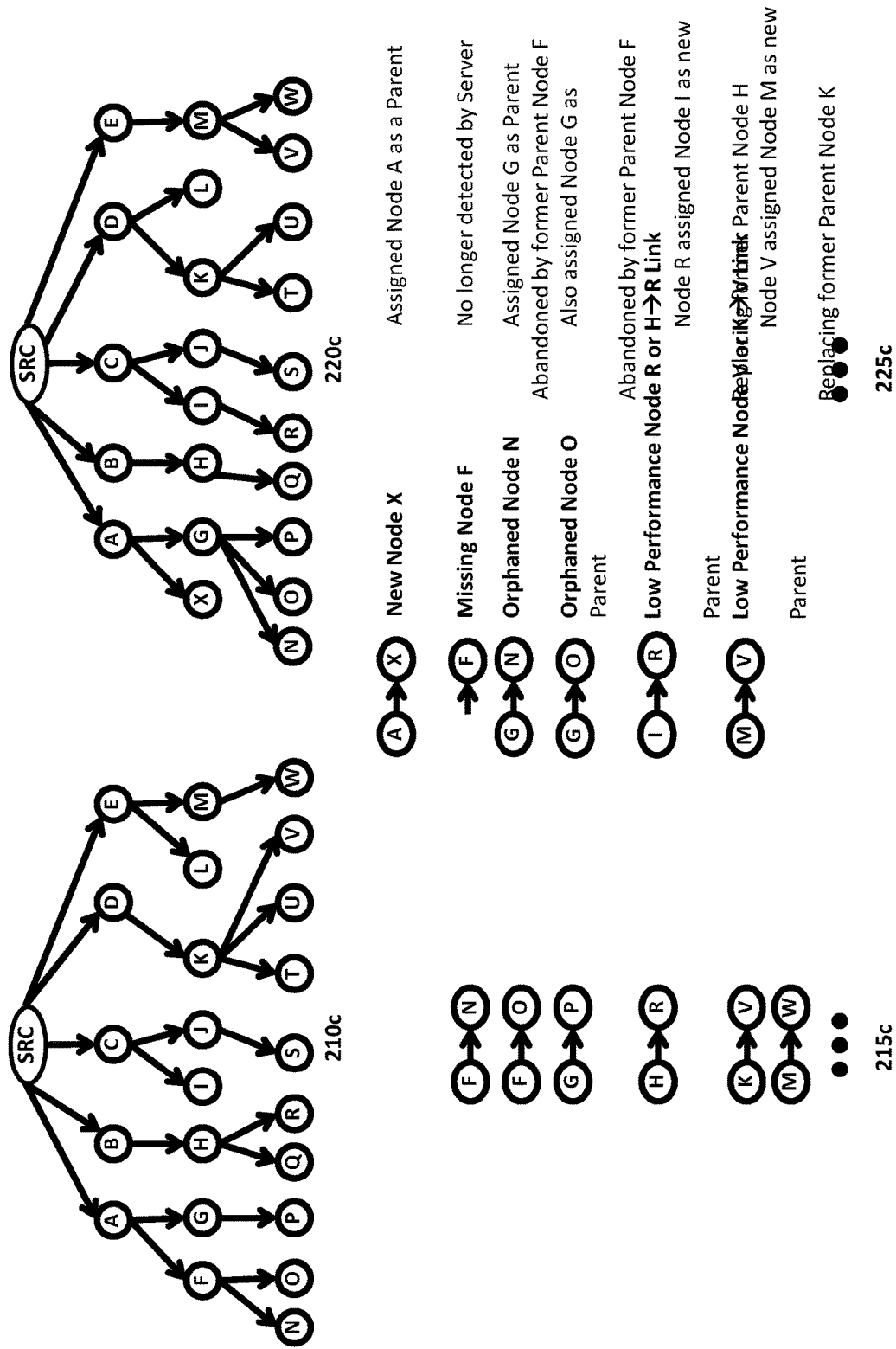
FIG. 2C is a graph illustrating "before and after snapshots" of one embodiment of a subset of a peer-based overlay network topology of the present invention, in which the current overlay network topology is reconfigured based in part upon monitored metrics.

Turning to FIG. 2C, graph 200c illustrates "before and after snapshots" of one embodiment of a subset of a peer-based overlay network topology of the present invention, in which the current overlay network topology 210c is reconfigured (partially or completely) based upon monitored metrics, resulting in a new "replacement" overlay network topology 220c along which future segments of a content item will propagate. As discussed in greater detail below, reconfiguration may occur for a variety of reasons.

For example, metrics may change over time, indicating that the performance of a particular node or link is (or will be) degrading. However, as alluded to above, merely replacing a "poorly performing" parent node or link may not achieve the desired result (i.e., satisfying defined performance criteria) without also taking into account the effects of the interdependencies of upstream nodes and links.

Putting aside for a moment the manner in which the present invention resolves those problems (addressing those interdependencies as well as the effects of current or future underlying network congestion), FIG. 2C illustrates the "before and after" effects of the reconfiguration process (at least on a subset of nodes and links). These effects are illustrated by the set of "before" links 215c in current overlay network topology 210c as contrasted with the set of "after" links 225c in reconfigured overlay network topology 220c.

In the example illustrated in FIG. 2C, peer node X initiates a request at some point in time to join the application and receive a particular content item. At that time, node X will be assigned a parent peer node in order to receive the requested content item (though, in some embodiments discussed below, node X begins receiving content immediately from the POI--SRC node in 220c—until a parent peer node is assigned).

As explained in greater detail below, the present invention need not assign a new parent to node X randomly, or even based solely on relative geographic locations. Instead, it considers various metrics in selecting a parent for node X such that the performance of the resulting overlay network topology as a whole (or, in some embodiments, just the performance of the link to node X) satisfies the defined application-specific performance criteria. In any event, as a result of this process, new node X is assigned parent node A, as illustrated by the A→X link shown in 225c and in reconfigured overlay network topology 220c.

In addition to new nodes joining an application, the present invention must accommodate nodes leaving an application (in particular, parent nodes who leave "orphaned" child nodes behind). In this example, node F leaves the application, leaving behind orphaned nodes N and O. Here too, as explained in greater detail below, the present invention considers various metrics in selecting new parents for those orphaned nodes. Thus, links F→N and F→O shown in 215c (and current overlay network topology 210c) are effectively replaced by links G→N and G→O shown in 225c and in reconfigured overlay network topology 220c. As a result, parent node G now has three child nodes-orphaned nodes N and O, as well as existing child node P.

It is important to emphasize that, even in the context of selecting parent nodes for new and orphaned nodes, the present invention considers changing metrics to determine whether and how to reconfigure the current overlay network topology. In other words (as is explained in greater detail below), the present invention addresses the consequences of frequently changing underlying network congestion as well as the interdependencies among nodes and links of an overlay network topology.

Thus, in addition to accommodating new and orphaned nodes, the present invention also addresses (observed and/or prospective) "low performance" nodes and links by reconfiguring the current overlay network topology while satisfying the defined performance criteria. In the example illustrated in FIG. 2C, the H→R and K→V links in 215c (and current overlay network topology 210c) are exhibiting (or are predicted to exhibit) "low performance"—e.g., a level of performance below a predefined threshold or below that required by the defined performance criteria.

As alluded to above, the cause of that low performance may be an internal problem or congestion within the nodes (node R or node V) themselves, or upstream network congestion at an intermediate routing node along the links (H→R or K→V) to those nodes. As explained in greater detail below, even without knowing the precise cause of the problem, the present invention identifies an overlay network topology that satisfies the performance criteria, and thus effectively "routes around" and reduces underlying network congestion.

Thus, in this example, whether the cause of the "low performance" problem was existing nodes R and/or V (or existing links H→R and/or K→V), as shown in 215*c* (and current overlay network topology 210*c*), the present invention reconfigured current overlay network topology 210*c* by identifying new overlay network topology 220*c*, which resulted in providing new parent node I for child node R, and new parent node M for child node V, as also shown in 225*c*.

In some embodiments (discussed below), the present invention first identifies "low performance" nodes explicitly (as requiring a new parent), while in other embodiments the assignment of new parents is a result of the identification of an overlay network topology that satisfies the performance criteria (without explicitly identifying particular "low performance" nodes).

C. Client-Server Architecture and Key Functional Components

Figure 3A:
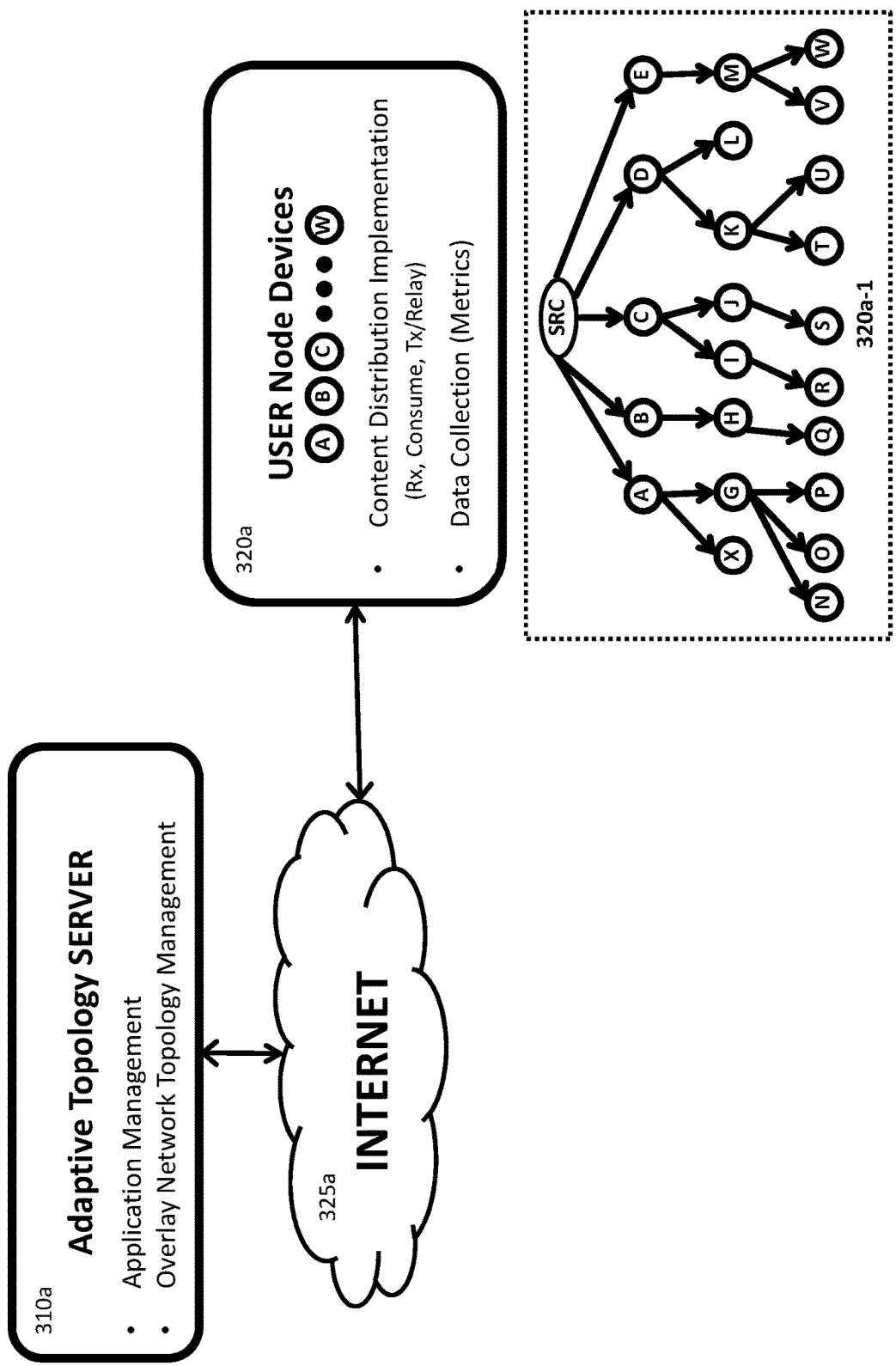
FIG. 3A is a system diagram illustrating one embodiment of key client-server components of the present invention.

In one embodiment of the adaptive overlay network architecture of the present invention, a client-server architecture is employed, as illustrated in system diagram 300*a* in FIG. 3A. In this embodiment, Adaptive Topology Server 310*a* is a node (or multiple nodes, in other embodiments) on the underlying network 325*a* (Internet) that centralizes much of the functionality of the present invention.

For example, Adaptive Topology Server 310*a* is responsible for managing the one or more applications that are running simultaneously, as well as the overlay network topologies over which information is exchanged among User Node devices 320*a*. Each of the User Node devices 320*a* is also connected as an underlying node of the Internet 325*a*.

Each application involves the participation of a subset of User Node devices 320*a*, illustrated collectively as a logically interconnected overlay network topology 320*a*-1. The "SRC" node shown in 320*a*-1 is not technically part of the overlay network topology. It represents the POI or source of each content item. Though not otherwise shown in FIG. 3A, one or more POIs (across multiple applications and content items) are deployed in one embodiment as external nodes on the underlying network (Internet 325*a*), adapted to communicate with Adaptive Topology Server 310*a*, as well as with User Node Devices 320*a*. In this embodiment, Adaptive Topology Server 310*a* manages the distribution of the segments of each content item from its POI to the "root" nodes of each overlay network topology 320*a*-1 (at which point those segments are further distributed along the overlay network topology 320*a*-1 to other User Node Devices 320*a* as described in greater detail below).

In one embodiment, overlay network topology 320*a*-1 is employed to distribute content with respect to multiple applications, each of which involves the simultaneous distribution of one or more content items. In other embodiments, each segment of each individual content item may be distributed along a distinct overlay network topology.

The granularity of this correlation of an overlay network topology 320*a*-1 with individual segments, content items and applications is the result of design and engineering tradeoffs made in the course of implementing the present invention. For simplicity, the overlay network topology 320*a*-1 is described in this context at a low level of granularity with reference to a subset of User Node devices 320*a* involved in the distribution of a segment of a content item for a particular application.

In this embodiment, User Node devices 320*a* collect metrics over time and deliver them continuously over the Internet 325*a* to Adaptive Topology Server 310, which makes decisions (based at least in part upon those metrics) as to whether to reconfigure any particular overlay network topology 320*a*-1. Whenever Adaptive Topology Server 310*a* reconfigures a particular overlay network topology 320*a*-1, it communicates to each parent User Node device 320*a* (in that topology 320*a*-1) the identification of its child User Node devices 320*a* to which it will "push" subsequent segments of the current content item.

Each child User Node device 320*a* includes functionality to receive and consume segments of a content item—e.g., receiving and viewing segments of streamed video content, receiving and processing image files, receiving and processing interactive gameplay data, etc. If a User Node device 320*a* is also a parent node, it not only receives and consumes segments of a content item, but also relays those segments to the particular User Node devices 320*a* specified by Adaptive Topology Server 310*a*. In other words, User Node devices 320*a* implement the distribution of content over the overlay network topology 320*a*-1 determined by Adaptive Topology Server 310*a* and reconfigured over time.

Figure 3B:
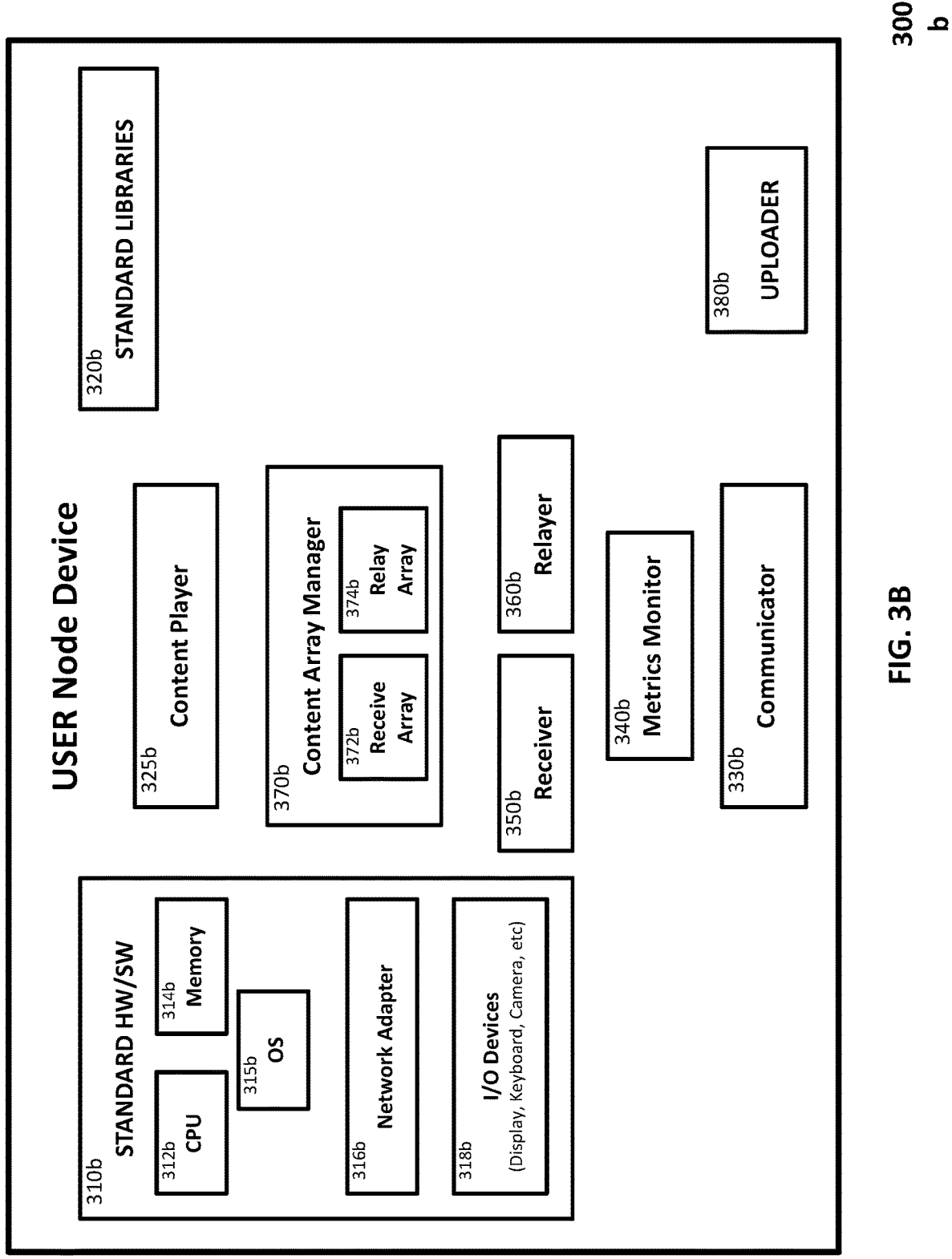
FIG. 3B is a block diagram illustrating one embodiment of key client-side components of a user node device of the present invention.

A more detailed description of the functional components in a User Node Device 300*b* is illustrated in FIG. 3B. In one embodiment, each User Node Device 300*b* includes standard hardware and software components 310*b*, including CPU 312*b*, memory 314*b* and operating system 315*b*, as well as network adapter 316*b*, for implementing the functionality of standalone and network applications. In other embodiments, this functionality can be implemented entirely in hardware, or with the use of one or more dedicated microcontrollers rather than a general-purpose CPU 312*b* and operating system 315*b*, as well as with multiple (single or multi-core) CPUs 312*b*. In some embodiments, certain User Node Devices 300*b* also include I/O Devices 318*b*, such as displays, keyboards, cameras, etc.

The functionality of these standard hardware and software components 310*b* is leveraged by the adaptive overlay network architecture of the present invention, while also being employed for general-purpose use by User Node Device 300*b* itself. For example, Memory 314*b* is also employed, in some embodiments, to store custom software (e.g., Javascript code received from Adaptive Topology Server 310*a*) that implements certain client-side functionality of the present invention, such as collecting metrics and communicating with Adaptive Topology Server 310*a* in connection with the receipt, consumption and relaying of segments of content items. In other embodiments, User Node Devices 300*b* include distinct storage components for storing data and software to facilitate this functionality.

In any event, the client-side functionality of the present invention, to the extent not implemented in hardware, is embodied in non-transitory computer-accessible storage media (such as memory 314*b* or other forms of data storage) and executed by a processing apparatus (such as CPU 312*b*). In other embodiments, this client-side functionality is embodied in a desktop application and mobile app downloaded into User Node Devices 300*b*.

This custom client-side functionality is also facilitated (in some embodiments) by Standard Libraries module 320*b*, which includes standard protocols and libraries for communicating with Adaptive Topology Server 310*a* and receiving, consuming and relaying segments of content items. Examples of such protocols and libraries include HTTP, WebSocket, STUN, WebRTC and MPEG-DASH, among others. The selection of particular standard protocols and libraries in Standard Libraries module 320b (as well as non-standard protocols and libraries) is the result of various design and engineering tradeoffs within the scope of the present invention.

As alluded to above, a User Node Device 300b may, in some embodiments, be the source of a particular content item that is distributed to other User Node Devices 300b. In this scenario, Uploader 380b implements the functionality of streaming or otherwise distributing each segment of the content item to the client User Node Devices 300b specified by the Adaptive Topology Server 310a. In one embodiment, Node Device 300b, in addition to being the source of a content item, also consumes and relays segments of other content items (utilizing Receiver 350b and Relayer 360b).

In this context, the resulting overlay network topology (along which any segment of such content item is distributed) does not include that "source" User Node Device 300b, as it is the POI or source of the content item. But, as noted above, that same User Node Device 300b may be part of a distinct (and perhaps overlapping) overlay network topology over which a different content item is distributed (e.g., as illustrated by user node 240b-2 in FIG. 2B discussed above).

Communications with Adaptive Topology Server 310a are implemented by Communicator module 330b. For example, Communicator 330b transmits metrics collected by Metrics Monitor 340b to Adaptive Topology Server 310a—for use in determining overlay network topologies. Communicator 330b also receives from Adaptive Topology Server 310a specifications of the child nodes, if any, to which User Node Device 300b will relay subsequent segments of a content item (e.g., when Adaptive Topology Server 310a reconfigures an overlay network topology). In addition, Communicator 330b handles requests by User Node Device 300b to join or leave a particular application, among other communications-related functions.

In one embodiment, Metrics Monitor 340b is implemented as a distributed collector of various metrics. For example, during any given time period (e.g., every second), each User Node Device 300b collects raw metrics, including, for example, both node metrics and link metrics, and then delivers those metrics to Adaptive Topology Server 310a. As discussed in greater detail below, Adaptive Topology Server 310a organizes and processes the metrics it receives from all User Node Devices 300b and uses such metrics to facilitate its determination of overlay network topologies (across segments, content items and applications).

In alternative embodiments, metrics are collected that reflect the demand for content by individual nodes (e.g., throughput for a single video stream) and/or aggregate demand by multiple nodes (e.g., aggregated throughput across one or more video streams). In another embodiment, User Node Devices 300b collect metrics more frequently than they report such metrics to Adaptive Topology Server 310a. In yet another embodiment, certain metrics are collected less frequently, or provided to Adaptive Topology Server 310a only when they change. In a further embodiment, parent nodes collect link metrics (instead of, or in addition, to relying on child nodes to collect such link metrics). In still other embodiments, additional metrics are collected (and reported to Adaptive Topology Server 310a) beyond node metrics and links metrics (or even those relating directly to the transfer of segments of content items), such as periodic pings to known URLs and various other indirect indicators of network congestion and other changing circumstances.

As noted above, in one embodiment, node metrics include node-relaying attributes inherent to a User Node Device 300b, such as its connection type (LAN, WiFi, LTE, 4G, etc.), IP address/prefix, ISP, ASN, device type, CPU and memory load, operating system, geographical location, uplink and downlink speeds to its gateway, etc.). Link metrics include link-relaying attributes relating to a particular link, such as roundtrip ping times along the link, latency, jitter and other network-centric metrics, and relative node metrics regarding the parent and child of the link (such as their IP address/prefix, ISP and ASN).

In other embodiments, metrics that reflect a user-centric or application-level view of the quality of an application's performance (e.g., dropped frames, rebuffering events, etc.) are also included as metrics. Such metrics are, of course, application-specific, and are used by Adaptive Topology Server 310a in one embodiment (along with other metrics) to define its application-specific performance criteria. Various different or other node metrics, link metrics and other metrics may be employed without departing from the spirit of the present invention.

Receiver 350b within each User Node Device 300b manages the protocol by which it receives segments of a content item from its parent node. In one embodiment, standard WebRTC APIs and protocols are employed to facilitate the peer-to-peer transmission of one or more segments of a content item from a parent node to each of its child nodes. In other embodiments, different standard or custom protocols are employed. In still other embodiments, certain User Node Devices 300b support multiple different protocols. The choice of protocol is a result of design and engineering tradeoffs that may differ from application to application.

Similarly, if User Node Device 300b is a parent node, Relayer 360b manages the relaying of received segments of a content item to its specified child nodes. Relayer 360b is employed only when User Node Device 300b has currently specified child nodes. For example, following reconfiguration of an overlay network topology by Adaptive Topology Server 310a, a User Node Device 300b may be informed that it no longer has any specified child nodes—but may later be notified (following a subsequent reconfiguration) that it does have one or more specified child nodes for distribution of subsequent segments of a content item.

Content Array Manager 370b manages both the receipt and relaying of segments of a content item. For example, as segments are received, Content Array Manager 370b buffers those segments in Receive Array 372b for use in the consumption of those segments (e.g., the viewing of a broadcast video) by Content Player 325b in accordance with the application with which those segments are associated.

Content Player 325b may, for example, be a streaming HTML5 video player that plays received segments of a video content item for viewing by the user of User Node Device 300b. If the application provides for 30 fps playback by Content Player 325b, Content Array Manager 370b maintains a buffer of received segments (in Receive Array 372b) which facilitates its delivery of video frames (e.g., multiple video segments) to Content Player 325b at the appropriate rate. In some embodiments, Content Player 325b may include a distinct frame buffer to facilitate smooth playback of a video content item.

In one embodiment, Content Player 325b is implemented as a standard component of a web browser built into (or commonly installed on) User Node Devices 300b—e.g., a standard Safari, Chrome or Internet Explorer web browser. By leveraging standard functionality, the present invention avoids the need for installing additional custom software on each User Node Device 300b, and thus ensures greater compatibility across user nodes. In other embodiments, Content Player 325b is implemented as a custom web browser or standalone player.

If User Node Device 300b is a parent node, then Content Array Manager 370b also maintains a Relay Array 374b of received segments which facilitates the buffering of segments for transmission by Relayer 360b to each child User Node Device 300b specified by Adaptive Topology Server 310a. In other words, Content Array Manager 370b maintains a distinct buffer of segments for external transmission to the Receiver 350b in each of those child User Node Devices 300b. This buffer is employed in other embodiments to facilitate VOD applications in which a set of child User Node Devices 300b must receive the same segments—but at different times.

Because the Relayer 360b within one User Node Device 300b communicates directly with the Receiver 350b in other User Node Devices 300b (in one embodiment), they must implement compatible protocols (such as the WebRTC APIs and protocols described above). Different User Node Devices 300b may employ different (but compatible) standard or custom protocols (or even different protocols within the Receiver 350b and Relayer 360b of the same User Node Device 300b) without departing from the spirit of the present invention.

While the present invention (in one embodiment) leverages certain standard functionality in User Node Device 300b (e.g., in Standard Libraries 320b, Content Player 325b, and protocols implemented by Receiver 350b and Relayer 360b), it also relies on custom functionality (as described above) being present on User Node Device 300b. For example, Communicator 330b is employed to manage communications with Adaptive Topology Server 310a. Metrics Monitor 340b is employed to monitor certain metrics over time and provide them to Adaptive Topology Server 310a. And Receiver 350b and Relayer 360b are employed to manage the process of receiving segments of content items from a specified parent node (that may change when the overlay network topology is reconfigured). Finally, Uploader 380b is employed to enable User Node Device 300b to be the source of a content item distributed along an overlay network topology of the present invention (e.g., streaming live or recorded video from its camera, as well as other content items generated internally or obtained from an external source).

In one embodiment, this custom functionality is downloaded by Adaptive Topology Server 310a to a User Node Device 300b when it first initiates a request to Adaptive Topology Server 310a to join an application (e.g., to view a streaming video or exchange large files). Subsequent requests to join other applications or receive other content items need not require that this functionality be downloaded again.

Adaptive Topology Server 310a also communicates with the relevant POI (in one embodiment) to instruct it to provide initial segments of a requested content item to "newly joined" User Node Device 300b until such time as a parent node is selected for delivering subsequent segments directly to User Node Device 300b. The POI will also deliver all segments of a content item to the root nodes of each overlay network topology 320a-1 as discussed above. In other embodiments, in which User Node Device 300b is the source of a content item, Adaptive Topology Server 310a instructs Uploader 380b to act as the POI in this regard (both with respect to sending initial segments to newly joined nodes and all segments to specified root nodes).

Figure 3C:
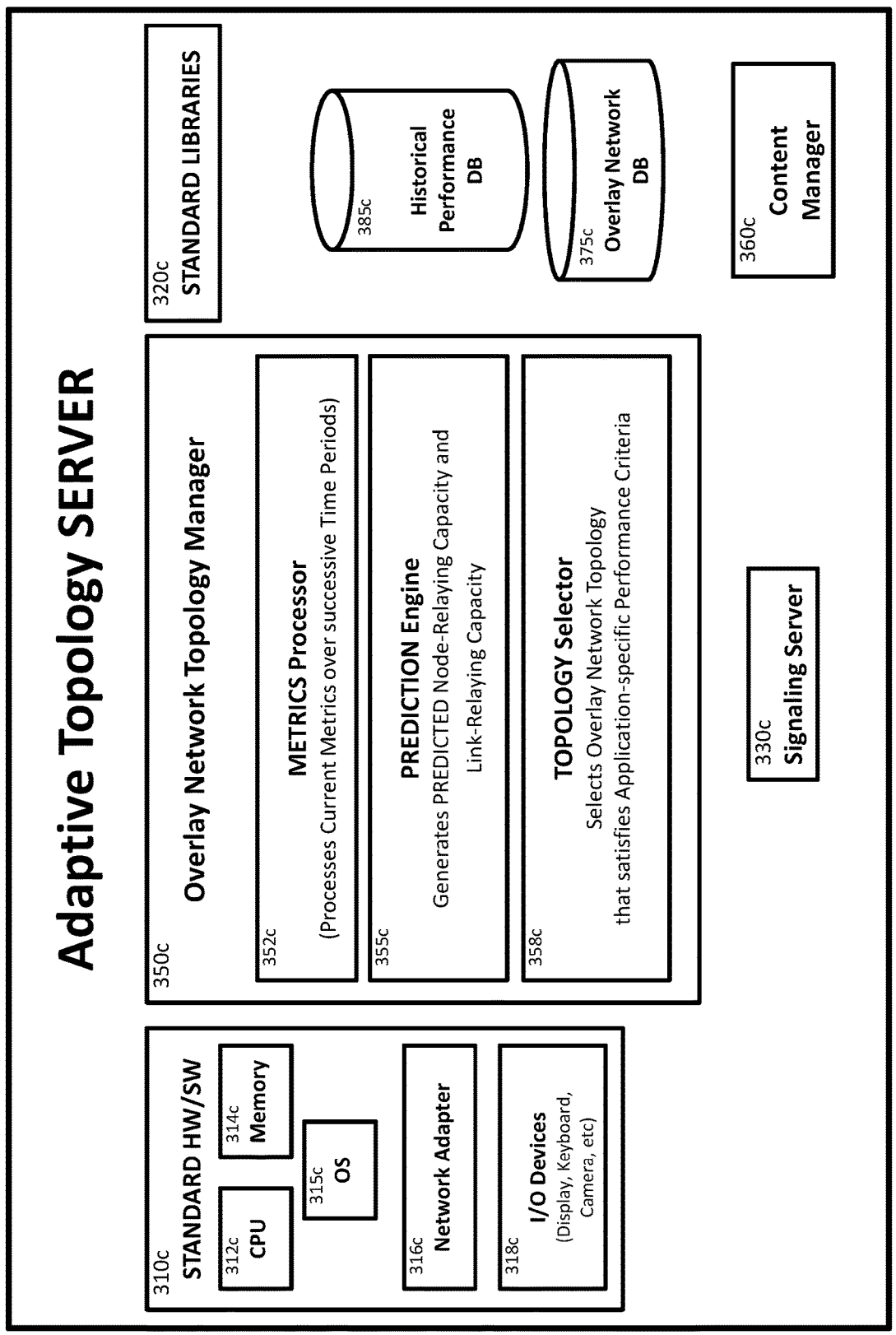
FIG. 3C is a block diagram illustrating one embodiment of key server-side components of an adaptive topology server of the present invention.

Turning to the server-side components that implement much of the functionality of the adaptive overlay network architecture of the present invention, FIG. 3C illustrates one embodiment of the key components of Adaptive Topology Server 300c. As noted above, the functionality of Adaptive Topology Server 300c can be implemented across one or more physical servers, and portions of such functionality can be implemented entirely in hardware or in both hardware and software and combined into a single conceptual software module or split across multiple modules (as dictated by various design and engineering tradeoffs).

In the embodiment illustrated in FIG. 3C, Adaptive Topology Server 300c is shown as a single physical server that includes standard hardware and software components 310c, such as CPU 312c, memory 314c and operating system 315c, as well as network adapter 316c. As with User Node Devices 300b, this standard server-side hardware and software functionality can be implemented with the use of one or more dedicated microcontrollers rather than a general-purpose CPU 312c and operating system 315c, as well as with multiple (single or multi-core) CPUs 312c. In some embodiments, Adaptive Topology Server 300c also includes I/O Devices 318c, such as displays, keyboards, cameras, etc. While distinct databases within Adaptive Topology Server 300c are illustrated in FIG. 3C (and discussed below), memory 314c is also employed, in some embodiments, to store custom data and functionality.

Standard Libraries 320c are also employed in one embodiment to facilitate communication with User Node Devices 300b (and the various POI sources of content items). Here too, design and engineering tradeoffs dictate which standard APIs and protocols are leveraged as well as the extent to which proprietary software is deployed. As was the case with User Node Devices 300b, the server-side functionality of the present invention (to the extent not implemented in hardware) is embodied in non-transitory computer-accessible storage media (such as memory 314c or other forms of data storage, such as databases 375c and 385c discussed below) and executed by a processing apparatus (such as CPU 312c).

Signaling Server 330c handles communications with User Node Devices 300b—e.g., for receiving metrics and instructing parent User Node Devices 300b to "push" subsequent segments of a content item to specified child nodes (without further interaction from Signaling Server 330c). In one embodiment, Signaling Server 330c also facilitates the creation of initial "peer connections" between pairs of User Node Devices 300b.

In another embodiment, Signaling Server 330c is also responsible for other communications with User Node Devices 300b. For example, Signaling Server 330c receives requests from User Node Devices 300b to join an application (and/or an individual content item). It also monitors "heartbeat" and other signals from User Node Devices 300b that indicate whether a User Node Device 300b has lost its network connection or otherwise stopped viewing one or more content items, in which case it will be removed from the current overlay network topology. Moreover, Signaling Server 330c handles communications with POI nodes or other sources of content in order to facilitate the streaming or other distribution of content items into the overlay network topologies identified by Adaptive Topology Server 300c.

In one embodiment, Content Manager 360c manages content items provided by multiple content providers with respect to a variety of applications. Content Manager 360c ensures that each content item is streamed or otherwise distributed to the root nodes of the current overlay network topology. In other words, to the extent a reconfiguration of the current overlay network topology (associated with a given content item) alters those root nodes, Content Manager 360c communicates with the relevant POI (via Signaling Server 330c) to ensure that the POI delivers subsequent segments of the content item to those updated root nodes.

Content Manager 360c also obtains or generates the application-specific performance criteria associated with the content items of each application (or, in other embodiments, with individual content items). Content Manager 360c stores the performance criteria in Memory 314c or, in other embodiments, in its own distinct database. As noted above, for any particular application or content item, the performance of a current overlay network topology (and of its individual nodes and links) is defined as a function of various metrics—and the performance criteria are defined as a set of thresholds or other constraints imposed upon that performance. In one embodiment, such performance criteria are predefined for each content item. In other embodiments, the performance criteria are generated and modified dynamically over time.

Overlay Network Topology Manager 350c provides the major components of the adaptive overlay network architecture of the present invention. Much of the discussion below focuses on the distribution of a particular content item and the reconfiguration over time of the overlay network topology along which subsequent segments of that content item will be distributed (following each reconfiguration). As noted above, however, the adaptive overlay network architecture of the present invention supports the simultaneous distribution of multiple content items across multiple applications.

During each defined time period, Metrics Processor 352c receives raw metrics primarily from the User Node Devices 300b, but also (in one embodiment) from external sources, whether obtained directly by monitoring Internet traffic over time or indirectly from third parties that monitor Internet traffic and occasionally build regional or global Internet "traffic maps" revealing specific traffic patterns over time. As explained in greater detail below, Metrics Processor 352c transforms this raw metric data into a form that can be utilized by Prediction Engine 355c and Topology Selector 358c to identify overlay network topologies that satisfy application-specific performance criteria.

In one embodiment, Metrics Processor 353 organizes these raw metrics, during each successive time period, into "training samples" that facilitate node-relaying capacity and link-relaying capacity predictions by Prediction Engine 355c. For example, Metrics Processor 353 quantifies the raw metrics and (in one embodiment) scales and weights them in order to generate training sample inputs and outputs to the node-relaying and link-relaying classifiers.

Moreover, as explained in greater detail below, Metrics Processor 353 consolidates certain metrics to generate training sample outputs to the node-relaying classifier (e.g., combining observed metrics regarding the performance of multiple links from a single parent node). Other transformations of the raw metrics will be apparent to those skilled in the art.

The metrics processed by Metrics Processor 352c during each successive time period (as well as other metrics obtained by Adaptive Topology Server 300c) are stored, in one embodiment, in Historical Performance Database 385c.

In one embodiment, these historical metrics (in both raw and processed form) are utilized by Prediction Engine 355c.

Overlay Network Database 375c is employed to store identifiers of the sets of nodes and links that define distinct overlay network topologies. Moreover, in another embodiment, it is employed to store interdependencies among the nodes and links of those overlay network topologies and/or other data reflecting associated historical metrics.

As explained in greater detail below, Topology Selector 358c employs, in one embodiment, various topology-generation methodologies to identify an overlay network topology that satisfies defined application-specific performance criteria applicable to the current content item, based on specified node-relaying capacity and link-relaying capacity predictions (and, in one embodiment, predictions of demand—i.e., predictions of nodes present in the network along with their duration) generated by Prediction Engine 355c. Topology Selector 358c employs these algorithms to facilitate its assessment of overlay network topologies based upon the extent to which they redistribute excess capacity to nodes in need of a new or better parent—i.e., shifting network traffic to satisfy the performance criteria.

Moreover, these algorithms take into account the interdependencies among the nodes and links in the global context of an overlay network topology. As noted above, in the context of any particular overlay network topology, the performance of each node and link is dependent upon the performance of upstream nodes and links.

In one embodiment, Topology Selector 358c updates the nodes of the current overlay network by adding newly discovered nodes and removing nodes that are no longer receiving the current content item. More significantly, Topology Selector 358c also utilizes Prediction Engine 455a to generate node-relaying capacity and link-relaying capacity predictions for specified nodes and links, and then analyzes prospective overlay network topologies including those nodes and links—while taking interdependencies among those nodes and links into account. In another embodiment, additional nodes are included, even though such nodes are not consuming the current content item (as illustrated by node 240b-2 in FIG. 2B above).

In other embodiments, Topology Selector 358c employs algorithms to reduce the amount of time (as well as other network resources) required to identify an overlay network topology (and, in some embodiments, an optimal overlay network topology) that satisfies the performance criteria. For example, Topology Selector 358c employs algorithms to reduce (1) the number of node-relaying capacity and link-relaying capacity predictions it generates using Prediction Engine 455a, and/or (2) the number of prospective overlay network topologies it assesses with respect to the performance criteria.

In one embodiment (discussed in greater detail below with respect to FIG. 7F), Topology Selector 358c identifies (in addition to new and orphaned nodes) a threshold number of "low performance" nodes that require a new parent. This dramatically reduces the number of node-relaying capacity and link-relaying capacity predictions because only links to such nodes (that require a new parent) need be considered. Other links will remain intact in any newly configured overlay network topology.

In other embodiments, Topology Selector 358c achieves additional reductions in the number of specified node-relaying capacity and link-relaying capacity predictions by identifying areas of the overlay network topology (e.g., closer to the root or to specific "branches" or levels of the tree) where link changes will have the greatest effect. In still other embodiments, Topology Selector 358c achieves similar reductions by selectively considering subsets of the number of permutations of prospective overlay network topologies based on those predictions. For example, in one such embodiment, Topology Selector 358c identifies "high performance" nodes which it utilizes as parent nodes at higher "branches" of the tree. Various other algorithms, transformations and design and engineering tradeoffs will be apparent to those skilled in the art.

Regardless of the specific algorithms employed, Topology Selector 358c generates as output an overlay network topology that satisfies the performance criteria. As noted above, many different algorithms can be employed without departing from the spirit of the present invention—even if the identified overlay network topology is not the optimal one, as other factors may be prioritized (such as the time required to generate a solution).

Figure 4A:
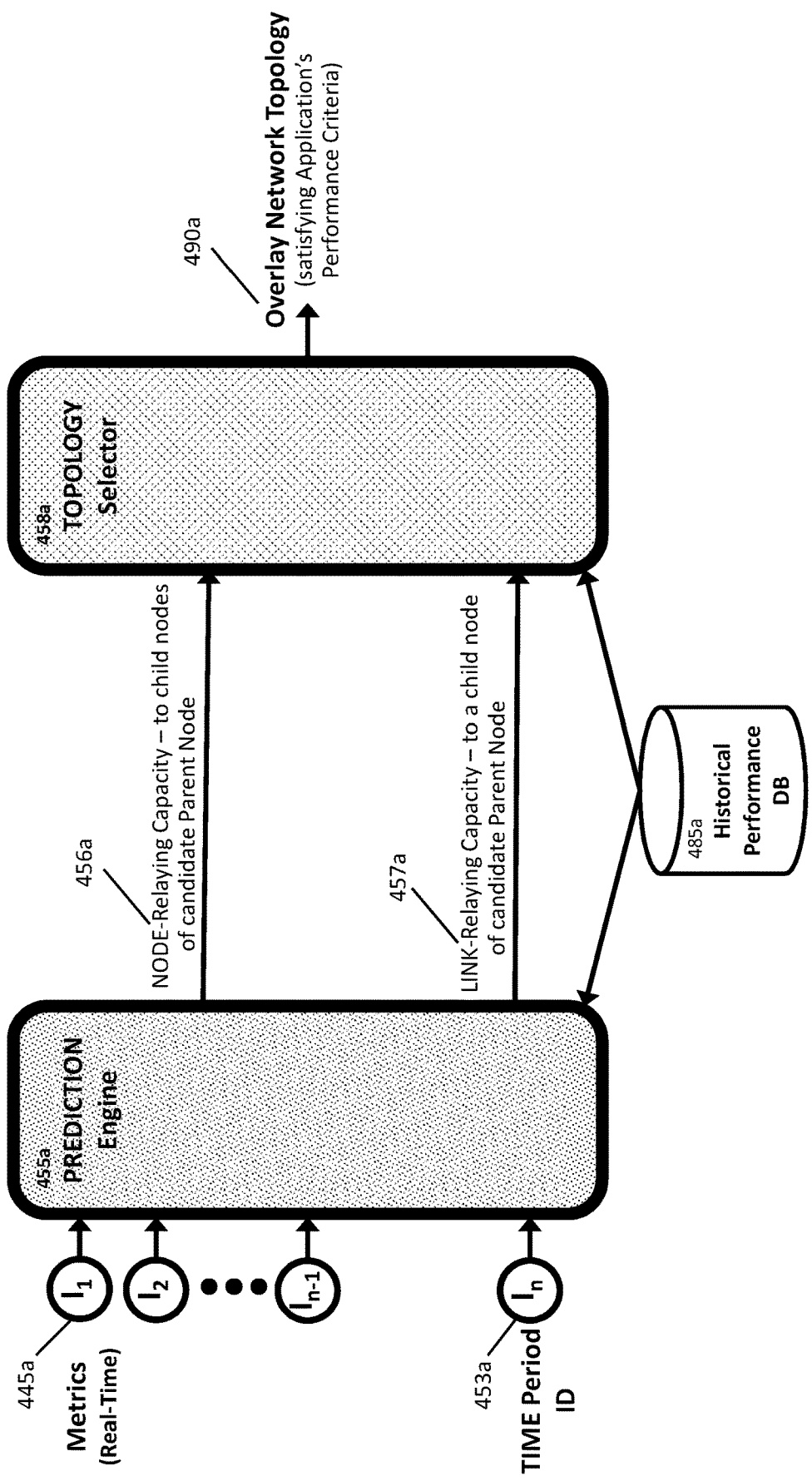
FIG. 4A is a diagram illustrating a high-level embodiment of the "Prediction Engine" and "Topology Selector" components of the "Overlay Network Topology Manager" illustrated in FIG. 3C.

Turning to FIG. 4A, diagram 400a illustrates a high-level embodiment of the relationship between the Prediction Engine 455a and Topology Selector 458a components of Adaptive Topology Server 300c. As noted above, Prediction Engine 455a receives as input various processed Metrics 445a during each successive time period 453a (in addition to previously obtained or observed historical metrics, in one embodiment, from Historical Performance DB 485a). Based upon these inputs, Prediction Engine 455a generates node-relaying capacity 456a and link-relaying capacity 457a predictions (and, in one embodiment, demand predictions), which improve over time as it is trained with more diverse training samples, as discussed in greater detail below.

In one embodiment, Topology Selector 458a requests (from Prediction Engine 455a) specified node-relaying capacity 456a and link-relaying capacity 457a predictions. As discussed in greater detail below, it utilizes these predictions to identify an overlay network topology 460b that satisfies the performance criteria.

Figure 4B:
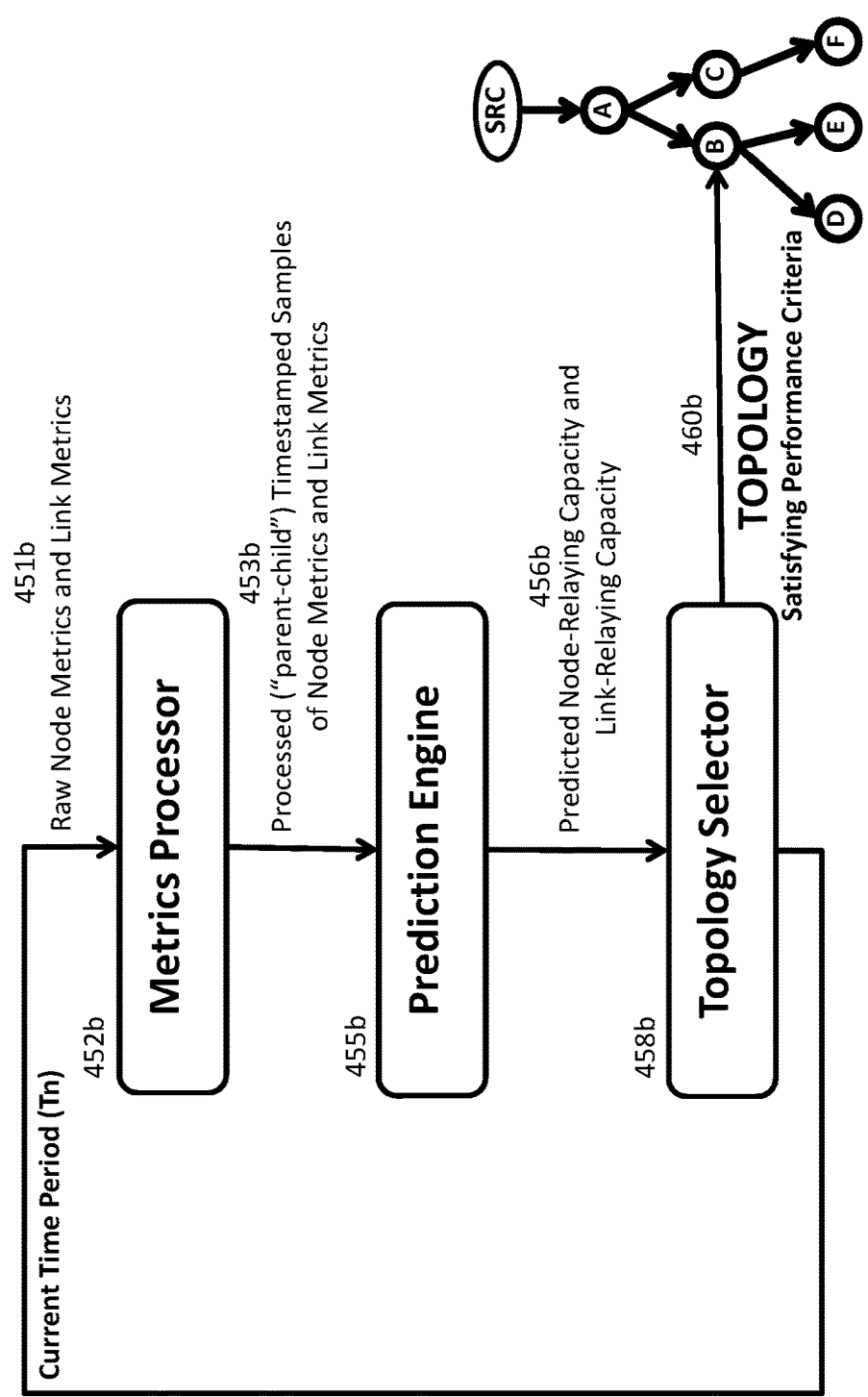
FIG. 4B is a flowchart illustrating a high-level embodiment of the dynamic interaction among the "Metrics Processor," "Prediction Engine" and "Topology Selector" components of the "Overlay Network Topology Manager" illustrated in FIG. 3C.

Flowchart 400b in FIG. 4B provides a high-level dynamic illustration of the components of FIG. 4A. For each successive time period (illustrated by the iterative loop between Topology Selector 458b and Metrics Processor 452b), Metrics Processor 452b receives and processes raw metric data 451b relating to individual nodes and links. Metrics Processor 452b processes that raw data to generate timestamped samples 453b designed to train Prediction Engine 455b to learn how input node-relaying attributes are correlated with output node-relaying performance values (to generate node-relaying capacity predictions), and how input link-relaying attributes are correlated with output link-relaying performance values (to generate link-relaying capacity predictions).

In one embodiment, Prediction Engine 455b (once sufficiently trained) is employed by Topology Selector 458b to provide specified node-relaying capacity and link-relaying capacity predictions 456b (and, in another embodiment, demand predictions) which facilitate the identification by Topology Selector 458b of an overlay network topology 460b that satisfies the performance criteria. A "training threshold" is employed to determine when Prediction Engine 455b is sufficiently trained to be relied upon by Topology Selector 458b. In another embodiment, Prediction Engine 455b continuously generates node-relaying capacity and link-relaying capacity predictions 456b (for use by Topology Selector 458b) which gradually improve over time.

D. Reconfiguration of Overlay Network Topologies

Figure 5:
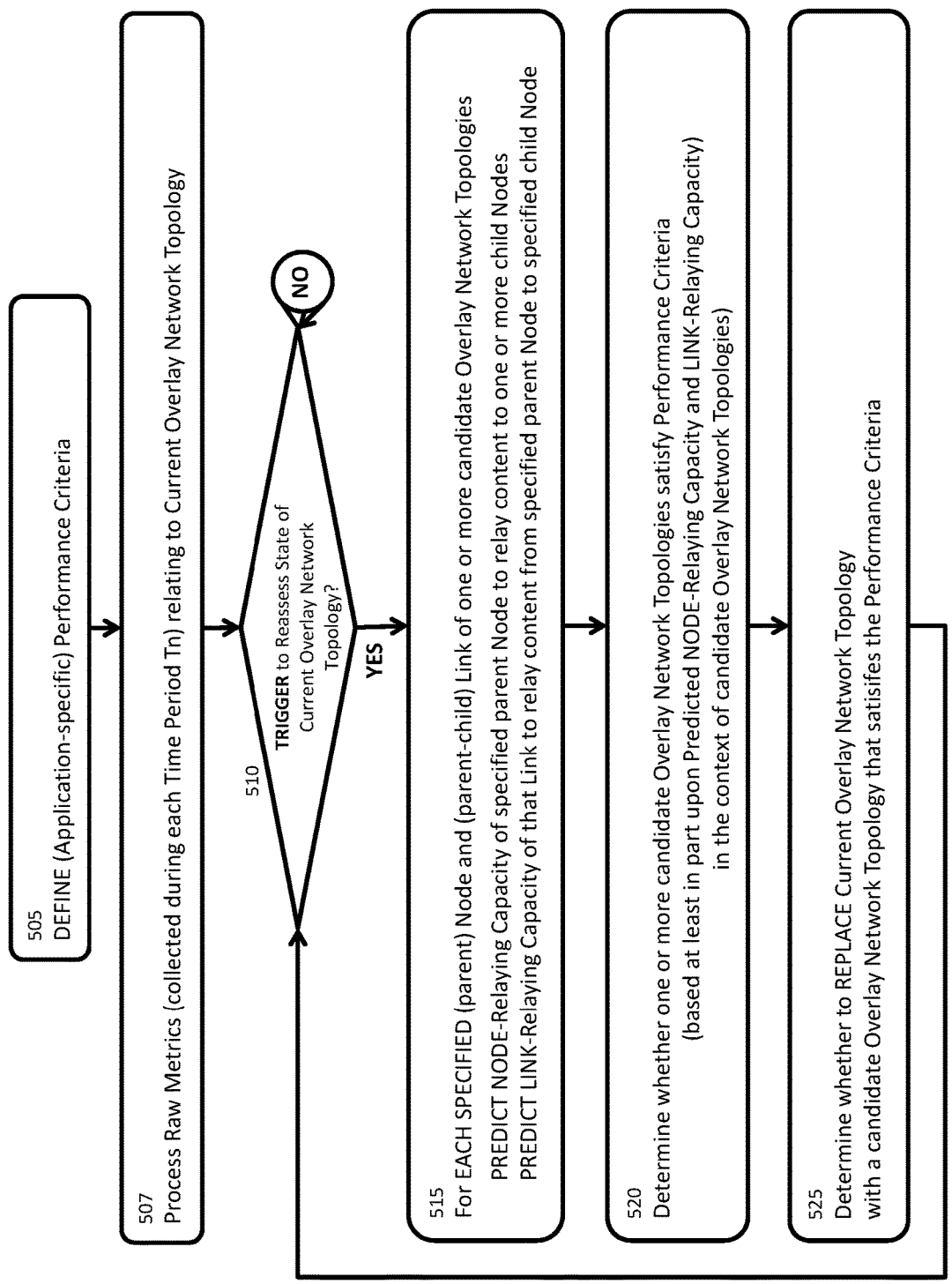
FIG. 5 is a system-level flowchart of one embodiment of a key process of the present invention which determines an overlay network topology that satisfies application-specific performance criteria in response to changing metric indicators of the impact of underlying network congestion, as well as the interdependencies of the nodes and links of the current overlay network topology.

Flowchart 500 of FIG. 5 provides one embodiment of a slightly more detailed system-level view of this "overlay network topology reconfiguration process." This process is discussed in greater detail below with respect to specific embodiments of key components of Prediction Engine 455b (in FIGS. 6A and 6B below) and key components of Topology Selector 458b (in FIGS. 7A-7E below).

In step 505, Content Manager 360c defines application-specific performance criteria with respect to each application (or, in another embodiment, each content item) supported by the system. With respect to the current content item being distributed over the current overlay network topology, the performance criteria represent constraints imposed upon the performance of that current overlay network topology (and of its individual nodes and links). In one embodiment, such performance is defined (during any specified period of time) as a function of the metrics made available to Metrics Processor 452b—which facilitates the determination by Topology Selector 458b of whether the performance criteria are satisfied.

Metrics Processor 452b processes the raw metrics in step 507 to generate timestamped samples used to continually train Prediction Engine 455b. As alluded to above, given the time and resources required, it may not be feasible for Topology Selector 458b to reassess the state of the current overlay network topology during every time period in which metrics are collected and processed (in step 507).

Thus, Overlay Network Topology Manager 350c performs step 510 to determine whether to trigger this reassessment. In some embodiments, this trigger is time-based and performed with the same or with less frequency than the process of metrics collection. In other embodiments, the trigger is event-based. For example, in one embodiment, a threshold performance level is established with respect to the performance of the current overlay network topology (and its individual nodes and links). If such performance is within a predefined threshold percentage of failing to satisfy the performance criteria, then step 510 triggers a reassessment of the current overlay network topology beginning with step 515.

Once triggered (whether via a time-based, event-based or other trigger), Topology Selector 458b utilizes Prediction Engine 455b in step 515 to generate specified node-relaying capacity and link-relaying capacity predictions. In one embodiment, such predictions are generated for each parent node to be included in any overlay network topology considered by Topology Selector 458b. In other embodiments, various topology-generation methodologies are employed to reduce the number of prospective overlay network topologies considered, and thus the number of required node-relaying capacity and link-relaying capacity predictions.

Topology Selector 458b utilizes such predictions in step 520 to determine an overlay network topology that satisfies the performance criteria. As noted above, in other embodiments, Topology Selector 458b determines an "optimal" overlay network topology—i.e., one that best satisfies (or comes closest to satisfying) the performance criteria.

Once Topology Selector 458b determines an overlay network topology that satisfies the performance criteria, Overlay Network Topology Manager 350c determines, in step 525, whether it will replace the current overlay network topology with the one determined by Topology Selector 458b. As noted above, even if a better (or an optimal) overlay network topology exists, the overhead of changing topologies too frequently (e.g., changing too many links at one time) may outweigh the benefit. In one embodiment, a predefined threshold of the number of changed links is employed to reduce this overhead. In other embodiments, a time-based threshold is employed (e.g., limiting the number of times the current overlay network topology is changed during a given period of time). Various other optimizations and techniques may be employed without departing from the spirit of the present invention.

Before turning to detailed embodiments of Prediction Engine 455b and Topology Selector 458b, it is helpful to recognize, as alluded to above, that network congestion is essentially the result of demand exceeding supply. To reduce the impact of network congestion on the performance of the current overlay network topology, Prediction Engine 455b and Topology Selector 458b work together to reconfigure the overlay network topology in a manner that satisfies application-specific performance criteria, and thus reduces the extent to which demand will exceed supply (in light of current or prospective network congestion).

While Prediction Engine 455b addresses network congestion and other performance-limiting factors at a local (node and link) level to predict node-relaying capacity and link-relaying capacity, Topology Selector 458b addresses the interdependencies among the individual nodes and links at a global (topology) level to identify an overlay network topology that effectively redistributes excess capacity to nodes in need of a new or better parent—i.e., shifting network traffic to satisfy the performance criteria.

1. Prediction Engine a. Traffic Demand

As alluded to above, Prediction Engine 455b is employed in one embodiment to measure and/or predict the net capacity of nodes and links, which involves an assessment of changing demand over time. As will be discussed in greater detail below, Prediction Engine 455b employs node-relaying and link-relaying classifiers to generate net node-relaying and link-relaying capacities over time which reflect changes in both internal and external demand.

In one embodiment, the demand of destination nodes is defined by the application (e.g., 5 mbps demand from each child node). The existence of such destination nodes on the overlay network is known to Adaptive Topology Server 300c which monitors when such destination nodes join or leave the overlay network.

Moreover, different destination nodes may have different traffic demands (whether measured or predicted). For example, in a broadcast video scenario, certain viewing nodes may be capable of streaming HD video, while others may be limited to SD video. Knowledge of such differing demands facilitates the task of Topology Selector 458b in determining an overlay network topology that redistributes excess capacity to satisfy such differing demands (in accordance with the defined performance criteria).

In other embodiments, Prediction Engine 455b is employed to predict the existence of a particular destination node as a viewer (represented, for example, by a binary "viewer indicator" dependent variable). In other words, Prediction Engine 455b is employed to predict which viewing nodes will be part of the overlay network topology-based, for example, on the prior behavior of such viewing nodes, as reflected by various metrics.

Moreover, Prediction Engine 455b is also employed to predict (from prior behavior) the "session duration" of such viewing nodes. For example, in one embodiment, viewing nodes with longer session durations are placed at higher levels of the overlay network topology to promote stability of the topology (since changes at higher levels of the overlay network topology have a greater impact and result in relatively more link changes).

Over time, destination nodes join the network and leave the network. By employing Prediction Engine 455b to correlate such decisions with observed metrics (including the amount of time that a destination node participates in the network to consume content items), it can predict whether a particular node will be part of the network at any given time (as well as provide cumulative information predicting the total number of nodes in the overlay network at any given time).

Distinguishing nodes that are likely to remain on the network from nodes that frequently disconnect from the network provides significant benefits. For example, nodes that frequently disconnect from the network (whether due to the viewer's intent or device problems) cause significant interruptions, particularly if they are configured at relatively higher levels of the overlay network topology. Whenever such nodes disappear from the network, the overlay network topology must be at least partially reconfigured, resulting in "ripple" effects downstream from such nodes. By placing such nodes at lower levels of the overlay network topology, such effects are reduced. Conversely, placing nodes with higher session durations at higher levels of the overlay network topology provides greater stability by minimizing the frequency of reconfigurations and resulting disruption.

Knowing in advance whether such low-duration or high-duration nodes will likely join the network (e.g., via viewer indicator predictions) enables advance planning, which in turn minimizes the time required to implement reconfigurations of the overlay network topology. Moreover, in one embodiment, a cumulative number of viewers is determined based on the viewer indicator and session duration predictions, which enables Topology Selector 458b to configure an overlay network topology optimized for the predicted number of cumulative viewers. Various optimizations of the overlay network topology (including use of heuristic algorithms) based on the cumulative number of viewers, as well as their individual or average session duration, will be apparent to those skilled in the art.

b. Node-Relaying and Link-Relaying Classifiers

Figure 6A:
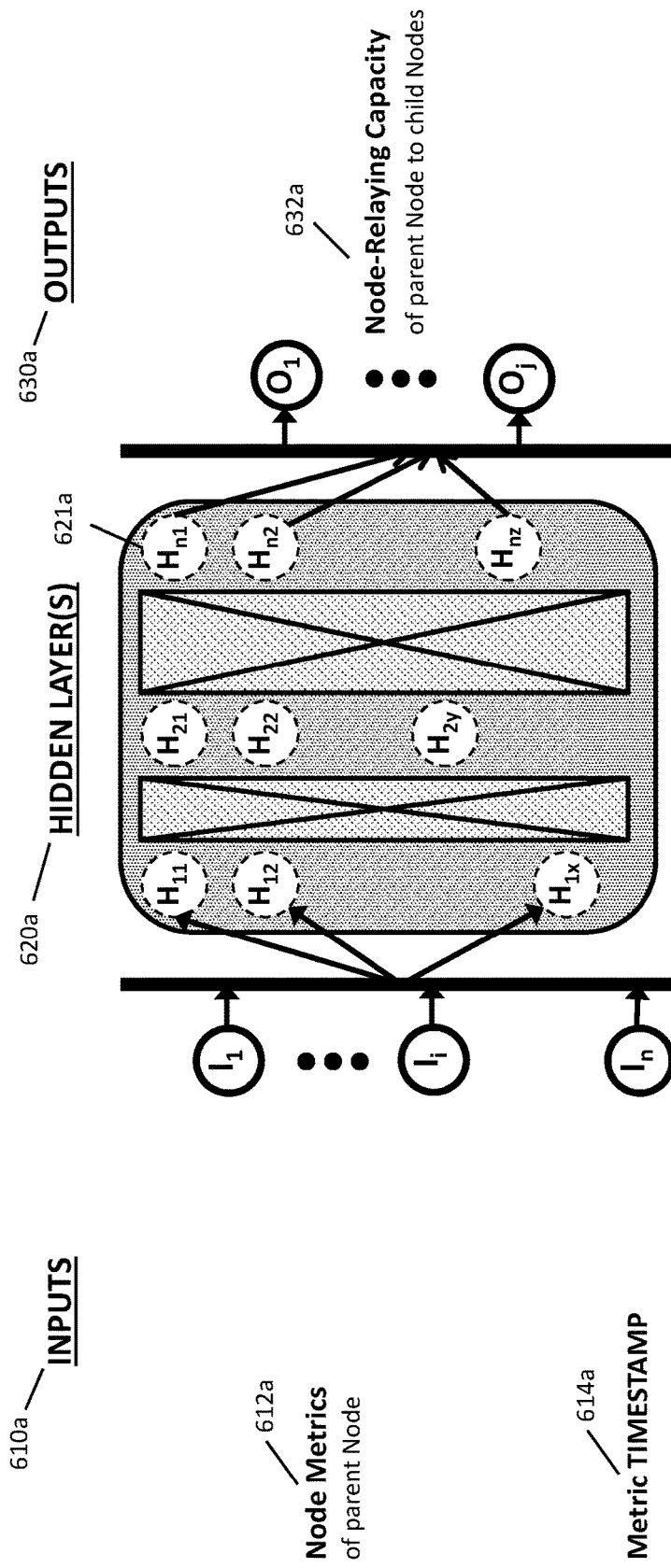
FIG. 6A is a diagram of one embodiment of the input and output nodes of a neural network implementation of a node-relaying classifier of the present invention that predicts the node-relaying capacity of a specified parent node to relay content to one or more child nodes.
Figure 6B:
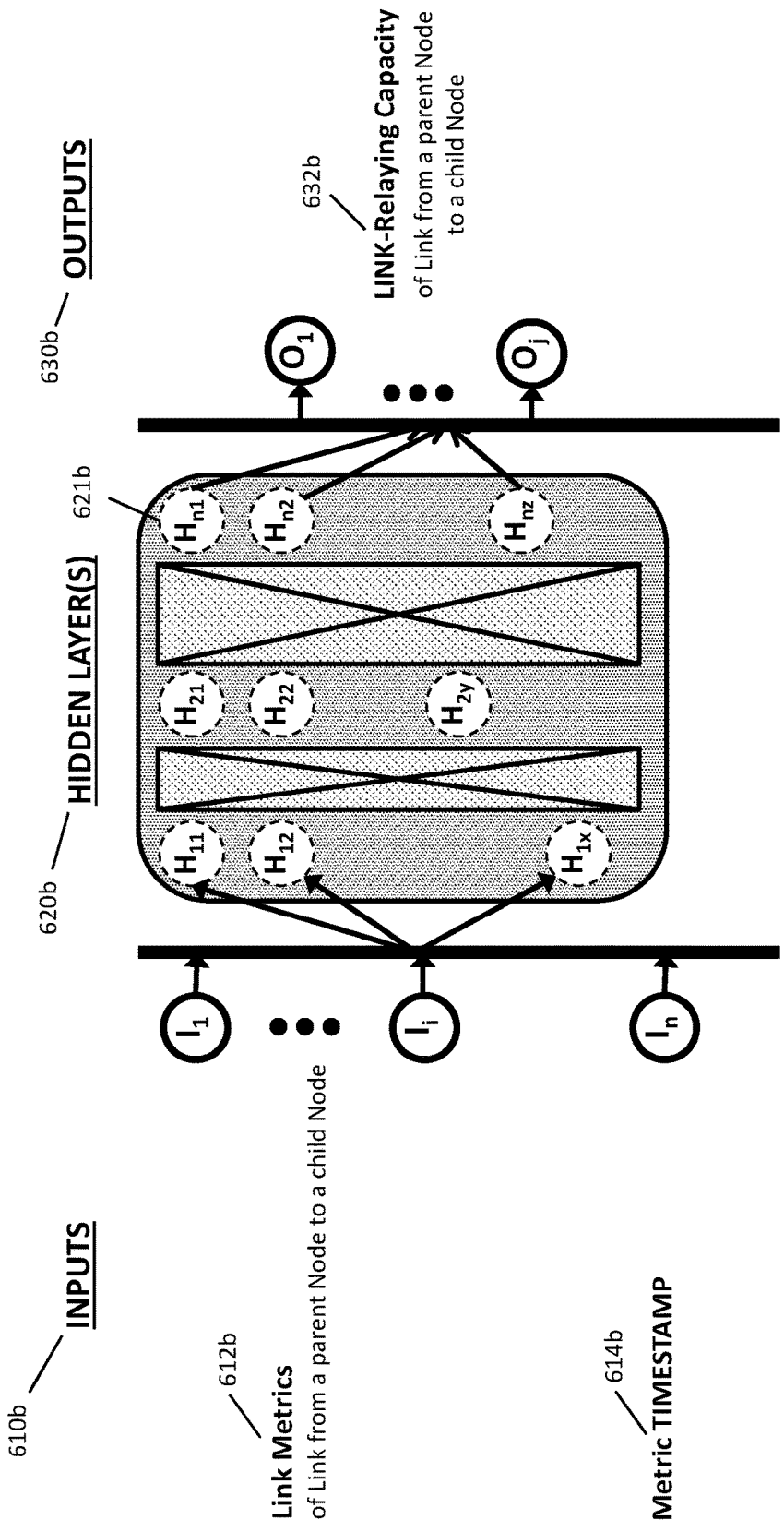
FIG. 6B is a diagram of one embodiment of the input and output nodes of a neural network implementation of a link-relaying classifier of the present invention that predicts the link-relaying capacity of a specified link to relay content from the parent node of that link to the specified child node of that link.

FIGS. 6A and 6B illustrate one embodiment of Prediction Engine 455b in which two neural network classifiers—a node-relaying classifier 600a and a link-relaying classifier 600b—are employed to generate (at a local node and link level) respective node-relaying capacity and link-relaying capacity predictions. Node-relaying classifier 600a in FIG. 6A generates node-relaying capacity predictions while link-relaying classifier 600b in FIG. 6B generates link-relaying capacity predictions. In other embodiments, Prediction Engine 455b generates only node-relaying capacity or link-relaying capacity predictions, but not both.

In the embodiment illustrated in FIGS. 6A and 6B, both neural network classifiers 600a and 600b implement a form of supervised machine learning. In other embodiments, unsupervised machine learning is employed to provide additional inputs to this process.

The neural networks of the present invention are employed specifically to correlate attributes of the nodes and links of an overlay network with the observed performance of such nodes and links. In one embodiment, these neural networks correlate (over successive time periods) node-relaying and link-relaying attributes (e.g., input node metrics and link metrics) with respective node-relaying and link-relaying performance values (reflecting the resulting performance experienced by child destination nodes) to facilitate respective node-relaying capacity and link-relaying capacity predictions.

In particular, a node-relaying classifier correlates node-relaying attributes (node metrics) with observed node-relaying performance values for the purpose of predicting the "capacity" of a prospective parent node to relay content to one or more child nodes. For example, assuming a 5 mbps demand from each child node, a predicted 13 mbps node-relaying capacity indicates that a prospective parent node is predicted to be capable of relaying content simultaneously to (and satisfying the demand from) two child nodes. A predicted node-relaying capacity below 5 mbps indicates that the specified parent node is not predicted to be capable of satisfying the demand from even a single child node, and thus should be a "leaf" node.

A link-relaying classifier correlates link-relaying attributes (link metrics) with observed link-relaying performance values for the purpose of predicting the capacity of a prospective link—i.e., the ability of the link to deliver content to the child node of that link. For example, again assuming a 5 mbps demand from each child node, a predicted 5 mbps link-relaying capacity indicates that the specified link is predicted to be capable of delivering content to (and satisfying the demand from) the specified child node of that link. A predicted link-relaying capacity below 5 mbps indicates that this link is not predicted to be capable of satisfying the demand of the specified child node, and thus should not be a link in the overlay network topology.

Such correlations and "relay capacity" predictions are part of a larger process (described below with respect to Topology Selector 458b) that involves resolving interdependencies (among prospective nodes and links of overlay network topologies) and redistributing excess relay capacity (to nodes in need of a new or better parent) to facilitate identification of an overlay network topology that satisfies defined performance criteria.

As discussed in greater detail below, Topology Selector 458b specifies a prospective parent node (e.g., node A) to node-relaying classifier 600a by providing current node-relaying attributes (node metrics) associated with node A, from which node-relaying classifier 600a generates a predicted node-relaying capacity value (e.g., 13 mbps) for prospective parent node A, which it delivers back to Topology Selector 458b.

Similarly, Topology Selector 458b specifies a prospective link (e.g., A→B) to link-relaying classifier 600b by providing current link-relaying attributes (link metrics) associated with the A→B link, from which link-relaying classifier 600b generates a predicted link-relaying capacity value (e.g., 5 mbps) for the prospective A→B link, which it delivers back to Topology Selector 458b.

c. Training of Node-Relaying and Link-Relaying Classifiers

It is important to recognize that neural network classifiers are trained to correlate observed inputs to observed outputs so as to predict outputs from inputs the classifiers may never have observed. In other words, classifiers generalize from specific observed data.

For example, if node A had never been a parent node, node-relaying classifier 600a would never have observed metrics relating to content transferred along a link from node A. Nevertheless, if Topology Selector 458b requests a node-relaying capacity prediction for node A, node-relaying classifier 600a will still generate such a prediction. As explained below with respect to the details of the training process, the accuracy of that prediction essentially depends on how similar the current input metrics associated with node A are to those associated with other nodes (perhaps including node A) provided to node-relaying classifier 600a over time (i.e., observed metrics from actual parent nodes).

In other words, actual parent nodes whose attributes have been observed over time effectively serve as a "proxy" for a prospective parent node having similar attributes. Both may be considered part of the same "class" of parent nodes that node-relaying classifier 600a has learned to correlate with node-relaying performance values experienced by the child nodes of that class of parent nodes. Correlating multiple input attributes to multiple output attributes is of course a relatively complex task, but one which is well-suited to supervised machine learning, as will be apparent to those skilled in the art of neural networks.

Similarly, if the A→K link had never been a link of any overlay network topology, link-relaying classifier 600b would never have observed metrics relating to content transferred along the A→K link. Nevertheless, if Topology Selector 458b requests a link-relaying capacity prediction for the A→K link, link-relaying classifier 600b will still generate such a prediction.

Here too, the accuracy of that prediction essentially depends on how similar the current input link metrics associated with the A→K link are to those associated with other links (perhaps including the A→K link) provided to link-relaying classifier 600b over time (i.e., observed metrics from actual parent-child links). As is the case with respect to node-relaying classifier 600a, actual links whose attributes have been observed by link-relaying classifier 600b over time effectively serve as a proxy for a prospective link having similar attributes.

Thus, in one embodiment, both node-relaying classifier 600a and link-relaying classifier 600b are trained by correlating node and link attributes with their respective node-relaying and link-relaying performance values without regard to the specific identity of the observed parent and child nodes.

For example, with reference to FIG. 6A, consider a training sample provided to node-relaying classifier 600a with respect to parent node A (which is currently relaying content simultaneously to child nodes B and C). In this example, links A→B and A→C are part of the current overlay network topology and the demand from each destination node is assumed to be 5 mbps.

Inputs 610a include node metrics 612a specific to node A, such as node A's connection type, uplink and downlink speed, etc. Inputs 610a also include a metric timestamp 614a which represents the time period during which the metrics for this training sample were collected (explained in greater detail below).

The outputs 630a of this training sample pertain to both child nodes B and C of the respective A→B and A→C links. In this example, the actual observed performance along the A→B and A→C links (e.g., a total of 8 mbps, comprised of 5 mbps along the A→B link and 3 mbps along the A→C link) are compared to the predicted node-relaying capacity 632a. In one embodiment, node-relaying classifier 600a calculates predicted node-relaying capacity 632a (as well as actual observed performance) as a function of one or more metrics, yielding a single value. In other embodiments, it generates multiple output values.

In one embodiment, all training samples to node-relaying classifier 600a are included, whether the actual observed performance reflects "capacity-limited" (where demand exceeds capacity) or "demand-limited" (where capacity equals or exceeds demand) observations. In other embodiments, in an effort to more accurately predict relay capacity, training samples to node-relaying classifier 600a are filtered to exclude demand-limited observations. In other words, because an observation was limited by the total demand of the child nodes, it is excluded because it may not accurately reflect the parent node's actual node-relaying capacity.

For example, if a parent node satisfied the total demand of its one or more child nodes (e.g., 5 mbps for one child node, 10 mbps for 2 child nodes, etc.), then that demand-limited training sample is excluded. Conversely, if the parent node failed to satisfy the demand of any of its child nodes (as in the above example in which node A had an 8 mbps node-relaying capacity, but only delivered 3 mbps along the A→C link), then its capacity-limited training sample is included.

In another embodiment, certain capacity-limited training samples are also excluded in the event that the apparent limited capacity was the result of an upstream dependency (e.g., if the parent of node A delivered only 3 mbps to node A) or a limitation imposed along the link itself (such as a congested intermediate routing node along the A→C link). In one embodiment, both of these conditions are determined by obtaining a link-relaying capacity prediction regarding the relevant link.

Regardless of the inclusion or exclusion of particular training samples, node-relaying classifier 600a continuously generates node-relaying capacity predictions. In other words, it is continuously trained in this embodiment (even though Topology Selector will not request node-relaying capacity predictions from node-relaying classifier 600a until it is deemed "sufficiently" trained). The differences between predicted node-relaying capacity 632a output values and actual observed output values (not shown) represent "errors" used for training node-relaying classifier 600a over time (as discussed below).

Note that this training sample with respect to node A is but one of many training samples provided to node-relaying classifier 600a during each time period. Other training samples relate of course to other nodes and links, as well as to the same nodes and links during successive time periods (including repeated submission of the same set of training data).

As noted above, node-relaying classifier 600a learns over time the correlation between node-relaying attributes and node-relaying performance values. For example, if node A has a 3G cellular connection to the Internet and delivers content to its child nodes relatively slowly, node-relaying classifier 600a does not specifically learn that node A is a "bad" parent, but instead learns more generally that prospective parent nodes with 3G cellular connections are bad parents. This process of course is more complex as more attributes (metrics) are considered and their values change frequently over time.

When node-relaying classifier 600a is employed by Topology Selector 458b to predict the node-relaying capacity 632a of a prospective parent node, it is supplied with inputs 610a (current node metrics 612a and current timestamp 614a) pertaining to a specified prospective parent node—perhaps even one that has never been a parent node. Based on those inputs 610a, node-relaying classifier 600a generates a prediction of the node-relaying capacity 632a of that specified prospective parent node, which reflects its ability to relay content to one or more (unspecified) child nodes.

In one embodiment, one or more hidden layers 620a are employed to facilitate more complex correlations among multiple inputs 610a and outputs 630a. In this embodiment, individual hidden neurons 621a represent "intermediate state" values (calculated as weighted sums or other more complex functions of the inputs to such neurons 621a). Employing a "forward propagation" process during training, the values of inputs 610a are transformed through these intermediate states to generate predicted output values, which are compared against the actual output values provided in each training sample.

As noted above, the differences between these generated and actual observed output values represent "errors" in the predictions generated by node-relaying classifier 600a. These errors are utilized to train node-relaying classifier 600a in a "back propagation" process (i.e., a form of statistical regression) that adjusts the weights used by the hidden neurons 621a to calculate their intermediate state values. Over time, as more representative training samples are provided, node-relaying classifier 600a gradually reduces these errors and thus improves its predictive capabilities. As will be apparent to those skilled in the art of neural networks and supervised machine learning, various different algorithms may be employed (including a single hidden layer or multiple "deep learning" hidden layers, as well as various unsupervised machine learning algorithms) without departing from the spirit of the present invention.

As referenced above, metric timestamp 614a is also included in inputs 610a, in addition to the node metrics 612a pertaining to a specified parent node. During training of node-relaying classifier 600a, timestamp 614a represents the time period during which the metrics for each training sample were collected. During use of node-relaying classifier 600a (by Topology Selector 458b to generate a node-relaying capacity 632a prediction with respect to a specified prospective parent node), timestamp 614a represents the time period during which node metrics 612a pertaining to that specified prospective parent node were obtained.

More significantly, however, timestamp 614a facilitates the correlation of node metrics to node-relaying performance values with respect to the "time" metric—i.e., with respect to recurring time-dependent patterns as demand changes over time. For example, to the extent other metrics reflect patterns that recur over time (such as greater traffic delays in the evening than in the morning, or on weekends than on weekdays, or in certain areas of the country during inclement weather), timestamp 614a provides valuable information enabling node-relaying classifier 600a to reflect the relative effects of the time metric when used to predict node-relaying capacity 632a during any particular time period. In one embodiment, timestamp 614a includes multiple values to distinguish days of the week and time of day (whether based on a global reference time such as GMT or a local time zone) as well as holidays, special events and various other values instead of, or in addition to, a single precise date/time value.

Just as timestamp 614a adds the dimension of "time" to the various node metrics, additional metrics are employed in other embodiments to reflect indirect factors (evidencing, in particular, changes in demand over time) that are "external" to the specific nodes and links of the current overlay network topology. For example, as noted above, external indicators of the impact on those nodes and links resulting from other applications and events on the underlying network are also included as inputs to Prediction Engine 455b.

Such external indicators include periodic popular or other bandwidth-intensive events such as the Super Bowl and season-ending episodes of popular televisions series. These events often result in increased traffic and delays affecting significant portions of the Internet, including the nodes and links of the current overlay network topology. Extended network outages and equipment failures (whether caused by inclement weather or other factors) are also included as inputs to Prediction Engine 455b in other embodiments. As noted above, such information may be obtained directly by monitoring network traffic over time, or indirectly from third parties that monitor Internet traffic and occasionally build regional or global Internet "traffic maps" revealing specific traffic patterns over time.

Turning to FIG. 6B, link-relaying classifier 600b performs in a very similar manner to that of node-relaying classifier 600a—with regard to its training as well as its use by Topology Selector 458b in generating predictions. As noted above, however, link-relaying classifier 600b generates predictions regarding the ability of a link to deliver content segments to a specified child node, whereas node-relaying classifier 600a generates predictions regarding the ability of a specified parent node to relay content segments to one or more unspecified child nodes. While this distinction may appear to be a subtle one, it is quite significant in the context of Topology Selector 458b identifying overlay network topologies that satisfy defined performance criteria, as discussed in greater detail below with reference to FIGS. 7A-7E.

Consider the example discussed above with reference to FIG. 6A, in which parent node A is currently relaying content simultaneously to child nodes B and C, and thus links A→B and A→C are part of the current overlay network topology. Unlike the single training sample generated for node-relaying classifier 600a, two training samples for link-relaying classifier 600b would be generated in the context of this example—one with respect to the A→B link and another with respect to the A→C link.

With respect to the link associated with either training sample, the inputs 610b to link-relaying classifier 600b include link metrics 612b, such as roundtrip ping times along the link, relative node metrics regarding the parent and child of the link and other link-relaying attributes. Inputs 610b also include metric timestamp 614b, which represents the time period during which the link metrics 612b were collected (as discussed above with respect to node-relaying classifier 600a and node metrics 612a).

The outputs 630b of link-relaying classifier 600b represent the observed performance or predicted capacity of the single link (as contrasted with the outputs 630a of node-relaying classifier 600a, which potentially reflect the simultaneous performance of multiple links). The training sample outputs 630b with respect to the A→B link in the above example equal 5 mbps, while those with respect to the A→C link equal 3 mbps. In one embodiment (as with node-relaying classifier 600a), link-relaying classifier 600b generates predicted link-relaying capacity 632b (and actual observed performance) as a function of one or more metrics, yielding a single value. In other embodiments, it generates multiple output values.

As is the case with node-relaying classifier 600a, all training samples to link-relaying classifier 600b are included (in one embodiment), whether the actual observed performance reflects capacity-limited (where demand exceeds capacity) or demand-limited (where capacity equals or exceeds demand) observations. In other embodiments, in an effort to better predict relay capacity, training samples to link-relaying classifier 600b are separated based upon whether they are capacity-limited or demand-limited. As a result (regardless of whether this separation is implemented in multiple classifiers or in separate components of a single classifier), when a link-relaying capacity prediction is requested with respect to a prospective link, link-relaying classifier 600b first determines whether the predicted capacity satisfies the demand of the child node. In one embodiment, link-relaying classifier 600b generates only a binary ("yes" or "no") result. In another embodiment, in the event such demand is not satisfied, link-relaying classifier 600b further generates a predicted capacity (e.g., 4 mbps, 3 mbps, etc.). Depending on the performance criteria and other factors, such a link may still be utilized by Topology Selector 458b (e.g., if no better link is available, or if the performance criteria imposes a 5 mbps demand on average, but not for every individual child node).

As with node-relaying classifier 600a, link-relaying classifier 600b continuously generates predictions—in this case, predictions of link-relaying capacity 632b—which it compares to actual observed output values to gradually reduce errors over time. It also relies on training samples associated with actual observed links during each time period, and across successive time periods (including repeated submission of the same set of training data).

When link-relaying classifier 600b is employed by Topology Selector 458b to predict the link-relaying capacity 632b of a prospective link, it is supplied with inputs 610b (currently-sampled link metrics 612b and timestamp 614b) pertaining to a specified prospective link—perhaps even one that has never been part of an actual observed overlay network topology. Based on those inputs 610b, link-relaying classifier 600b generates a prediction of the link-relaying capacity 632b of that specified link, which reflects the ability of the link to deliver content to the specified child node of that link.

As is the case with node-relaying classifier 600a, one or more hidden layers 620b are employed to facilitate more complex correlations among multiple inputs 610b and outputs 630b of link-relaying classifier 600b. Here too, individual hidden neurons 621b represent intermediate state values (calculated as weighted sums or other more complex functions of the inputs to such neurons 621b). In this embodiment, a forward propagation process is employed during training, transforming the values of inputs 610b through these intermediate states to generate predicted link-relaying capacity 632b values that are compared against the actual output values provided in each training sample. A back propagation process is employed to adjust the weights used by the hidden neurons 621b to calculate their intermediate state values.

Here too, timestamp 614b represents the time period during which the metrics for each training sample were collected (including the current time period) during use of link-relaying classifier 600b by Topology Selector 458b to generate a link-relaying capacity 632b prediction with respect to a specified prospective link. Moreover, as with node-relaying classifier 600a, timestamp 614b facilitates the correlation of link metrics to link-relaying performance with respect to the time metric, and thus with respect to recurring time-dependent patterns as described above (including the use of additional external indicators).

In one embodiment, the node-relaying capacity 632a of a prospective parent node and link-relaying capacity 632b of a prospective link are defined as application-specific functions of one or more metrics (e.g., metrics that best represent the user's experience). A simple function might include only a single throughput metric measured in mbps.

In other embodiments, node-relaying capacity 632a and link-relaying capacity 632b are defined as a more complex function of multiple metrics-potentially including any or all metrics collected or obtained by Adaptive Topology Server 300c. It will be apparent to those skilled in the art that the specific function employed with respect to a particular application (or content item) is a result of design and engineering tradeoffs aimed at distinguishing the relative performance of particular nodes and links in light of (current or future) underlying network congestion.

As noted above, however calculated and quantified, node-relaying capacity 632a represents the ability of a prospective parent node to relay content segments to one or more unspecified child nodes. while link-relaying capacity 632b represents the ability of a prospective link to deliver content segments to the specified child node of that link.

In one embodiment, a representative set of training samples is generated over a predetermined "historical duration" (typically a relatively long period of months or years). Each set of training samples is employed repeatedly to train node-relaying classifier 600a and link-relaying classifier 600b. For example, in one embodiment, the duration of each time period during which metrics are collected is one second, while the historical duration is two years. In other embodiments, an unlimited historical duration period is employed.

While metrics are collected, processed and submitted as training samples during each one-second time period, the set of metrics obtained during the historical duration period is also repeatedly submitted (over multiple "epochs" or iterations of previously submitted training samples). In this manner, node-relaying classifier 600a and link-relaying classifier 600b are continuously "re-trained" with relatively more recent metrics. In one embodiment, upon receiving a sufficiently diverse set of training samples during any historical duration period, node-relaying classifier 600a and link-relaying classifier 600b are deemed "sufficiently trained" to generate respective node-relaying capacity 632a and link-relaying capacity 632b predictions upon request from Topology Selector 458b.

As alluded to above, node-relaying classifier 600a and link-relaying classifier 600b generate respective node-relaying capacity 632a and link-relaying capacity 632b predictions with respect to changes in demand over time. In one embodiment, capacity-constrained training sample outputs are measured at various different points in time relative to the measurement of corresponding training sample inputs in an effort to reflect these changes in demand over time.

For example, if the input metrics are collected at "time n," the actual observed output metrics submitted to the classifiers are those collected at a later time (e.g., "time n+5" or 5 seconds later). By training the classifiers with such "future" output metrics, the subsequent node-relaying capacity 632a and link-relaying capacity 632b predictions reflect the impact of future demand on such predictions. In another embodiment, the output metrics submitted to the classifiers are those collected at the same time as the corresponding input metrics, reflecting the impact of current demand on these predictions. It will be apparent to those skilled in the art that the specific time differences employed to adequately reflect the frequency of significant changes in demand over time is application-specific, and is determined through a variety of well-known and proprietary statistical techniques (including time-series analyses of demand over time).

2. Topology Selector

At a high level, Topology Selector 458b determines an overlay network topology that satisfies defined application-specific performance criteria. Topology Selector 458b employs certain key resources to facilitate this task. In one embodiment, it employs Prediction Engine 455b to generate net relay capacity predictions for specified prospective nodes and links and relies on known demand defined by the application and the monitoring of nodes joining and leaving the network. In other embodiments, Prediction Engine 455b generates viewer indicator and session duration predictions to facilitate the determination by Topology Selector 458b of an overlay network that satisfies the performance criteria.

In one embodiment, Topology Selector 458b determines the excess capacity (if any) of existing and prospective parent nodes for the purpose of shifting traffic (e.g., by connecting additional nodes as child nodes of such parent nodes) to redistribute such excess capacity. To calculate such excess capacity, Topology Selector 458b utilizes known or predicted traffic demand along with known or predicted relay capacity information.

In one embodiment, Topology Selector 458b categorizes nodes based upon their relative relay capacity. Local node-relaying capacity 632a and link-relaying capacity 632b predictions provide such relay capacity information, though only at a local node and link level.

For example, predicted link-relaying capacity 632b values for the A→B and A→C links may be sufficient to indicate that node A is a suitable parent for node B or node C, but insufficient to determine whether node A has adequate excess relay capacity to relay content to both node B and node C simultaneously. Topology Selector 458b may obtain such information by requesting the node-relaying capacity 632a value for node A from Prediction Engine 455b.

However, Topology Selector 458b also considers the interdependencies among the nodes and links of any prospective overlay network topology. For example, unless the link to node A is sufficient to satisfy the demand from node A (e.g., 5 mbps), then node A cannot satisfy the demands of node B or node C, despite otherwise sufficient relay capacity predictions. Thus, while Topology Selector 458b utilizes the local node-relaying capacity 632a and link-relaying capacity 632b predictions generated by Prediction Engine 455b, it also performs a global assessment of whether any prospective overlay network topology satisfies the defined performance criteria.

As alluded to above, even if node A currently has no child nodes, it may have excess capacity to relay content to one or more child nodes. For example, if node A (or a "proxy" node with similar attributes) historically has relayed content simultaneously to multiple child nodes, then Prediction Engine 455b may generate a node-relaying capacity that exceeds the current total demand of node A's child nodes (if any).

It should be noted that a prospective parent node (whether adding a first child node or additional child nodes) may have excess capacity only with respect to particular child nodes (e.g., due to congestion along the links to other child nodes). Topology Selector 458b utilizes link-relaying capacity 632b predictions to identify suitable child nodes in this regard.

As discussed in greater detail below, Topology Selector 458b takes into account the interdependencies of upstream nodes and links within the context of an overlay network topology, in addition to the impact of network congestion (at a global topology level, as well as a local node and link level) on the prospective performance of any given overlay network topology and its component nodes and links.

In essence, Topology Selector 458b performs the task of identifying an overlay network topology that satisfies the performance criteria by assessing prospective overlay network topologies based upon the extent to which they redistribute excess capacity to nodes in need of a new or better parent—i.e., shifting network traffic to satisfy the performance criteria. The manner by which Topology Selector 458b implements this functionality to identify an overlay network topology that satisfies the defined performance criteria is described in greater detail below with reference to FIGS. 7A-7E and 8-11 (in which it performs a global topology-level analysis) and FIG. 7F (in which it performs a local or partial topology-level analysis).

It should be noted that, in one embodiment, Topology Selector 458b employs various optimization methodologies to generate an optimal overlay network topology that satisfies the performance criteria. In other embodiments (discussed below), various heuristic and other transformations are employed. It will be evident to one skilled in the art that any subset of these transformations can be employed in various different sequences within the scope of the present invention.

Topology Selector 458b also (in one embodiment) requests demand predictions (including viewer indicator and session duration predictions) from Prediction Engine 455b in order to facilitate its assessment of prospective overlay network topologies. For example, Topology Selector 458b gives priority to certain "supernodes" by selecting them as prospective parent nodes as well as placing them at relatively higher levels of the overlay network topology. Such supernodes include "subscriber" nodes whose users have paid for premium service as well as nodes (e.g., always-on set-top boxes) that have a relatively high node-relaying capacity and a relatively long predicted session duration. As discussed in greater detail below, Topology Selector 458b effectively balances excess capacity against session duration to minimize the disruption caused when nodes frequently leave the network.

a. Global Topology-Level Analysis

Figure 7A:
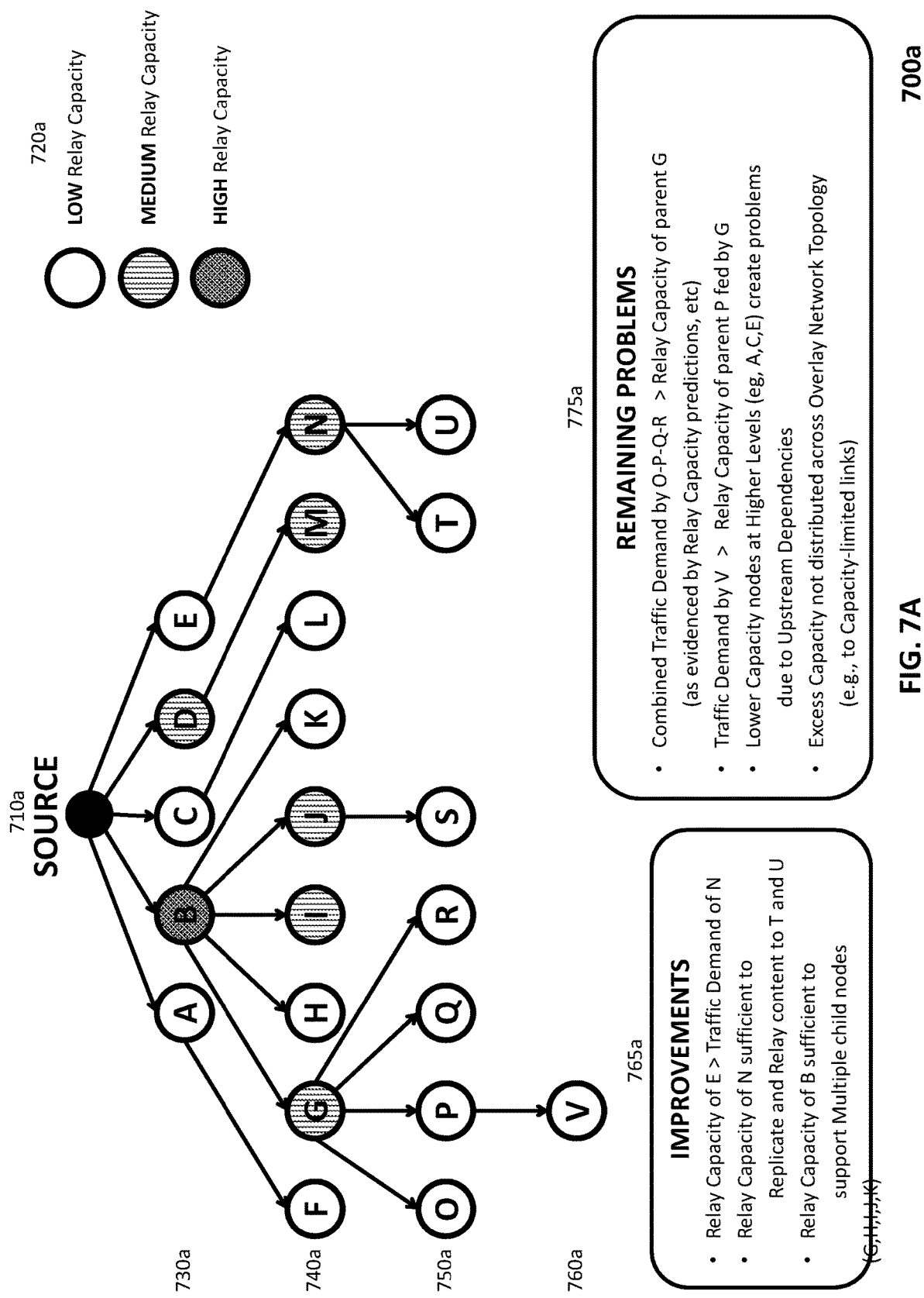
FIG. 7A is a graph illustrating one embodiment of the state of an overlay network topology following an initial configuration by the Topology Selector component of the Overlay Network Topology Manager illustrated in FIG. 3C.

Turning to FIG. 7A, graph 700a illustrates one embodiment of the state of an overlay network topology following an initial configuration by Topology Selector 458b. Beginning with the POI or source node 710a, Topology Selector 458b over time adds nodes to the overlay network (e.g., in response to "join" requests) and removes nodes from the overlay network (e.g., as they leave the network or otherwise become unresponsive), which requires some degree of reconfiguration of the overlay network topology by adding, removing and otherwise modifying existing links (even apart from reconfiguration of the overlay network topology to address performance issues and satisfy the performance criteria, discussed in greater detail below).

Graph 700a illustrates an initial configuration after a handful of nodes (A-V) have been added. As noted above, the use of a peer-based overlay network topology enables Topology Selector 458b to leverage the excess capacity of the peer nodes themselves, and shift traffic by redistributing such excess capacity to otherwise capacity-limited links.

Initially, Topology Selector 458b has little or no available performance data to determine how to interconnect initial nodes joining the network. In one embodiment, Topology Selector 458b relies on local relay capacity predictions to establish initial overlay network topologies. For example, a first node A is connected to the source node 710a. But a second node B may also be connected to source node 710a, or may be connected as a child node of node A.

Such initial decisions are not arbitrary, despite relatively little performance data, because they are based on known attributes of the initial nodes supplied to Prediction Engine 455b (such as a node's uplink speed), as well as similar attributes of "proxy" nodes and links (as discussed above). Over time, Topology Selector 458b obtains gradually more accurate relay capacity information (based on relay capacity predictions from Prediction Engine 455b) for the purpose of identifying nodes with excess capacity to relay content to one or more child nodes, as illustrated in graph 700a.

While illustrated categories 720a include low, medium and high relay capacities, these three categories are provided to simplify the explanation of graph 700a. In other embodiments, fewer or more categories are employed. In yet another embodiment, Topology Selector 458b utilizes the node-relaying capacity 632a of every node in the overlay network.

Graph 700a illustrates a 4-level overlay network topology that was configured as an initial set of nodes joined the overlay network—with nodes A-E at the "highest" level 730a (nearest source node 710a), following by nodes F-N at the next level 740a, nodes O-U at the third level 750a, and finally node V at the fourth and "lowest" level 760a.

Improvements 765a summarize key results of this initial configuration process. For example, while parent node E has a "low" relay capacity, the node-relaying capacity 632a values from Prediction Engine 455b are, in this scenario, sufficient to satisfy the traffic demand from node N.

Moreover node N (having a "medium" relay capacity) is also simultaneously satisfying the traffic demand from child nodes T and U. Similarly, node B (having a "high" relay capacity) is simultaneously satisfying the traffic demand from child nodes G, H, I, J and K. As discussed in greater detail below, Topology Selector 458b determines (e.g., by analyzing local node-relaying capacity 632a predictions) not only whether parent nodes B and N have sufficient excess relay capacity to relay content simultaneously to multiple child nodes, but also the number of such child nodes and the identification of particular suitable child nodes. For example, as noted above, a parent node such as node N may have sufficient excess capacity to relay content simultaneously to 2 child nodes (such as nodes T and U)—but not to relay content to 2 different child nodes (e.g., due to congestion along the links to such nodes, as evidenced by lower or insufficient link-relaying capacity 632b predictions).

Despite the work performed thus far by Topology Selector 458b in generating this initial overlay network topology illustrated in graph 700a, various problems remain, as illustrated in Remaining Problems 775a. It should be noted that, in one embodiment, Topology Selector 458b determines whether the performance criteria are satisfied at each stage of this process before deciding whether to reconfigure the current overlay network topology (e.g., to improve or optimize the overlay network topology, whether or not it currently satisfies the performance criteria).

Assuming that Topology Selector 458b addresses the Remaining Problems 775a in this scenario, it determines that node G is not currently satisfying the cumulative traffic demands from its four child nodes O, P, Q and R. For example, one or more of the link-relaying capacity 632b predictions regarding these 4 links may indicate that the traffic demand on that particular link or links is not satisfied. Similar predictions regarding the P→V link also indicate that the traffic demand on that link is not satisfied. The response by Topology Selector 458b to these problems is discussed below with reference to FIG. 7B.

Other more general problems include the fact that relatively lower relay capacity nodes (e.g., nodes A, C and E) are present at higher levels of the overlay network topology. Upstream dependencies on relatively lower relay capacity nodes can result in failures to satisfy the performance criteria that "ripple down" the levels of the overlay network topology.

Moreover, in this scenario, while the traffic demand from many nodes is satisfied by their parent nodes, the excess capacity of such parent nodes is not distributed across capacity-limited links of the current overlay network topology. As a result, capacity-limited problems are more likely to occur in the future. In an ideal scenario, traffic would be shifted to redistribute excess capacity to meet the demands of capacity-limited links while additional excess capacity remains available to address similar future concerns.

The response by Topology Selector 458*b* to these more general problems is discussed below with reference to FIGS. 7C and 7D. It should be noted that the solutions described in FIGS. 7B-7E are, in one embodiment, performed in parallel as part of a single reconfiguration process. In other embodiments, a subset of these processes is performed in a particular order and may be terminated at any point upon Topology Selector 458*b* identifying a replacement overlay network topology that satisfies the performance criteria. Nevertheless, each of these processes is described individually below for the purpose of illustrating how Topology Selector 458*b* improves the current overlay network topology, whether as part of a process of identifying an optimal overlay network topology or merely one that satisfies the performance criteria.

Figure 7B:
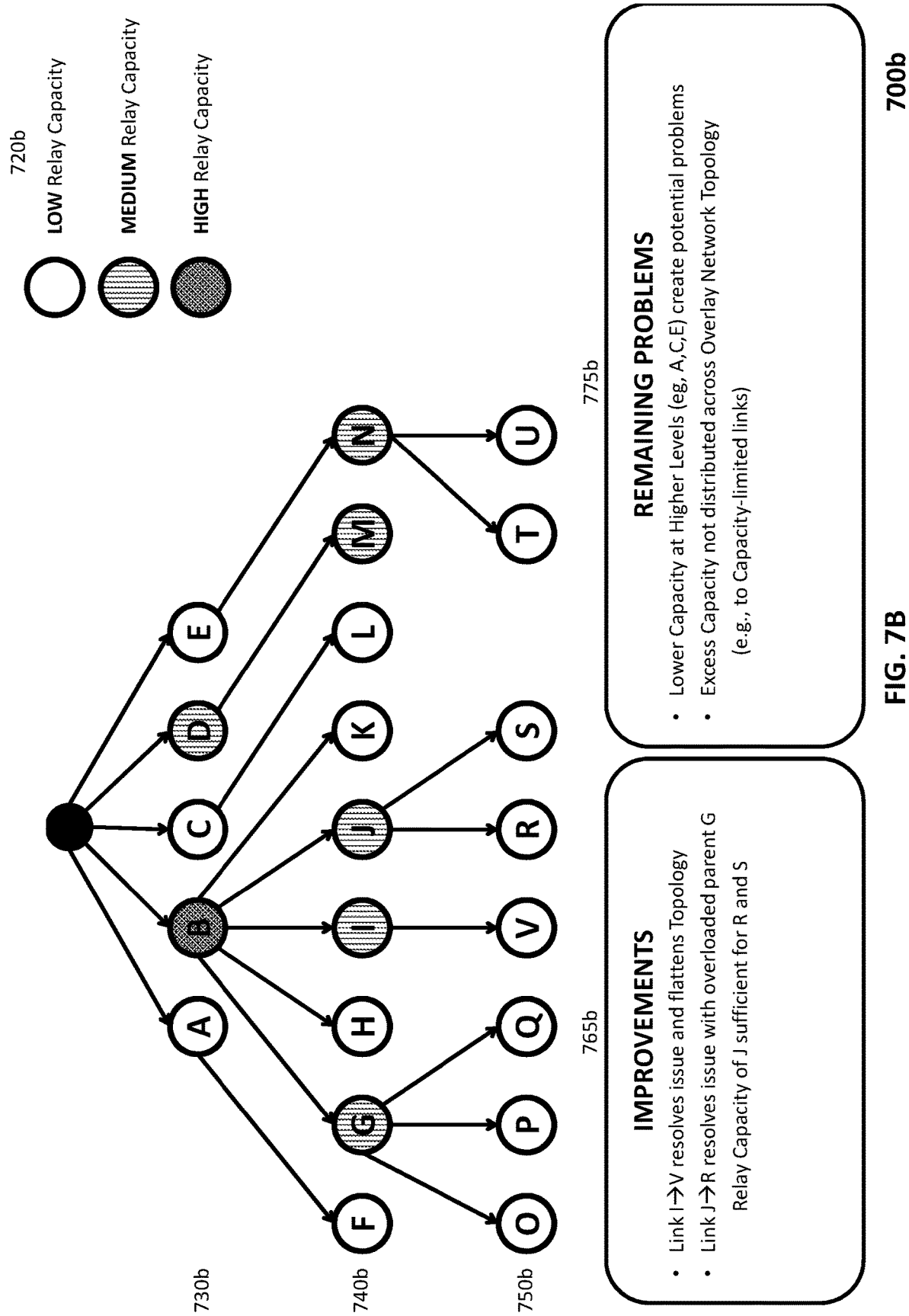
FIG. 7B is a graph illustrating one embodiment of the state of an overlay network topology following a "low performance" transformation by the Topology Selector component of the Overlay Network Topology Manager illustrated in FIG. 3C.
Figure 7C:
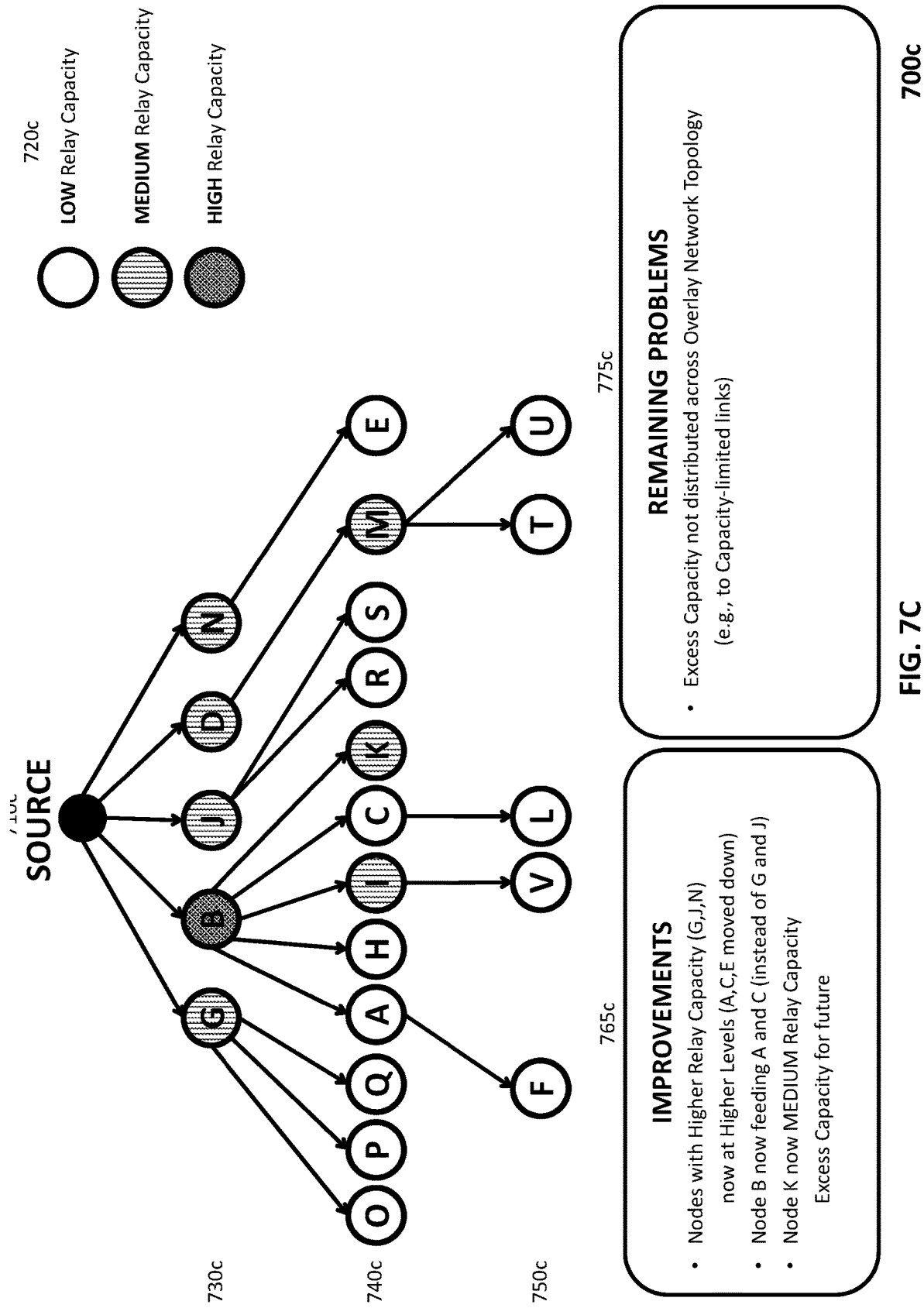
FIG. 7C is a graph illustrating one embodiment of the state of an overlay network topology following a "level shifting" transformation by the Topology Selector component of the Overlay Network Topology Manager illustrated in FIG. 3C.
Figure 7D:
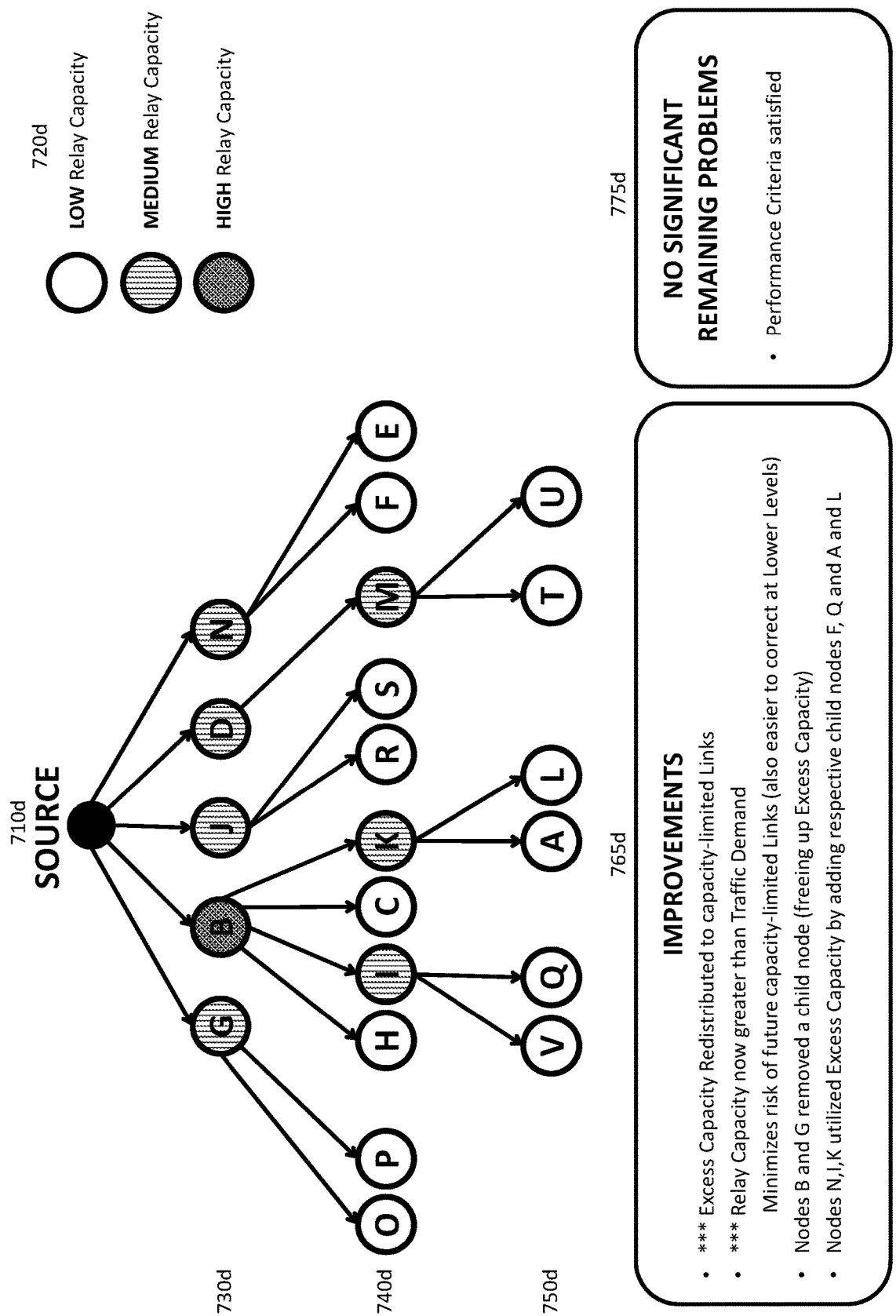
FIG. 7D is a graph illustrating one embodiment of the state of an overlay network topology following a "redistribution of excess capacity" transformation by the Topology Selector component of the Overlay Network Topology Manager illustrated in FIG. 3C.

Turning to FIG. 7B, graph 700*b* illustrates the modified state of the overlay network topology illustrated in FIG. 7A (fed from source node 710*b*) after Topology Selector 458*b* performs certain "low performance" transformations. As noted above, Topology Selector 458*b* may elect not to perform such transformations (e.g., if the performance criteria are already satisfied), or may elect to perform any of the transformations illustrated in FIGS. 7A-7E (or a local partial topology analysis as illustrated in FIG. 7F) in any order. It will be apparent to one skilled in the art that such design and engineering tradeoffs may be implemented without departing from the spirit of the present invention.

As shown in the Improvements 765*b*, Topology Selector 458*b* resolves the low performance of the P→V link by assigning node V to a different parent (node I), thus creating the I→V link. In one embodiment, node I is selected based in part upon the node-relaying capacity 632*a* prediction with respect to parent node I and the link-relaying capacity 632*b* prediction with respect to the I→V link. For example, node I and node M are both "medium" capacity nodes (per legend 720*b*) with no child nodes—and thus having potentially greater excess capacity. In this scenario, the link-relaying capacity 632*b* prediction with respect to the I→V link exceeded that of the M→V link.

In other embodiments, parent node I is selected based upon its level 740*b* (one level higher than former parent node P's level 750*b*) in an effort to reduce latency (e.g., by reducing the number of hops). In this embodiment, selecting a parent from an even higher level (e.g., 730*b*) is considered too disruptive, as the effects of this change will "ripple down" more of the overlay network topology and thus have more of a (potentially disruptive) downstream impact. The decision to minimize this level of disruption is but one example of the design and engineering tradeoffs made in the implementation of the functionality of Topology Selector 458*b*.

Similarly, Topology Selector 458*b* disconnects node R from "overloaded" parent node G and selects new parent node J to form the J→R link. In this scenario, child node R was disconnected based upon its relatively lower link-relaying capacity 632*b* predictions (as compared with those of parent node G's other child nodes—O, P and Q). Moreover, Topology Selector 458*b* determined that parent node J had sufficient excess capacity to relay content simultaneously to both node R and node S based upon parent node J's node-relaying capacity 632*a* and the link-relaying capacity 632*b* of the J→R and J→S links (among other factors).

Note that, while node M (also having a "medium" relay capacity) had no current child nodes (and thus potentially had excess capacity), the node-relaying capacity 632*a* prediction (regarding node M) and the link-relaying capacity 632*b* prediction (regarding the M→R link) in this scenario were not sufficiently high to "outscore" potential parent node J (despite the fact that node J already had an existing child node S). Here too, various design and engineering tradeoffs (made to select a sufficient or optimal parent node for disconnected node R) will be apparent to those skilled in the art without departing from the spirit of the present invention.

Despite these Improvements 765*b* with respect to "low performance" links, Remaining Problems 775*b* have yet to be addressed. In one embodiment, if the performance criteria are satisfied, Topology Selector 458*b* selects the reconfigured overlay network topology illustrated in graph 700*b* as a potential replacement for the current overlay network topology. In other embodiments, Topology Selector 458*b* seeks to further improve (or, in one embodiment, optimize) the overlay network topology.

For example, nodes with relatively lower relay capacities (such as nodes A, C and E) still exist at a high level 730*b* of the overlay network topology. As noted above, the downstream effects of relying on such nodes can result in various failures to satisfy traffic demand at lower levels of the overlay network topology, which in turn result in failures to satisfy the performance criteria. Moreover, in this scenario, additional capacity-limited links remain to be addressed by redistributing excess capacity from nodes such as node M and others. The manner in which Topology Selector 458*b* addresses these Remaining Problems 775*b* is discussed below with reference to FIG. 7C.

Graph 700*c* in FIG. 7C illustrates the modified state of the overlay network topology illustrated in FIG. 7B after Topology Selector 458*b* performs certain "level shifting" transformations. As noted above, the order and the extent of the transformations illustrated with respect to FIGS. 7A-7E (including decisions as to whether to employ optimization algorithms in addition to or in lieu of heuristic techniques) are the result of design and engineering tradeoffs within the scope of the present invention.

As shown in the Improvements 765*c*, Topology Selector 458*b* resolves the problem of relatively lower relay capacity nodes (per legend 720*c*) existing at relatively high levels of the overlay network topology by shifting nodes A, C and E from level 730*c* down to level 740*c*, while elevating nodes G, J and N up from level 740*c* to level 730*c*. Node B (having a high relay capacity) is still relaying content to 5 child nodes. But node B is now relaying content to nodes A and C (in addition to nodes H, I and K), as nodes G and J have been elevated to level 730*c*. As a result of such "level shifting" transformations, fewer capacity-limited links are likely to exist at higher levels of the overlay network topology.

Moreover, relatively higher relay capacity nodes (such as G, J and N) now relay content to child nodes at higher levels, ultimately resulting in lower latency. For example, while node G (now at level 730*c*) still relays content to child nodes O, P and Q (now at level 740*c*), these nodes are in closer network proximity to source node 710*c*, leaving fewer nodes at the lowest level 750*c* of the overlay network topology (and thus fewer overall hops). As noted above, the number of hops from source node 710*c* is a relevant (though not determinative) factor in overall performance.

Finally, it should be noted that node K is now categorized as having a medium relay capacity (rather than its prior low relay capacity). This illustrates that the relay capacity of nodes not only varies with respect to its prospective child nodes, but also varies over time based upon changes in performance metrics. As noted above, such changes may be the result of various factors. For example, node K's uplink speed may be increasing over a given time period. Or the links from node K to its existing child nodes may be less congested over that time period. Regardless of the reason for these changes, Topology Selector 458b adapts to such changes, as discussed below with reference to FIG. 7D.

In one embodiment, Topology Selector 458b employs session duration predictions to facilitate the placement of nodes at relatively higher or lower levels of the overlay network topology—i.e., trading off capacity against session duration. For example, the placement of a high-capacity node with a low predicted session duration at a high level of the overlay network topology may result in frequent and significant disruptions whenever that node leaves the network—including additional time-consuming reconfigurations of the overlay network topology, which in turn will negatively impact the ability of Adaptive Topology Server 300c to continually satisfy the performance criteria over time.

Despite the Improvements 765c resulting from these "level shifting" transformations, there still exist Remaining Problems 775c that have yet to be addressed. Here too, if the performance criteria are satisfied, Topology Selector 458b (in one embodiment) selects the reconfigured overlay network topology illustrated in graph 700c as a potential replacement for the current overlay network topology. In other embodiments, Topology Selector 458b seeks to further improve (or, in one embodiment, optimize) the overlay network topology, as illustrated below with reference to FIG. 7D.

Remaining Problems 775c include the existence of capacity-limited links that have yet to be addressed by redistributing excess capacity from elsewhere in the overlay network topology. For example, in this scenario, links B→A, A→F, G→Q and C→L are still capacity-limited, as indicated by their respective link-relaying capacity 632b predictions obtained from Prediction Engine 455b. The manner in which Topology Selector 458b addresses these Remaining Problems 775c is discussed below with reference to FIG. 7D.

Graph 700d in FIG. 7D illustrates the modified state of the overlay network topology illustrated in FIG. 7C after Topology Selector 458b performs certain "redistribution of excess capacity" transformations. As noted above, the order and the extent of the transformations illustrated with respect to FIGS. 7A-7E (including decisions as to whether to employ optimization algorithms in addition to or in lieu of heuristic techniques) are the result of design and engineering tradeoffs within the scope of the present invention.

As shown in the Improvements 765d, Topology Selector 458b resolves the problems of capacity-limited links B→A, A→F, G→Q and C→L by making various link changes to reassign the child nodes of such links to parent nodes with excess capacity (and also, in one embodiment, with sufficiently high session-duration predictions).

For example, Topology Selector 458b freed up excess capacity (for the future) at highest level 730d (nearest source node 710d) by disconnecting node A from node B (having a high relay capacity per legend 720d) and node Q from node G. It also disconnected node F from the capacity-limited A→F link and node L from the capacity-limited C→L link.

Having previously elevated node N to level 730d (based on an assessment of its excess capacity), Topology Selector 458b assigned disconnected node F as a second child node to node N (joining child node E). Note that node N had previously demonstrated sufficient capacity to relay content to multiple child nodes (T and U). As noted above, however, that fact alone is not sufficient to demonstrate excess capacity along the N→F link. In this scenario, however, the node-relaying capacity 632a prediction (regarding node N) and the link-relaying capacity 632b prediction (regarding the N→F link) provided sufficient evidence of such excess capacity.

Moreover, Topology Selector 458b assigned disconnected node Q as a second child node to parent node I (having a medium relay capacity), joining child node V. It also assigned disconnected nodes A and L to parent node K (recently elevated to medium relay capacity). These parent assignments (from level 740d to 750d) effectively redistribute excess capacity to various child nodes of formerly capacity-limited links.

As a result, no significant Remaining Problems 775c exist, and Topology Selector 458b confirmed that the performance criteria are satisfied (at least for the present time). By freeing up excess capacity at higher levels of the overlay network topology, Topology Selector 458b provides options for addressing future capacity-limited problems at relatively higher levels (fewer hops from source node 710d).

Figure 7E:
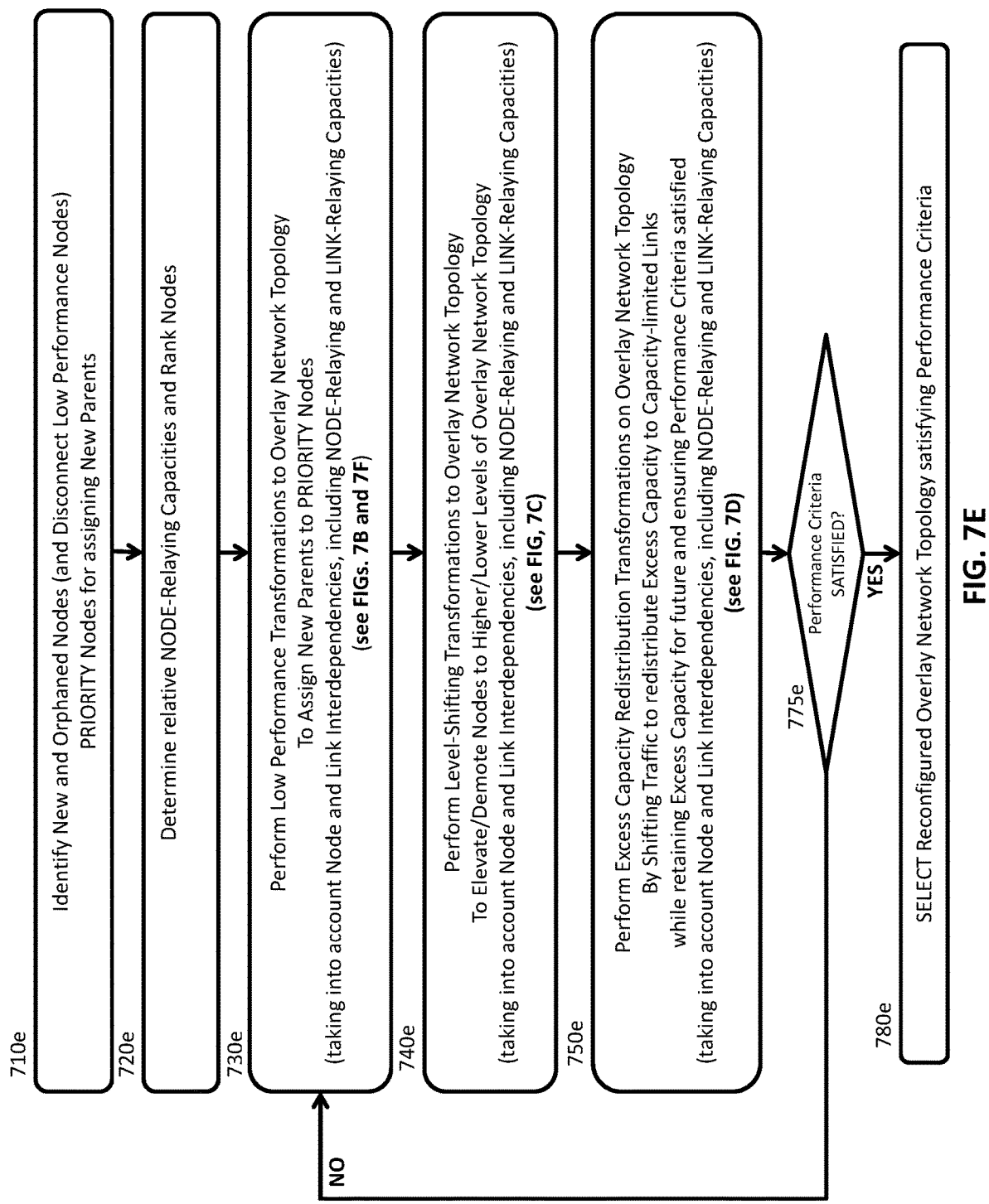
FIG. 7E is a flowchart illustrating one embodiment of initial configuration and reconfiguration transformations performed by the Topology Selector component of the Overlay Network Topology Manager illustrated in FIG. 3C.
Figure 7F:
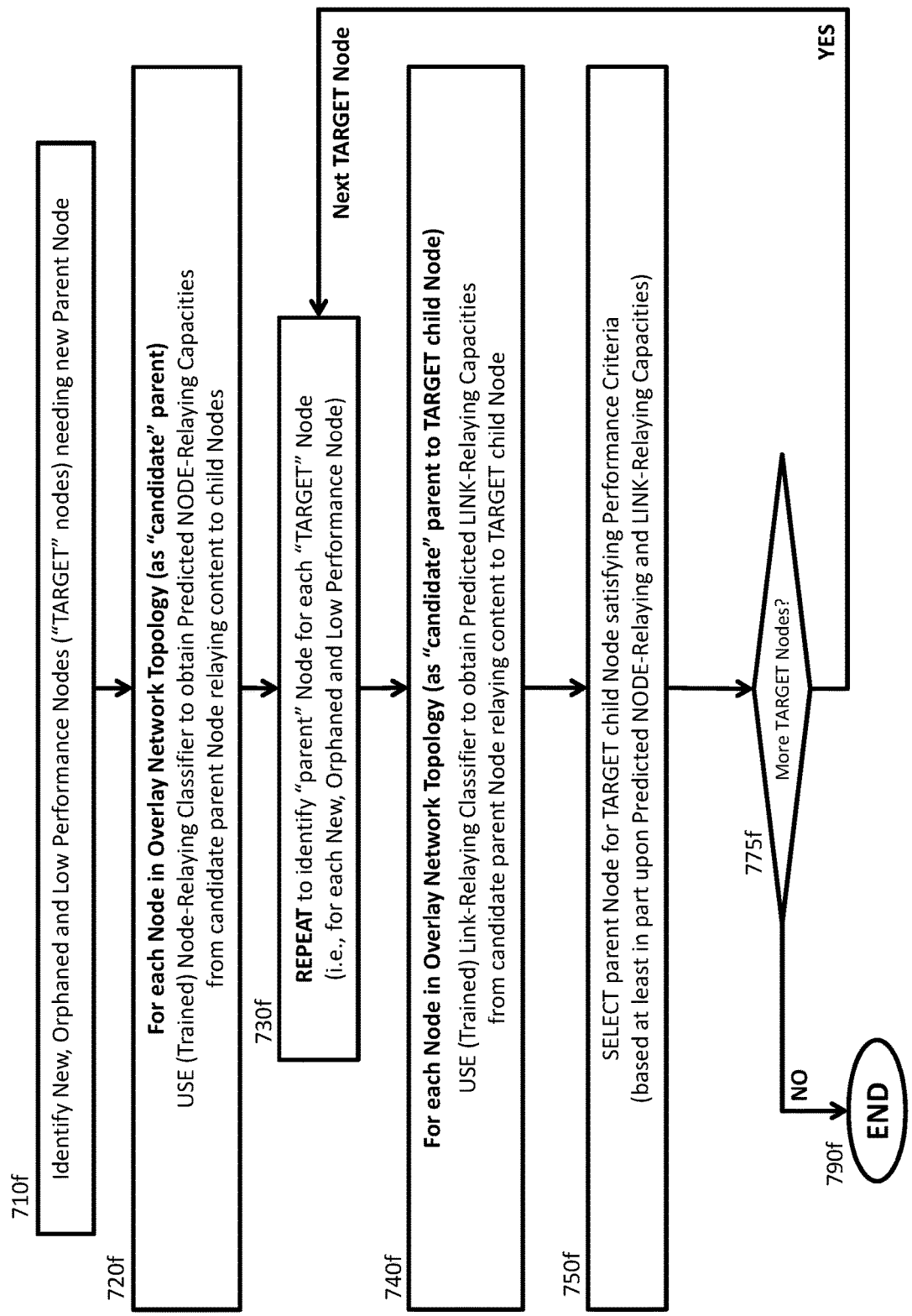
FIG. 7F is a flowchart illustrating an alternative embodiment of key steps of the Topology Selector component of the Overlay Network Topology Manager illustrated in FIG. 3C, in which new, orphaned and low performance nodes are identified as requiring new parents in order to facilitate a "local" reconfiguration of a current overlay network topology.

Turning to FIG. 7E, flowchart 700e illustrates one embodiment of the various initial configuration and reconfiguration transformations performed by Topology Selector 458b. As noted above, in other embodiments, Topology Selector 458b identifies an optimal overlay network topology or performs a subset of these transformations in a different order until the performance criteria are satisfied. It will be apparent to those skilled in the art that this functionality can be combined in many different ways to satisfy the performance criteria without departing from the spirit of the present invention.

Beginning with step 710e, Topology Selector 458b identifies new and orphaned nodes. As noted above, in one embodiment, new nodes initiate requests to Adaptive Topology Server 300c, while orphaned nodes are identified by Overlay Network Topology Manager 350c when their parents explicitly leave the network or fail to respond for a predefined threshold period of time. In other embodiments, Prediction Engine 455b generates viewer indicator and session duration predictions that facilitate this determination by Topology Selector 458b. Topology Selector 458b identifies these new and orphaned nodes because they are in need of new parents, wholly apart from performance-based reconfiguration.

In addition to these new and orphaned nodes, Topology Selector 458b also, in one embodiment, identifies "low performance" nodes (i.e., child nodes of capacity-limited links) and disconnects them from their current parent nodes (as discussed above with reference to FIG. 7B). In this embodiment, these new, orphaned and disconnected nodes become priorities for being assigned new parents.

In step 720e, Topology Selector 458b determines the node-relaying capacities 632a of current and prospective parent nodes and ranks such nodes accordingly (as discussed above with reference to FIG. 7A). As noted above, such nodes are ranked in categories in one embodiment, while in other embodiments such nodes are ranked according to their individual node-relaying capacities 632a.

In step 730e, Topology Selector 458b performs low performance transformations (as discussed above with reference to FIG. 7B, and below with reference to FIG. 7F) to assign new parents to the previously identified new, orphaned and disconnected nodes. In step 740e, Topology Selector 458b performs level shifting transformations (as discussed above with reference to FIG. 7C) to elevate nodes with relatively higher relay capacities to higher levels of the overlay network topology (and demote nodes with relatively lower relay capacities to lower levels of the overlay network topology). In another embodiment, Topology Selector 458b also imposes a predefined limit on the number of hops to any destination node. As discussed above, such decisions take into account node and link interdependencies, as well as node-relaying capacity 632a and link-relaying capacity 632b predictions.

In step 750e, Topology Selector 458b performs excess capacity redistribution transformations (as discussed above with reference to FIG. 7D). As noted above, some excess capacity is redistributed by shifting traffic where needed, while remaining excess capacity is freed up (particularly at higher levels of the overlay network topology) to address future issues of limited capacity. As with step 740e above, such decisions take into account node and link interdependencies, as well as node-relaying capacity 632a and link-relaying capacity 632b predictions.

In one embodiment, Topology Selector 458b repeatedly performs steps 730e, 740e and 750e. Each of these steps is performed sequentially or, in another embodiment, concurrently—e.g., in the context of optimization algorithms) until the resulting overlay network topology satisfies the performance criteria per step 775e (or in other embodiments until an optimal overlay network topology is generated). In step 780e, the resulting overlay network topology (that satisfies, or comes closest to satisfying, the performance criteria) is selected for potential reconfiguration of the current overlay network topology.

While FIGS. 7A-7D illustrate overlay network topologies with a relatively small number of nodes, these concepts are equally applicable to significantly larger overlay network topologies involving virtually any number of nodes and interconnecting links in essentially any type of graph. In one embodiment, Topology Selector 458b employs Prediction Engine 455b to obtain node-relaying capacity 632a and link-relaying capacity 632b predictions, while demand is known based on the defined performance criteria and monitored activity of viewing nodes. In another embodiment, Prediction Engine 455b predicts demand (based on viewer indicator and session duration predictions) as described above. In other embodiments, some or all of these capacity-related and demand-related values are measured, rather than predicted.

In one embodiment, once Topology Selector 458b identifies a prospective overlay network topology that satisfies the performance criteria, it stops processing and delivers that overlay network topology for potential replacement of the current overlay network topology, as described above. In other embodiments, Topology Selector 458b assesses all prospective overlay network topologies and selects the "optimal" one. In another embodiment, the optimal topology is the one that "best satisfies" (or comes closest to satisfying) the performance criteria.

In other embodiments, Topology Selector 458b limits the number of prospective overlay network topologies by limiting the number of prospective links for which it requests link-relaying capacity 632b predictions from Prediction Engine 455b—i.e., by reducing or filtering out nodes that are least likely to be qualified parent nodes. For example, in one embodiment, Topology Selector 458b selects the "lowest performing" nodes and excludes such nodes from consideration.

In yet another embodiment, Topology Selector 458b first obtains node-relaying capacity 632a predictions from Prediction Engine 455b, and only considers as potential parents those nodes with the highest predicted capacity. For example, 80% of potential parent nodes are eliminated by selecting only those nodes in the top 20% of node-relaying capacity 632a predictions. As a result, the number of prospective link-relaying capacity 632b predictions is substantially reduced, as only those nodes in the top 20% are parents of a specified prospective link. It will be apparent to those skilled in the art that determination of an appropriate number or percentage of excluded nodes and/or links is the result of various application-specific design and engineering tradeoffs.

In these embodiments in which nodes (and thus links) are excluded from consideration by Topology Selector 458b, the excluded nodes and links must still be considered, as they still must receive content as part of the identified (reconfigured) overlay network topology. If such nodes are not currently parent nodes, their inclusion (as a leaf node) has no downstream effects. However, if such nodes are current parent nodes, then Topology Selector 458b performs an additional step (in one embodiment) upon completion of the process described above. In this additional step, these excluded parent nodes are reassigned as "new" nodes, and their child nodes are reassigned as "orphaned" nodes. Topology Selector 458b effectively reconfigures its selected overlay network topology to integrate these new and orphaned nodes, employing an approach described below with reference to FIG. 7F.

b. Local (Node and Link Level) Analysis

In addition to the global "topology-level" approaches described above, including those with reduced permutations of prospective overlay network topologies and component links and nodes, Topology Selector 458b also employs local (node and link level) approaches in other embodiments, including local optimization. In one embodiment, Topology Selector 458b selects a subset of the current overlay network topology on which it performs the analysis described with respect to FIGS. 7A-7E above. For example, given the nature of upstream dependencies discussed above, changes at lower levels of a tree-based topology are less likely to have significant downstream impact.

In one embodiment, Topology Selector 458b analyzes the "lower" portion of the current overlay network topology in a "bottom up" approach, rather than identifying a completely independent "new" overlay network topology that satisfies the performance criteria. In other words, Topology Selector 458b analyzes each "level" of the tree, beginning with the lowest levels (nearest the "leaf" nodes). Topology Selector 458b analyzes each successively higher level of the tree until a predetermined "percentage improvement" is achieved (and the performance criteria are met), at which point the reconfiguration process terminates.

In other embodiments, Topology Selector 458b performs local optimization of selected levels of the current overlay network topology, based upon "trouble areas" identified by performing periodic performance assessments of various component areas of the current overlay network topology. In other words, portions of the topology that exhibit "declining performance" are reconfigured but without explicit regard for the downstream effects of such reconfiguration (which are considered by the global approaches discussed above).

In one embodiment, illustrated in flowchart 700f of FIG. 7F, Topology Selector 458b employs an alternative "child-centric" (rather than "parent-centric") approach. Rather than limiting the number of parent nodes (and thus links) to be analyzed, Topology Selector 458b identifies the child nodes that "require" a new parent, and then identifies a "sufficient" or "optimal" parent for such nodes—as opposed to holistically identifying an overlay network topology that satisfies the performance criteria.

In other words, only links to that subset of nodes are modified. Once those nodes are assigned new parent nodes, the remaining links in the current overlay network topology are undisturbed (until that reconfigured overlay network topology is reassessed).

For example, in step 710f, Overlay Network Topology Manger 350c identifies three groups of peer nodes that require a new parent node. The first group includes new nodes that have requested viewing (consumption) of the content item since Topology Selector 458b last reassessed the current overlay network topology. The second group includes orphaned nodes whose parent nodes left the network or ceased viewing or consuming the content item.

As noted above, in one embodiment, these new and orphaned nodes also include nodes that were excluded from consideration during the global approach described with respect to FIGS. 7A-7E above. In this embodiment, the exclusion or filtering processes described above precede this process described with respect to flowchart 700f.

The third group includes "low performance" nodes—i.e., nodes whose performance either fails to satisfy the defined performance criteria or falls below a threshold level of performance and is thus deemed to be in danger of failing to satisfy the performance criteria in the near future. In one embodiment, a threshold performance level is determined based upon node-relaying capacity 632a predictions obtained with respect to the parent node of a prospective "low performance" node. For example, those nodes whose parent node has a predicted value below a threshold performance level are considered "low performance" nodes.

In one embodiment, a maximum number (or ceiling) of low performance nodes is identified during each time period. In another embodiment, the threshold performance level is variable, based on a floor (as well as a ceiling) of low performance nodes.

Once these "target" new, orphaned and low performance nodes have been identified as requiring a new parent node, Topology Selector 458b requests, in step 720f, node-relaying capacity 632a predictions from Prediction Engine 455b. Because node-relaying capacity 632a predictions require specification only of node metrics associated with the parent node, step 720f is performed only once (in this embodiment) for each prospective parent node because this same node-relaying capacity 632a prediction apples to all target child nodes.

In one embodiment, node-relaying capacity 632a predictions are requested for all nodes consuming the content item, as all such nodes are prospective parents of any given target node. In other embodiments, node-relaying capacity 632a predictions are requested for only a subset of prospective parent nodes (e.g., based upon historical "bad parent" metrics as described above).

Having obtained all relevant node-relaying capacity 632a predictions, step 730f initiates the process (repeated for each target node) of identifying a "suitable" parent for the target node. Topology Selector 458b requests from Prediction Engine 455b, in step 740f, link-relaying capacity 632b predictions (and, in another embodiment, viewer indicator and session duration predictions) for each prospective link to the current target node being processed. In other words, for each prospective parent node being considered (determined in step 720f above), a link-relaying capacity 632b prediction is requested for the link from that parent node to the current target node being processed. In one embodiment, certain links are excluded based upon the exclusion of the prospective parent node (of the target child node) as a "bad parent," based on the same considerations described with respect to step 720f above.

Topology Selector 458b then determines, in step 750f, the parent for that current target—based on the node-relaying capacity 632a predictions from step 720f above and the link-relaying capacity 632b predictions from step 740f above. In one embodiment, for each given target node, an optimal parent node is selected based upon the performance criteria—i.e., the parent node that "best satisfies" (or comes closest to satisfying) the performance criteria. In other embodiments, this process is completed once any "suitable" parent node is identified—i.e., a parent node that satisfies the performance criteria.

In another embodiment, if multiple parent nodes have a sufficient link-relaying capacity 632b to the target child node (and sufficient excess capacity to add the target child node to its existing child nodes, if any), the parent node with the highest excess capacity is selected. In other embodiments, the parent node with the lowest (albeit sufficient) excess capacity is selected. Various other algorithms for selecting a suitable parent for a target node will be apparent to those skilled in the art.

If target nodes remain (per step 775f), the process repeats from step 730f because (as noted above), node-relaying capacity 632a predictions have already been obtained for all prospective parent nodes (of any prospective target child node). Once a suitable (or optimal) parent node is selected for all target nodes, the process ends in step 790f.

c. Additional Global Topology-Level Optimization Scenarios

In another embodiment, Topology Selector 458b is employed in conjunction with a CDN for the purpose of offloading network traffic from the CDN onto specified nodes of an overlay network topology of the present invention. A primary goal of this embodiment is to connect a "source" node of the CDN (from which a particular content item, such as a broadcast video, originates) directly to as few nodes of the overlay network topology as is feasible, given the constraints (performance criteria) specified for any particular application.

These nodes that are directly connected to the CDN are referred to herein as "collectors." In this embodiment, an overlay network topology ideally would include only a single collector, which relays content item segments among the other nodes of the overlay network topology. If the performance criteria cannot be satisfied with a single collector, then additional collectors may be employed to satisfy the performance criteria. In this manner, the CDN will effectively offload as much bandwidth as is feasible to the overlay network of the present invention.

We refer to this embodiment as a "global" topology-level approach because the Topology Selector 458b generates an entire overlay network topology each time it performs its analysis, without regard to the existing overlay network topology. As noted above, local (node and link level) approaches, including local optimization, may be employed in other embodiments.

We also refer to this embodiment as performing global "optimization" in that the overlay network topology generated by Topology Selector 458b is optimized for the fewest number of collectors, while still satisfying the specified performance criteria. It will become apparent from the discussion below that, in other embodiments, Topology Selector 458b may generate a sub-optimal overlay network topology without departing from the spirit of the present invention.

For example, certain engineering tradeoffs may result in the selection of an overlay network topology with two collectors, rather than expend significant resources exhaustively evaluating the unlikely possibility of a "corner case" single-collector solution (or even a "better" two-collector solution that provides additional benefits over the selected "equally optimal" two-collector solution).

As also noted above, Topology Selector 458b performs its analysis and generates a new overlay network topology not only to accommodate nodes as they are added to or removed from the network, but also to improve performance while satisfying defined performance criteria. Thus, even if no nodes have been added to or removed from the network since its generation of the current overlay network topology, Topology Selector 458b may still generate a new and improved overlay network topology including those same nodes (e.g., moving from a three-collector to a two-collector solution).

Figure 8:
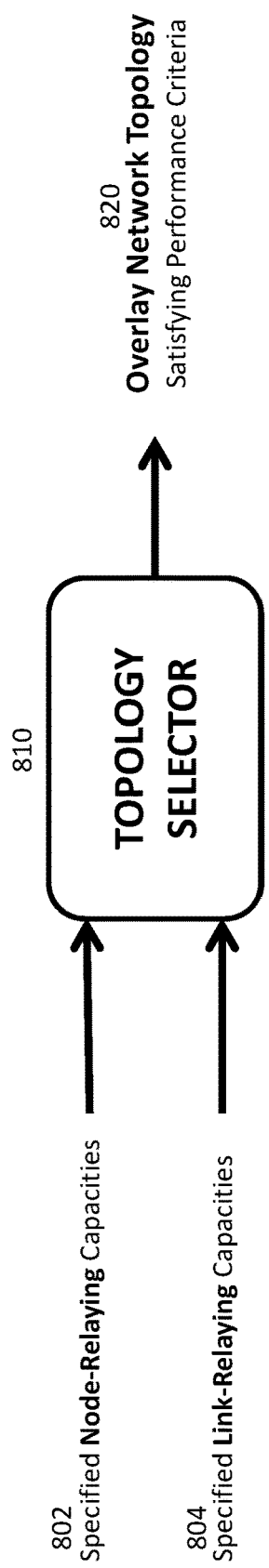
FIG. 8 is a block diagram illustrating a high-level embodiment of the "Topology Selector" component of the "Overlay Network Topology Manager" illustrated in FIG. 3C.

Turning to FIG. 8, block diagram 800a illustrates a high-level embodiment of the functionality of the topology selector component of the present invention, in which Topology Selector 810 generates an overlay network topology 820 that satisfies the performance criteria based on at least two available factors (whether generated as predictions by Prediction Engine 455b, or otherwise generated based on observed performance of nodes and links as well as other factors): (1) specified node-relaying capacities 802 and (2) specified link-relaying capacities 804.

In other words, Topology Selector 810 considers these two factors (and perhaps others) in generating an overlay network topology 820 that satisfies the specified performance criteria. For each specified node, Topology Selector 810 obtains its node-relaying capacity 802. In one embodiment, the node-relaying capacity 802 of a potential parent node is expressed in terms of the maximum number of child nodes to which that potential parent node can relay content item segments simultaneously while satisfying the performance criteria.

For example, potential parent node "A" may have a node-relaying capacity 802 of 5 children—indicating that node A may relay content segments simultaneously to a maximum of 5 different child nodes while satisfying the performance criteria. Whether obtained as a "predicted" capacity, or inferred from observed metrics, the node-relaying capacities 802 obtained by Topology Selector 810 are presumed to be accurate in the context of its analysis. In one embodiment, Topology Selector 810 specifies all of the nodes of the overlay network, while in other embodiments, it specifies only a subset of such nodes.

Similarly, for each link specified by Topology Selector 810 (e.g., the A→B link), Topology Selector 810 obtains the link-relaying capacity 804 of that link (e.g., from Prediction Engine 455b or from other observed performance metrics), which it utilizes, together with the node-relaying capacities 802 for specified nodes, to generate overlay network topology 820. Here too, Topology Selector 810 presumes the accuracy of the specified link-relaying capacities 804.

For example, in one embodiment, if the performance criteria include a minimum bandwidth of 2 mbps along each link, then a (predicted or assumed) bandwidth of 1 mbps along the A→B link would fail to satisfy the performance criteria, resulting in the rejection of the A→B link as part of overlay network topology 820. In one embodiment Topology Selector 810 specifies all possible links among the overlay nodes of the overlay network, while in other embodiments it specifies only a subset of such links—e.g., excluding links that cross ASN boundaries (i.e., as another constraint that is part of the performance criteria).

In essence, Topology Selector 810 utilizes the relative node-relaying capacities 802 to identify nodes that are more capable of relaying content segments to multiple child nodes simultaneously. Such nodes are often placed nearer the upper levels (i.e., closer in hops to the CDN source) of overlay network topology 820. The link-relaying capacities 804 serve to filter from consideration potential links that fail to satisfy the performance criteria.

It will be apparent to those skilled in the art that there are many different approaches to specifying and using node-relaying capacities 802 and link-relaying capacities 804 to generate an overlay network topology 820 that satisfies the performance criteria. For example, as discussed below, Topology Selection 810 optimizes for a minimal number of collectors in one embodiment.

In other embodiments, it implements a different (more or less complex) objective function. In some embodiments, Topology Selection 810 employs one or more optimization algorithms, while in other embodiments it utilizes heuristic algorithms to identify an overlay network topology 820 that satisfies the performance criteria. As noted above, Topology Selector 810 employs these various algorithms to facilitate its assessment of overlay network topologies based upon the extent to which they redistribute excess capacity to nodes in need of a new or better parent—i.e., shifting network traffic to satisfy the performance criteria.

Following are flowcharts illustrating key steps of more specific embodiments of the present invention in the context of optimizing an overlay network topology to satisfy the performance criteria with the fewest number of collectors.

Figure 9:
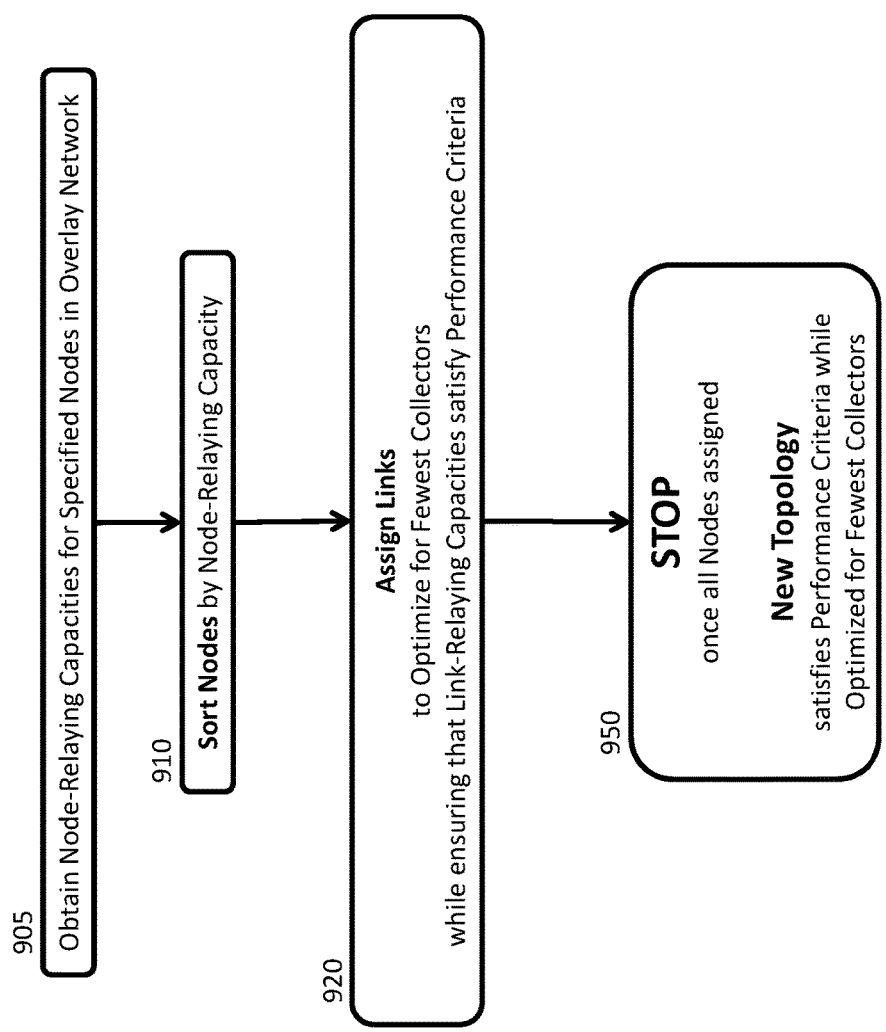
FIG. 9 is a flowchart illustrating an alternative embodiment of key steps of the "Topology Selector" component of the "Overlay Network Topology Manager" illustrated in FIG. 3C, in which nodes are sorted by node-relaying capacity and links are assigned based on link-relaying capacity.

Turning to FIG. 9, flowchart 900 illustrates key steps of a "sorting and assignment" process by which Topology Selector 810 sorts nodes by their node-relaying capacities 802 and assigns links to potential parent nodes based on their link-relaying capacities 804. In one embodiment, Topology Selector 810 (in step 905) obtains node-relaying capacities 802 for all nodes currently present in the overlay network. This includes nodes that were newly added since the overlay network topology was last reassessed and excludes nodes that have left the overlay network in the interim.

In other embodiments, Topology Selector 810 specifies only a subset of such nodes—e.g., excluding nodes behind symmetric NAT firewalls. In still other embodiments, as noted above, additional nodes that are not consuming content segments may nevertheless be included in the overlay network for the purpose of relaying (but not consuming) content segments.

Having obtained node-relaying capacities 802 for the specified nodes, Topology Selector 810 sorts those nodes in step 910 by the value of their node-relaying capacities 802. In one embodiment, as noted above, node-relaying capacities 802 are expressed in terms of the maximum number of child nodes to which a potential parent node can relay content item segments simultaneously while satisfying the performance criteria.

It is important to note, however, that even if a potential parent node (node A) can relay content segments simultaneously to 5 child nodes, it may not be able to do so with respect to any 5 child nodes—i.e., because the link-relaying capacity 804 from the potential parent node to a specific child node may not satisfy the performance criteria. For example, as noted above, if the performance criteria include a minimum bandwidth of 2 mbps along each link, then a (predicted or assumed) bandwidth of 1 mbps along the A→B link would fail to satisfy the performance criteria, resulting in the rejection of the A→B link as part of overlay network topology 820.

Therefore, Topology Selector 810 assigns links in step 920 in a manner that assesses the link-relaying capacities 804 from potential parent nodes. In other words, it excludes the assignment to a potential parent node (e.g., node A) of any child node (e.g., node B) which results in a link (e.g., A→B) that fails to satisfy the performance criteria.

As alluded to above, and explained in greater detail below, there exist many different approaches to this sorting and assignment process by which Topology Selector 810 sorts nodes by their node-relaying capacities 802 and assigns links to potential parent nodes based on their link-relaying capacities 804. These approaches include optimizing for factors other than or in addition to "fewest collectors." They also include utilization of various heuristics, such as those discussed in detail above.

In any event, once Topology Selector 810 successfully assigns links including all destination child nodes to an overlay network topology 820 that satisfies the performance criteria, it stops processing in step 950, having generated an overlay network topology 820 that is optimized for the fewest number of collectors. As will be explained in greater detail below, the sorting of nodes by their node-relaying capacities 802 facilitates the process of identifying (for any given number of collectors) an overlay network topology 820 that satisfies the performance criteria.

For example, a single-collector solution may not exist due to the failure of link-relaying capacities 804 at the lowest level of any potential single-collector overlay network topology. As noted above, even if such a solution does exist, the overhead of searching for an unlikely "corner case" single-collector solution may outweigh the benefit of more quickly identifying a two-collector solution. In one embodiment, all n-collector overlay network topologies are assessed simultaneously, while in other embodiments they are assessed consecutively (e.g., single collector, then 2-collector, then 3-collector, and so on until a solution is found).

As noted above, despite identifying a "sufficient" or "better" topology, Topology Selector 810 may or may not replace the current overlay network topology with this new overlay network topology 820—i.e., as a result of various tradeoffs of time, performance, memory and other resources (which may be employed without departing from the spirit of the present invention).

For example, in one embodiment, the overhead of changing too many links at one time may outweigh the potential benefits of new overlay network topology 820. Moreover, in another embodiment, a time-based threshold is employed (e.g., limiting the number of times the current overlay network topology is changed during a given period of time).

Figure 10:
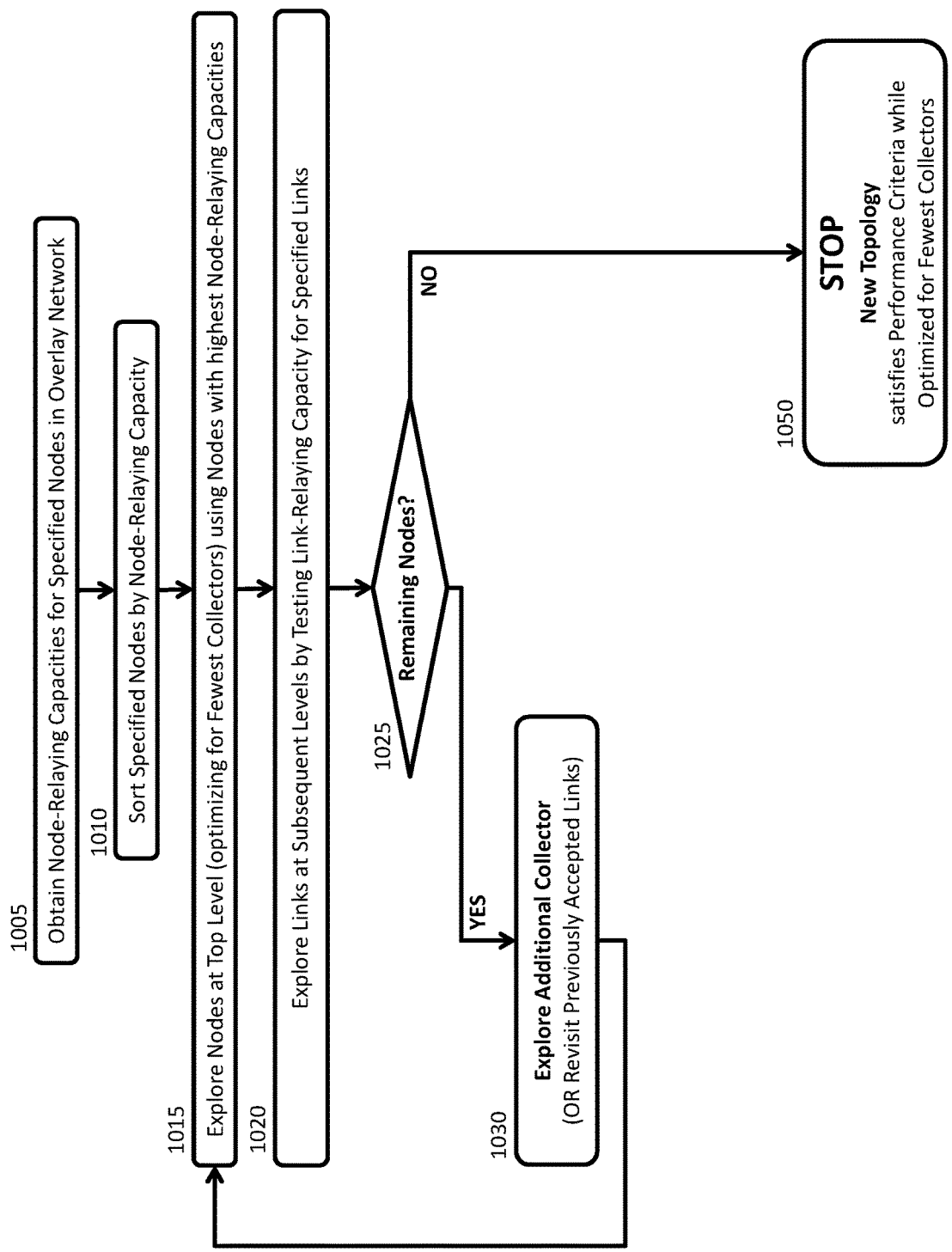
FIG. 10 is a flowchart illustrating an alternative embodiment of the key steps of the Topology Selector illustrated in FIG. 9.

Turning to FIG. 10, flowchart 1000 illustrates additional embodiments of the sorting and assignment process performed by Topology Selector 810—in particular with respect to the assessment, at various levels of a topology hierarchy, of potential n-collector overlay network topologies. In step 1005, Topology Selector 810 obtains node-relaying capacities 802 for specified nodes, and then sorts those nodes (in step 1010) by those node-relaying capacities 802 (as explained above regarding respective steps 905 and 910 of FIG. 9).

In step 1015, Topology Selector 810 begins to identify an overlay network topology that is optimized for the fewest collectors while satisfying the performance criteria. As noted above, in one embodiment, Topology Selector 810 assesses n-collector overlay network topologies simultaneously, while in other embodiments it assesses them consecutively. To better understand how this process is performed, it is helpful to describe it initially as a "step-by-step" consecutive process.

For example, in step 1015, Topology Selector 810 begins by exploring a potential single-collector solution. In this embodiment, Topology Selector 810 considers connecting the node with the highest node-relaying capacity 802 (e.g., node A) directly to the CDN source. We refer to node A in this single-collector scenario as occupying the first "level" of a potential single-collector overlay network topology.

Having completed exploration of this first level, Topology Selector 810 then assesses subsequent levels in step 1020. If, for example, node A has a node-relaying capacity 802 of five simultaneous child nodes, then Topology Selector 810 considers connecting, as children of node A, the five nodes with the next highest node-relaying capacities 802 (e.g., nodes B, C, D, E and F).

In step 1020, Topology Selector 810 assesses the link-relaying capacities 804 of each of those links (e.g., A→B, then A→C, etc.—essentially skipping those potential child nodes of links that fail to satisfy the performance criteria, as explained in greater detail below). Upon completing this second level of a potential single-collector overlay network topology, Topology Selector 810 continues in step 1020 to effectively repeat this process of assessing link-relaying capacities 804 at subsequent levels of this potential single-collector overlay network topology.

Eventually, upon assessing all subsequent levels, Topology Selector 810 will either have placed all specified nodes into this potential single-collector overlay network topology or will have remaining nodes that cannot be placed (e.g., if no remaining links satisfy the performance criteria). In step 1025, if all nodes have been placed and there are no remaining nodes, then Topology Selector 810 stops processing in step 1050, having generated an overlay network topology 820 that is optimized for the fewest number of collectors (in this example, a single-collector solution).

If, however, Topology Selector 810 determines, in step 1025, that there are remaining nodes that cannot be placed in a single-collector overlay network topology to satisfy the performance criteria, then Topology Selector 810 explores, in step 1030, the prospect of a two-collector solution. In one embodiment, Topology Selector 810 returns to step 1015 and considers connecting the two nodes with the highest node-relaying capacity 802 (e.g., nodes A and B) directly to the CDN source. These two nodes thus comprise the first level of a two-collector solution. Topology Selector 810 then proceeds to step 1020 (in the manner described above) and continues to assess link-relaying capacities 804 at subsequent levels of this potential two-collector overlay network topology.

This process continues until all nodes have been placed and there are no remaining nodes at step 1025, at which point Topology Selector 810 has identified an n-collector overlay network topology that satisfies the performance criteria while being optimized for the fewest number of collectors. As noted above, this "loop" between steps 1015 and step 1030 can, in other embodiments, be a parallel process in which Topology Selector 810 assesses each potential n-collector solution simultaneously (in which case the solution with the fewest number of collectors will be selected).

It should be noted that, while often unlikely, it is possible that a particular n-collector solution may exist but will not be identified unless previously accepted links are revisited at step 1030. For example, as noted above, the links at subsequent levels of a potential overlay network topology are dependent upon the links tentatively placed at earlier ("higher") levels of the topology. Thus, even if no single-collector solution appears to be possible upon the assessment, for example, of the links at the fourth level of a topology, such a solution may be possible by revisiting and rearranging the tentative placement of links at earlier levels of the topology (e.g., by not adhering strictly to the placement of nodes based upon their highest relative node-relaying capacity 802).

Such alternative embodiments, in which previously accepted links are revisited at step 1030, may prove impractical in that the time and resources required to explore such permutations of rearranged links may outweigh the unlikely benefit of finding a solution with a fewer number of collectors. Such design and engineering tradeoffs may nevertheless be implemented without departing from the spirit of the present invention.

Figure 11:
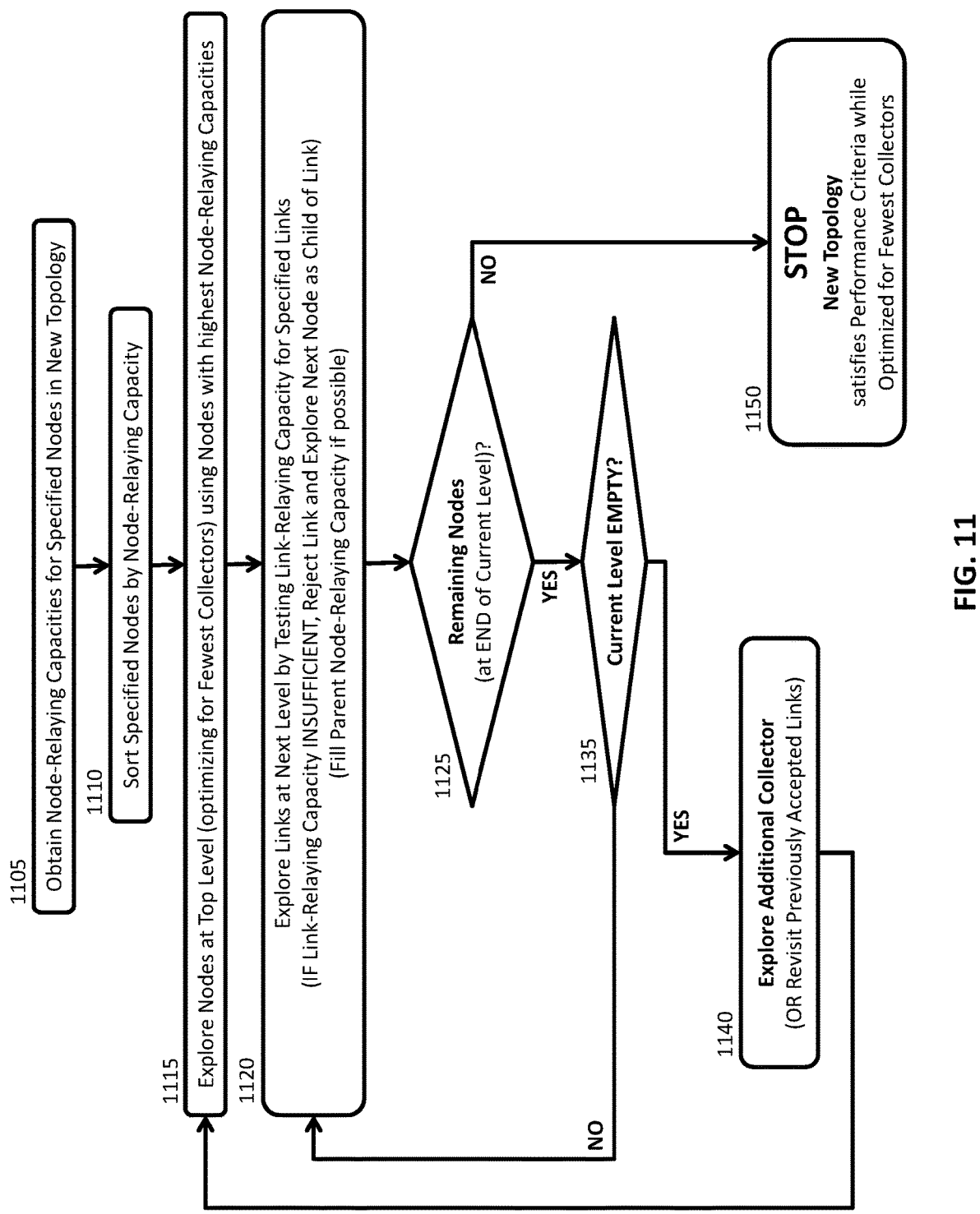
FIG. 11 is a flowchart illustrating an alternative embodiment of the key steps of the Topology Selector illustrated in FIGS. 9 and 10.

Turning to FIG. 11, flowchart 1100 illustrates more detailed alternative embodiments of the key steps of the sorting and assignment process performed by Topology Selector 810 as described above. As was the case with respect to FIGS. 9 and 10 above, Topology Selector 810 first obtains node-relaying capacities 802 for specified nodes in step 1105, and then sorts those nodes (in step 1110) by those node-relaying capacities 802.

In this embodiment, Topology Selector 810 initially explores a single-collector scenario in step 1115, in which the node with the highest node-relaying capacity 802 is selected (at least tentatively) as the single collector connected directly to the CDN source (i.e., comprising the first level of a potential single-collector overlay network topology). In other embodiments, step 1115 explores the first level of multiple n-collector scenarios in parallel.

In step 1120, Topology Selector 810 then assesses the link-relaying capacities 804 of the links at the next level (e.g., the five links at the second level below a single collector with a node-relaying capacity 802 of five simultaneous child nodes). In this embodiment, if the link capacity of a link (e.g., A→B) fails to satisfy the performance criteria, node B resumes its place in the list of remaining (unplaced) nodes ordered by their node-relaying capacities, and the link-relaying capacity 804 of the link from node A to the next node in the list (e.g., node C) is assessed.

In this embodiment, Topology Selector 810 endeavors to fill the capacity of each parent node. But this may not always be possible, particularly at subsequent "lower" levels of a potential overlay network topology. For example, if only a handful of nodes remain to be placed, it may be the case that no links from a parent node to any of those remaining nodes satisfies the performance criteria. If so, Topology Selector 810 leaves the capacity of that parent node unfilled and moves on to the next parent node. In other embodiments, filling each parent node's capacity is considered a performance criteria constraint, which would result in a failure at that current level.

Having completed assessment of the current level (whether or not the node-relaying capacity 802 of each node at that level is completely filled), Topology Selector 810 determines, in step 1125, whether there are any remaining unplaced nodes. If there are no remaining nodes, then all nodes have been placed, and Topology Selector 810 stops processing in step 1150, having generated an overlay network topology 820 that is optimized for the fewest number of collectors.

Otherwise, if nodes remain to be placed, Topology Selector 810 determines, in step 1135, whether the current level is empty. For example, at some point during assessment of a single-collector scenario, there may be no links from any parent node at the prior level to any of the remaining nodes that satisfy the performance criteria. In essence, this indicates that the single-collector scenario (or n-collector scenario during subsequent or parallel iterations) has no solution.

In this case, Topology Selector 810 increments the number of collectors, in step 1140, and returns to step 1115 to explore an (n+1)-collector scenario. In other embodiments, as noted above, it is possible (though unlikely) that a particular n-collector solution may exist but will not be identified unless previously accepted links are revisited at step 1140. In such embodiments, this additional assessment is performed if design and engineering tradeoffs justify the additional time required to revisit previously accepted links in the hope of identifying an (albeit unlikely) n-collector solution.

If Topology Selector 810 determines, in step 1135, that the current level is not empty (i.e., at least one link to a child node in the current level satisfies the performance criteria), then Topology Selector 810 returns to step 1120 to assess the link-relaying capacities 804 of the links at the next level. In this manner, Topology Selector 810 iteratively assesses the link-relaying capacities 804 of links at each level until such time as all nodes have been placed, and a solution is identified (for the fewest number of collectors) for an n-collector overlay network topology satisfying the performance criteria.

As noted above, Topology Selector 810 implements the key steps of assessing both node-relaying capacities 802 and link-relaying capacities 804 to identify an overlay network topology satisfying the performance criteria whether it does so by optimizing for the fewest number of collectors (or for some other objective function), or by performing sub-optimal heuristics to reach a substantially similar result with a more feasible utilization of computing resources.

Following are various additional embodiments of the present invention.

3. Additional Embodiments

As described above with reference to FIG. 2B, a node may be employed to relay segments of a content item that it does not consume (e.g., because it consumes segments of another content item). The purpose for such a scenario is to leverage the unused or excess relay capacity of a peer node that is not otherwise part of the current overlay network.

An example of one such scenario in which these "external" nodes are employed is a live video event in which multiple resolutions (e.g., 480p and 1080p versions of a video content item) are available for distribution. In essence, the 480p version of the video is one content item, delivered over a first overlay network topology, while the 1080p version of the video is a second distinct content item, delivered "simultaneously" over a second overlay network topology.

A viewer that is currently consuming 480p or 1080p content may be identified as having excess relay capacity. Such viewers are then added to the other overlay network topology (for relay, but not consumption, purposes), and are thus part of two distinct (though overlapping) overlay network topologies.

In this scenario, the intent is to deliver 480p content to nodes that are incapable of consuming and/or relaying 1080p content. Such nodes form the 480p overlay network topology. But, nodes relaying 1080p content that are identified as having excess relay capacity serve as a valuable resource for improving the performance of the 480p overlay network (i.e., by leveraging that excess relay capacity).

Another scenario in which these "external" nodes are employed involves devices that are otherwise idle. For example, in one embodiment, client software (illustrated in FIG. 3B) is installed in an "always on" set-top box which is continuously connected to the Internet—but not typically consuming any content item. In this scenario, such devices often have excess relay capacity as they are mostly idle. They are therefore excellent candidates to relay segments of a content item to destination nodes of an overlay network topology in need of additional relay nodes.

Upon determining that a current overlay network topology can benefit from such idle nodes, Overlay Network Topology Manager 350c informs Topology Selector 358c of the identity of such nodes. Topology Selector 358c then adds such nodes (i.e., as "new nodes") to that existing overlay network topology, as described above. In this scenario, Overlay Network Topology Manager 350c adds and removes such nodes based on the status of one or more current overlay network topologies (i.e., where such idle nodes are most needed)—rather than on the whims of a user who decides to start viewing or stop viewing a content item.

In other embodiments, a non-tree-based topology is employed, enabling nodes to receive content segments from multiple parent nodes simultaneously. In this scenario, for example, viewers of a sporting event receive and switch among multiple different broadcasts (e.g., to switch among different play-by-play announcers, including their local favorites). In other embodiments of this scenario, large medical or other data files are received from multiple different sources for the purpose of overcoming throughput limitations such as the uplink limit of any individual source.

In another embodiment, Overlay Network Topology Manager 350c assigns "slots" to nodes for the purpose of facilitating the assignment of multiple child nodes (or, in another embodiment, multiple parent nodes) to that node. For example, Overlay Network Topology Manager 350c assigns a default fixed number of relay slots to a node based upon its initial metrics (e.g., connection type, uplink and downlink speeds, etc.). It then determines, based on excess capacity identified over time, whether to increase or decrease the node's current number of relay slots. In this manner, nodes with greater excess capacity are assigned more child nodes. In other embodiments permitting a node to have multiple parent nodes, the same concept is employed with respect to "incoming" slots.

As noted above, the present invention can be employed with respect to virtually any type of application involving the distribution of digital content among multiple user nodes. For example, in a VOD scenario, unlike a broadcast video scenario, nodes receive segments of a content item at different times. In such a scenario, as noted above, the Content Array Manager 370b in each user node device 300b utilizes its buffer to facilitate the storing of segments for an extended period of time (e.g., 5-10 minutes as opposed to a typical 30 seconds for broadcast video). As the size of this buffer is increased, more nodes become available to broadcast content that they are not consuming at the present time.

Rather than maintaining distinct overlay network topologies for every different period of time during which a user requests the content item, Overlay Network Topology Manager 350c tracks these disparate time periods and dynamically adjusts the size of the buffer allocated to various parent nodes. For example, if 100 users request viewing of a content item at 100 slightly offset periods of time, Overlay Network Topology Manager 350c does not maintain 100 different overlay network topologies, as each overlay network would have a single node (or at least a very small number of nodes).

Instead, by increasing the size of the buffer dedicated to the content item, the nodes effectively distribute the content along a much smaller number of distinct (but overlapping) overlay network topologies—each with carefully synchronized buffer sizes to provide segments to different users at different times (all managed by Overlay Network Topology Manager 350c). For example, in one embodiment, a 10-minute buffer is employed to enable the distribution of a two-hour video via a dozen overlapping overlay network topologies. In other embodiments, additional features (pause, rewind, etc.) are implemented by effectively moving nodes among different overlay network topologies.

The present invention has been described herein with reference to specific embodiments as illustrated in the accompanying drawings. It should be understood that, in light of the present disclosure, additional embodiments of the concepts disclosed herein may be envisioned and implemented within the scope of the present invention by those skilled in the art.

The invention claimed is:

1. A method of reconfiguring an existing overlay network topology for the distribution of one or more segments of a content item to a destination node according to an objective function, the method comprising the following steps:
   receiving performance criteria relating to the distribution and consumption of the content item;
   collecting node metrics associated with one or more parent nodes;
   collecting link metrics associated with one or more links;
   determining the node-relaying capacity of each of the one or more parent nodes based in part on the node metrics, wherein the node-relaying capacity reflects the ability of the parent node to relay content to one or more associated child nodes;
   determining the link-relaying capacity of each of the one or more links based in part on the link metrics, wherein the link-relaying capacity reflects the ability to relay content to a child node connected by that link;
   determining, based at least in part upon the determined node-relaying capacities and the determined link-relaying capacities, one or more potential overlay network topologies that satisfy the performance criteria, each of the one or more potential overlay network topologies comprising a portion of one or more parent nodes and a portion of the one or more links;
   optimizing the objective function to identify a reconfigured overlay network topology from the one or more potential overlay network topologies; and
   determining whether to replace the existing overlay network topology with the reconfigured overlay network topology based on an overhead associated with changing from the existing overlay network topology to the reconfigured overlay network topology.

2. The method of claim 1 wherein the objective function is maximizing the Quality of Experience.

3. The method of claim 1 wherein the objective function is minimizing the number of collectors in the overlay network topology.

4. The method of claim 1 wherein the objective function is minimizing excess relay capacity of parent nodes, and wherein the method further comprises calculating the excess capacity of the plurality of prospective parent nodes.

5. The method of claim 2 wherein determining one or more potential overlay network topologies that satisfy the performance criteria comprises:
   sorting the one or more parent nodes according to their node-relaying capacity; and
   assigning the one or more links to parent nodes based on the link-relaying capacities according to whether the link-relaying capacities satisfy the performance criteria.

6. The method of claim 1 wherein the prospective parent nodes comprise one or more content distribution networks (CDNs), and wherein determining the capacity of a plurality of prospective parent nodes comprises determining the capacity of one or more prospective CDNs.

7. The method of claim 6 wherein the reconfigured overlay network comprises one or more CDNs.

8. The method of claim 7 wherein the step of determining the node-relaying capacity of each of one or more parent nodes comprises predicting the capacity of each of the one or more parent nodes based on the node metrics; and wherein the step of determining the link-relaying capacity of each of one or more links comprises predicting the capacity of each of the one or more links based on the link metrics.

9. The method of claim 1 or 7 further comprising the steps of:
   identifying node metrics and link metrics that are demand-limited, and
   filtering to exclude demand-limited or upstream dependency-limited node metrics and link metrics prior to determining the node-relaying and link-related capacity.

10. The method of claim 1 or 7 further comprising the step of predicting the session duration of viewing nodes, and wherein optimizing the objective function to determine an overlay network topology comprises placing nodes with longer session duration at higher levels of the overlay network topology.

11. The method of claim 1 wherein the one or more parent nodes comprise a subset of nodes in the existing overlay network topology.

12. The method of claim 1 further comprising the step of performing periodic performance assessments of all or portions of the existing overlay network topology.

13. The method of claim 1 wherein the reconfigured overlay network topology is a peer-based overlay network topology.

14. The method of claim 1 wherein the steps of determining the node-relaying capacity and determining the link-relaying capacity comprise excluding capacity-limited training samples in the event that the apparent limited capacity of the sample is the result of an upstream dependency or a limitation imposed along the link itself.

* * * * *